US011570461B2

(12) United States Patent
Jeong et al.

(10) Patent No.: US 11,570,461 B2
(45) Date of Patent: Jan. 31, 2023

(54) METHOD FOR ENCODING AND DECODING VIDEO BY USING MOTION VECTOR DIFFERENTIAL VALUE, AND APPARATUS FOR ENCODING AND DECODING MOTION INFORMATION

(71) Applicant: SAMSUNG ELECTRONICS CO., LTD., Suwon-si (KR)

(72) Inventors: Seungsoo Jeong, Suwon-si (KR); Minwoo Park, Suwon-si (KR); Kiho Choi, Suwon-si (KR); Anish Tamse, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 17/284,354

(22) PCT Filed: Oct. 10, 2019

(86) PCT No.: PCT/KR2019/013298
§ 371 (c)(1),
(2) Date: Apr. 9, 2021

(87) PCT Pub. No.: WO2020/076097
PCT Pub. Date: Apr. 16, 2020

(65) Prior Publication Data
US 2021/0360277 A1 Nov. 18, 2021

Related U.S. Application Data

(60) Provisional application No. 62/783,650, filed on Dec. 21, 2018, provisional application No. 62/744,170, (Continued)

(51) Int. Cl.
*H04N 7/12* (2006.01)
*H04N 19/513* (2014.01)
(Continued)

(52) U.S. Cl.
CPC ......... *H04N 19/513* (2014.11); *H04N 19/109* (2014.11); *H04N 19/139* (2014.11);
(Continued)

(58) Field of Classification Search
CPC .. H04N 19/513; H04N 19/109; H04N 19/139; H04N 19/176; H04N 19/91;
(Continued)

(56) References Cited

U.S. PATENT DOCUMENTS 10,602,179 B2   3/2020   Jeong et al.
10,666,936 B2   5/2020   Lee et al.
(Continued)

FOREIGN PATENT DOCUMENTS

EP     3 442 230 A1       4/2021
KR  10-2014-0022042 A     2/2014
(Continued)

OTHER PUBLICATIONS

International Search Report dated Jan. 28, 2020 issued by the International Searching Authority in International Application No. PCT/KR2019/013298 (PCT/ISA/220, PCT/ISA/210, and PCT/ISA/237).

(Continued)

*Primary Examiner* — Gims S Philippe
(74) *Attorney, Agent, or Firm* — Sughrue Mion, PLLC

(57) ABSTRACT

Provided is a video decoding method including: generating a merge candidate list including neighboring blocks referred to predict a motion vector of a current block in a skip mode or a merge mode; when a merge motion vector difference is used according to merge difference mode information indicating whether the merge motion vector difference and a motion vector determined from the merge candidate list are used, determining a base motion vector from a candidate determined among the merge candidate list based on merge (Continued)

candidate information; determining the motion vector of the current block by using the base motion vector and a merge motion vector difference of the current block, the merge motion vector difference being determined by using a distance index and direction index of the merge motion vector difference of the current block; and reconstructing the current block by using the motion vector of the current block.

3 Claims, 28 Drawing Sheets

Related U.S. Application Data filed on Oct. 11, 2018, provisional application No. 62/743,633, filed on Oct. 10, 2018, provisional application No. 62/743,629, filed on Oct. 10, 2018.

(51) Int. Cl.
  *H04N 19/109* (2014.01)
  *H04N 19/139* (2014.01)
  *H04N 19/176* (2014.01)
  *H04N 19/91* (2014.01)
  *H04N 19/70* (2014.01)

(52) U.S. Cl.
  CPC ........... *H04N 19/176* (2014.11); *H04N 19/91* (2014.11); *H04N 19/70* (2014.11)

(58) Field of Classification Search
  CPC ...... H04N 19/70; H04N 19/52; H04N 19/105; H04N 19/184
  USPC .................................................. 375/240.16
  See application file for complete search history.

(56) References Cited

U.S. PATENT DOCUMENTS

| | | | |
|---|---|---|---|
| 10,841,622 B2 | 11/2020 | Lim et al. | |
| 2014/0376638 A1* | 12/2014 | Nakamura | H04N 19/159 |
| | | | 375/240.16 |
| 2015/0281708 A1 | 10/2015 | Chuang et al. | |
| 2016/0316229 A1* | 10/2016 | Helle | H04N 19/44 |
| 2017/0188045 A1 | 6/2017 | Zhou | |
| 2017/0339425 A1 | 11/2017 | Jeong et al. | |
| 2017/0339426 A1 | 11/2017 | Lee et al. | |
| 2020/0107043 A1* | 4/2020 | Hung | H04N 19/56 |
| 2020/0195966 A1* | 6/2020 | Lee | H04N 19/54 |
| 2020/0404256 A1* | 12/2020 | Zhang | H04N 19/159 |
| 2021/0105500 A1* | 4/2021 | Li | H04N 19/52 |
| 2021/0250606 A1* | 8/2021 | Choi | H04N 19/105 |
| 2021/0274162 A1* | 9/2021 | Ahn | H04N 19/543 |

FOREIGN PATENT DOCUMENTS

| | | |
|---|---|---|
| KR | 10-2014-0066146 A | 5/2014 |
| KR | 10-2017-0078672 A | 7/2017 |
| KR | 10-2017-0078673 A | 7/2017 |
| KR | 10-2018-0085714 A | 7/2018 |

OTHER PUBLICATIONS

Communication dated Apr. 7, 2021, issued by the Korean Intellectual Property Office in Korean Application No. 10-2021-7001835.

Seungsoo Jeong et al., "CE4 Ultimate motion vector expression (Test 4.5.4)", Joint Video Experts Team (JVET) of ITU-T SG 16 WP 3 and ISO/IEC JTC 1/SC 29/WG11, Document: JVET-L0054, Oct. 2018, 6 pages total, XP030194793.

Seungsoo Jeong et al., "Proposed WD for CE4 Ultimate motion vector expression (Test 4.5.4)", Joint Video Experts Team (JVET) of ITU-T SG 16 WP 3 and ISO/IEC JTC 1/SC 29/WG11, Document: JVET-L0054_WD, Oct. 2018, 8 pages total, XP030194794.

Oguz Bici et al., "Context reduction for merge index coding", Joint Collaborative Team on Video Coding (JCT-VC) of ITU-T SG16 WP3 and ISO/IEC JTC1/SC29/WG11, Document: JCTVC-H0251, Feb. 2012, 4 pages total, XP030232848.

Communication dated Jun. 22, 2022 issued by the European Patent Office in European Application No. 19871375.2.

* cited by examiner

FIG. 13

| BLOCK SHAPE / DEPTH | 0: SQUARE | 1: NS_VER | 2: NS_HOR |
|---|---|---|---|
| DEPTH D | 1300 | 1310 | 1320 |
| DEPTH D+1 | 1302 | 1312 | 1322 |
| DEPTH D+2 | 1304 | 1314 | 1324 |
| ... | ... | ... | ... |

FIG. 23

| MERGE CANDIDATE INFORMATION | 0 | 1 | 2 | 3 |
|---|---|---|---|---|
| $N^{th}$ MV CANDIDATE | $1^{st}$ MV CANDIDATE | $2^{nd}$ MV CANDIDATE | $3^{rd}$ MV CANDIDATE | $4^{th}$ MV CANDIDATE |

| MERGE DIFFERENTIAL DISTANCE INDEX | BINARY STRING | DISTANCE FROM BASE MOTION VECTOR |
|---|---|---|
| 0 | 0 | 1 |
| 1 | 10 | 2 |
| 2 | 110 | 4 |
| 3 | 1110 | 8 |
| 4 | 11110 | 16 |
| 5 | 111110 | 32 |
| 6 | 1111110 | 64 |
| 7 | 1111111 | 128 |

| MERGE DIFFERENTIAL DIRECTION INDEX | BINARY STRING | X-AXIS SIGN | Y-AXIS SIGN |
|---|---|---|---|
| 0 | 00 | +1 | 0 |
| 1 | 01 | −1 | 0 |
| 2 | 10 | 0 | +1 |
| 3 | 11 | 0 | −1 |

FIG. 24

$$mvLX[\ 0\ ][\ 0\ ][\ 0\ ] = mvLXN[\ 0\ ] + refineMvLX[0]$$

$$mvLX[\ 0\ ][\ 0\ ][\ 1\ ] = mvLXN[\ 1\ ] + refineMvLX[1]$$

FIG. 25

| | Descriptor |
|---|---|
| coding_unit( x0, y0, cbWidth, cbHeight, treeType ) { | |
|   if( slice_type != I ) { | |
|     cu_skip_flag[ x0 ][ y0 ] | ae(v) |
|     if( cu_skip_flag[ x0 ][ y0 ] == 0 ) | |
|       pred_mode_flag | ae(v) |
|   } | |
|   if( CuPredMode[ x0 ][ y0 ] == MODE_INTRA ) { | |
|     if( treeType == SINGLE_TREE \|\| treeType == DUAL_TREE_LUMA ) { | |
|       intra_luma_mpm_flag[ x0 ][ y0 ] | |
|       if( intra_luma_mpm_flag[ x0 ][ y0 ] ) | |
|         intra_luma_mpm_idx[ x0 ][ y0 ] | ae(v) |
|       else | |
|         intra_luma_mpm_remainder[ x0 ][ y0 ] | ae(v) |
|     } | |
|     if( treeType == SINGLE_TREE \|\| treeType == DUAL_TREE_CHROMA ) | |
|       intra_chroma_pred_mode[ x0 ][ y0 ] | ae(v) |
|   } else { /* MODE_INTER */ | |
|     if( cu_skip_flag[ x0 ][ y0 ] ) { | |
|       umve_flag[ x0 ][ y0 ] | ae(v) |
|       if( umve_flag[ x0 ][ y0 ] == 1 ) | |
|         umve_idx_coding ( x0, y0) | |
|       else if( merge_affine_flag[ x0 ][ y0 ] == 0 && MaxNumMergeCand > 1 ) | |
|         merge_idx[ x0 ][ y0 ] | ae(v) |
|     } else { | |
|       merge_flag[ x0 ][ y0 ] | ae(v) |
|       if( merge_flag[ x0 ][ y0 ] ) { | |
|         umve_flag[ x0 ][ y0 ] | ae(v) |
|         if( umve_flag[ x0 ][ y0 ] == 1 ) | |
|           umve_idx_coding ( x0, y0) | |
|         else if(merge_affine_flag[ x0 ][ y0 ] == 0 && MaxNumMergeCand > 1 ) | |
|           merge_idx[ x0 ][ y0 ] | ae(v) |
|       } else { | |
|         if( slice_type == B ) | |
|           inter_pred_idc[ x0 ][ y0 ] | ae(v) |
|         if( sps_affine_enabled_flag && cbWidth >= 16 && cbHeight >= 16 ) { | |
|           inter_affine_flag[ x0 ][ y0 ] | ae(v) |
|           if( sps_affine_type_flag && inter_affine_flag[ x0 ][ y0 ] ) | |
|             cu_affine_type_flag[ x0 ][ y0 ] | ae(v) |
|         } | |
|       } | |
|     } | |
| } | |

| | Descriptor |
|---|---|
| umve_idx_coding ( x0, y0 ) { | |
|   base_mv_idx[ x0 ][ y0 ] | ae(v) |
|   distance_idx[ x0 ][ y0 ] | ae(v) |
|   direction_idx[ x0 ][ y0 ] | ae(v) |
| } | |

FIG. 26

| | Descriptor |
|---|---|
| merge_data( x0, y0, cbWidth, cbHeight, chType ) { | |
|   if ( CuPredMode[ chType ][ x0 ][ y0 ] = = MODE_IBC ) { | |
|     if( MaxNumIbcMergeCand > 1 ) | |
|       merge_idx[ x0 ][ y0 ] | ae(v) |
|   } else { | |
|     if( MaxNumSubblockMergeCand > 0 && cbWidth >= 8 && cbHeight >= 8 ) | |
|       merge_subblock_flag[ x0 ][ y0 ] | ae(v) |
|     if( merge_subblock_flag[ x0 ][ y0 ] = = 1 ) { | |
|       if( MaxNumSubblockMergeCand > 1 ) | |
|         merge_subblock_idx[ x0 ][ y0 ] | ae(v) |
|     } else { | |
|       if( ( cbWidth * cbHeight ) >= 64 && ( (sps_ciip_enabled_flag && | |
|         cu_skip_flag[ x0 ][ y0 ] = = 0 && cbWidth < 128 && cbHeight < 128 ) \|\| | |
|         ( sps_triangle_enabled_flag && MaxNumTriangleMergeCand > 1 && | |
|         slice_type = = B ) ) ) | |
|         regular_merge_flag[ x0 ][ y0 ] | ae(v) |
|       if ( regular_merge_flag[ x0 ][ y0 ] = = 1 ){ | |
|         if( sps_mmvd_enabled_flag ) | |
|           mmvd_merge_flag[ x0 ][ y0 ] | ae(v) |
|         if( mmvd_merge_flag[ x0 ][ y0 ] = = 1 ) { | |
|           if( MaxNumMergeCand > 1 ) | |
|             mmvd_cand_flag[ x0 ][ y0 ] | ae(v) |
|           mmvd_distance_idx[ x0 ][ y0 ] | ae(v) |
|           mmvd_direction_idx[ x0 ][ y0 ] | ae(v) |
|         } else { | |
|           if( MaxNumMergeCand > 1 ) | |
|             merge_idx[ x0 ][ y0 ] | ae(v) |
|         } | |
|       } else { | |
|         if( sps_ciip_enabled_flag && sps_triangle_enabled_flag && | |
|         MaxNumTriangleMergeCand > 1 && slice_type = = B && | |
|         cu_skip_flag[ x0 ][ y0 ] = = 0 && ( cbWidth * cbHeight ) >= 64 && | |
|         cbWidth < 128 && cbHeight < 128 ) { | |
|           ciip_flag[ x0 ][ y0 ] | ae(v) |
|         if( ciip_flag[ x0 ][ y0 ] && MaxNumMergeCand > 1 ) | |
|           merge_idx[ x0 ][ y0 ] | ae(v) |
|         if( !ciip_flag[ x0 ][ y0 ] && MaxNumTriangleMergeCand > 1 ) { | |
|           merge_triangle_split_dir[ x0 ][ y0 ] | ae(v) |
|           merge_triangle_idx0[ x0 ][ y0 ] | ae(v) |
|           merge_triangle_idx1[ x0 ][ y0 ] | ae(v) |
|         } | |
|       } | |
|     } | |
|   } | |
| } | |

FIG. 27

| Syntax Structure | Syntax element | Binarization | |
|---|---|---|---|
| merge_data( ) | | Process | Input parameters |
| | regular_merge_flag[ ][ ] | FL | cMax = 1 |
| | mmvd_merge_flag[ ][ ] | FL | cMax = 1 |
| | mmvd_cand_flag[ ][ ] | FL | cMax = 1 |
| | mmvd_distance_idx[ ][ ] | TR | cMax = 7, cRiceParam = 0 |
| | mmvd_direction_idx[ ][ ] | FL | cMax = 3 |

FIG. 28

| Syntax element | binIdx | | | | | |
|---|---|---|---|---|---|---|
| | 0 | 1 | 2 | 3 | 4 | >= 5 |
| general_merge_flag[ ][ ] | 0 | na | na | na | na | na |
| regular_merge_flag[ ][ ] | cu_skip_flag[ ][ ] ? 0 : 1 | na | na | na | na | na |
| mmvd_merge_flag[ ][ ] | 0 | na | na | na | na | na |
| mmvd_cand_flag[ ][ ] | 0 | na | na | na | na | na |
| mmvd_distance_idx[ ][ ] | 0 | bypass | bypass | bypass | bypass | bypass |
| mmvd_direction_idx[ ][ ] | bypass | bypass | na | na | na | na |
| merge_idx[ ][ ] | 0 | bypass | bypass | bypass | bypass | na |

# METHOD FOR ENCODING AND DECODING VIDEO BY USING MOTION VECTOR DIFFERENTIAL VALUE, AND APPARATUS FOR ENCODING AND DECODING MOTION INFORMATION

TECHNICAL FIELD

The present disclosure relates to the fields of encoding and decoding an image. More particularly, the present disclosure relates to a method and apparatus for encoding, and a method and apparatus for decoding a motion vector used to encode and decode an image.

BACKGROUND ART

In methods of encoding and decoding an image, one picture may be split into blocks and each block may be prediction-encoded via inter-prediction or intra-prediction to encode the image.

A representative example of inter-prediction is motion estimation encoding using a method of compressing an image by removing temporal redundancy between pictures. In motion estimation encoding, blocks of a current picture are predicted by using at least one reference picture. A reference block most similar to a current block may be searched for in a certain search range by using a certain evaluation function. The current block is predicted based on the reference block and a residual block is generated by subtracting a prediction block generated as a result of the prediction from the current block and then encoded. Here, to further accurately perform the prediction, interpolation is performed on a search range of reference pictures so as to generate pixels of sub pel units smaller than integer pel units and inter-prediction may be performed based on the generated pixels of sub pel units.

In the codec such as H.264 advanced video coding (AVC) and high efficiency video coding (HEVC), a motion vector of pre-encoded blocks adjacent to a current block or blocks included in a pre-encoded picture is used as a prediction motion vector of the current block so as to predict a motion vector of the current block. A differential motion vector that is a difference between the motion vector of the current block and the prediction motion vector is signaled to a decoder via a certain method.

DESCRIPTION OF EMBODIMENTS

Technical Problem

Technical problems of methods of encoding and decoding a motion vector, and apparatuses for encoding and decoding a motion vector, according to an embodiment, relate to efficiently predicting the motion vector, and encoding and decoding the motion vector.

Solution to Problem

A method of decoding a motion vector, according to an embodiment of the present disclosure, may include: generating a merge candidate list including neighboring blocks referred to predict a motion vector of a current block in a skip mode or a merge mode; obtaining merge difference mode information indicating whether a merge motion vector difference and a motion vector determined from the merge candidate list are used; when the merge motion vector difference is used according to the merge difference mode information, obtaining merge candidate information from a bitstream and determining a base motion vector from a candidate determined among the merge candidate list based on the merge candidate information; determining the motion vector of the current block by using the base motion vector and a merge motion vector difference of the current block, the merge motion vector difference being determined by using a distance index and direction index of the merge motion vector difference of the current block; and reconstructing the current block by using the motion vector of the current block.

Advantageous Effects of Disclosure

Methods of encoding and decoding a motion vector, and apparatuses for encoding and decoding motion information, according to an embodiment, can refer to a motion vector of a neighboring block to efficiently predict a motion vector, and effectively provide a list of neighboring blocks suitable to be referred to.

However, effects achievable by methods of encoding and decoding motion information and apparatuses for encoding and decoding motion information, according to an embodiment, are not limited to those mentioned above, and other effects that are not mentioned could be clearly understood by one of ordinary skill in the art from the following descriptions.

BRIEF DESCRIPTION OF DRAWINGS

A brief description of each drawing is provided to gain a better understanding of the drawings cited herein.

FIG. 13 illustrates a process of determining a depth of a coding unit as a shape and size of the coding unit change, when the coding unit is recursively split such that a plurality of coding units are determined, according to an embodiment.

FIG. 23 illustrate values and meanings of merge candidate information, merge differential distance indexes, and merge differential direction indexes, according to an embodiment.

FIG. 24 illustrates equations for obtaining a motion vector by using a base motion vector and a merge motion vector difference, according to an embodiment.

FIG. 25 illustrates syntaxes for obtaining merge difference mode information, merge candidate information, merge differential distance indexes, and merge differential direction indexes, according to an embodiment.

FIG. 26 illustrates syntaxes for obtaining merge difference mode information, merge candidate information, merge differential distance indexes, and merge differential direction indexes, according to another embodiment.

FIG. 27 is a reference table for determining binarization of merge-related information, according to another embodiment.

FIG. 28 is a reference table for determining context information of merge-related information, according to another embodiment.

BEST MODE

Figure 1:
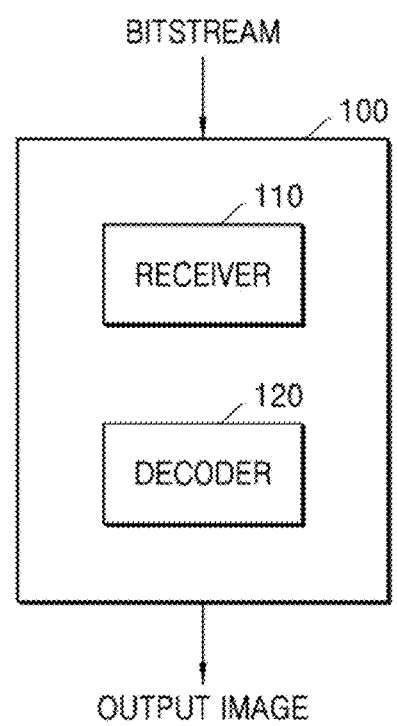
FIG. 1 is a schematic block diagram of an image decoding apparatus according to an embodiment.

A method of decoding a motion information, according to an embodiment of the present disclosure, may include: generating a merge candidate list including neighboring blocks referred to predict a motion vector of a current block in a skip mode or a merge mode; obtaining merge difference mode information indicating whether a merge motion vector difference and a motion vector determined from the merge candidate list are used; when the merge motion vector difference is used according to the merge difference mode information, obtaining merge candidate information from a bitstream and determining a base motion vector from a candidate determined among the merge candidate list based on the merge candidate information; determining the motion vector of the current block by using the base motion vector and a merge motion vector difference of the current block, the merge motion vector difference being determined by using a distance index and direction index of the merge motion vector difference of the current block; and reconstructing the current block by using the motion vector of the current block.

The determining of the merge motion vector difference may include: obtaining a first bin of the distance index of the merge motion vector difference by performing, on the bitstream, entropy decoding using context information; and obtaining remaining bins of the distance index of the merge motion vector difference by performing, on the bitstream, entropy decoding via a bypass mode.

A largest number of candidates allowed to be selected according to the merge candidate information may be smaller than a largest number of candidates included in the merge candidate list.

The merge candidate information that is one bit of information may be obtained via entropy decoding by applying one piece of context information to the bitstream.

When prediction is performed in the merge mode, a number of pieces of context information required to obtain a general merge index indicating one candidate in the merge candidate list and a number of pieces of context information required to obtain the merge candidate information may be the same.

An apparatus for decoding motion information, according to an embodiment of the present disclosure, includes: an inter-prediction information obtainer configured to obtain merge difference mode information indicating whether a merge motion vector difference and a motion vector determined from a merge candidate list of a current block are used, and when the merge motion vector difference is used according to the merge difference mode information, obtaining merge candidate information from a bitstream; an inter-prediction performer configured to generate the merge candidate list including neighboring blocks referred to predict a motion vector of the current block in a skip mode or a merge mode, determine a base motion vector from a candidate determined among the merge candidate list based on the merge candidate information, determine a merge motion vector difference of the current block by using a distance index and a direction index of the merge motion vector difference of the current block, and determine the motion vector of the current block by using the base motion vector and the merge motion vector difference; and a reconstructor configured to reconstruct the current block by using the motion vector.

The inter-prediction information obtainer may be further configured to obtain a first bin of the distance index of the merge motion vector difference by performing, on the bitstream, entropy decoding using context information, and obtain remaining bins of the distance index of the merge motion vector difference by performing, on the bitstream, entropy decoding in a bypass mode.

A largest number of candidates allowed to be selected according to the merge candidate information may be smaller than a largest number of candidates included in the merge candidate list.

The inter-prediction information obtainer may be further configured to obtain the merge candidate information that is one bit of information via entropy decoding by applying one piece of context information to the bitstream.

When prediction is performed in the merge mode, a number of pieces of context information required to obtain a general merge index indicating one candidate in the merge candidate list and a number of pieces of context information required to obtain the merge candidate information may be the same.

A video encoding method according to an embodiment of the present disclosure includes: generating a merge candidate list including neighboring blocks referred to predict a motion vector of a current block, when inter-prediction is performed on the current block in one of a skip mode and a merge mode; generating merge difference mode information indicating whether a merge motion vector difference and a base motion vector determined from the merge candidate list of the current block are used; when the merge motion vector difference is used, generating merge candidate information indicating one base motion vector in the merge candidate list; and generating a distance index of a merge motion vector difference corresponding to a difference between the base motion vector and the motion vector of the current block, and a direction index of the merge motion vector difference.

The generating of the distance index and direction index of the merge motion vector difference may include: performing entropy encoding using context information on a first bin of the distance index of the merge motion vector difference; and performing entropy encoding in a bypass mode on remaining bins of the distance index of the merge motion vector difference.

A video encoding apparatus according to an embodiment of the present disclosure includes: an inter-prediction performer configured to determine a motion vector of a current block by performing inter-prediction on the current block, and generate a merge candidate list including neighboring blocks referred to predict the motion vector of the current block when inter-prediction is performed on the current block in one of a skip mode and a merge mode; and an inter-prediction information generator configured to generate merge difference mode information indicating whether a merge motion vector difference and a base motion vector determined from the merge candidate list of the current block are used, when the merge motion vector difference is used, generate merge candidate information indicating a base motion vector among the merge candidate list, and generate a distance index and direction index of a merge motion vector difference corresponding to a difference between the base motion vector and the motion vector of the current block.

The inter-prediction information generator may be further configured to perform entropy encoding using context information on a first bin of the distance index of the merge motion vector difference and perform entropy encoding in a bypass mode on remaining bins of the distance index of the merge motion vector difference.

A computer-readable recording medium having recorded thereon a program for implementing, on a computer, a video decoding method according to an embodiment of the present disclosure.

A computer-readable recording medium having recorded thereon a program for implementing, on a computer, a video encoding method according to an embodiment of the present disclosure.

MODE OF DISCLOSURE

As the present disclosure allows for various changes and numerous examples, particular embodiments will be illustrated in the drawings and described in detail in the written description. However, this is not intended to limit the present disclosure to particular modes of practice, and it will be understood that all changes, equivalents, and substitutes that do not depart from the spirit and technical scope of the present disclosure are encompassed in the present disclosure.

In the description of embodiments, certain detailed explanations of related art are omitted when it is deemed that they may unnecessarily obscure the essence of the present disclosure. Also, numbers (for example, a first, a second, and the like) used in the description of the specification are merely identifier codes for distinguishing one element from another.

Also, in the present specification, it will be understood that when elements are "connected" or "coupled" to each other, the elements may be directly connected or coupled to each other, but may alternatively be connected or coupled to each other with an intervening element therebetween, unless specified otherwise.

In the present specification, regarding an element represented as a "unit" or a "module", two or more elements may be combined into one element or one element may be divided into two or more elements according to subdivided functions. In addition, each element described hereinafter may additionally perform some or all of functions performed by another element, in addition to main functions of itself, and some of the main functions of each element may be performed entirely by another component.

Also, in the present specification, an 'image' or a 'picture' may denote a still image of a video or a moving image, i.e., the video itself.

Also, in the present specification, a 'sample' denotes data assigned to a sampling position of an image, i.e., data to be processed. For example, pixel values of an image in a spatial domain and transform coefficients on a transform region may be samples. A unit including at least one such sample may be defined as a block.

Also, in the present specification, a 'current block' may denote a block of a largest coding unit, coding unit, prediction unit, or transform unit of a current image to be encoded or decoded.

In the present specification, a motion vector in a list 0 direction may denote a motion vector used to indicate a block in a reference picture included in a list 0, and a motion vector in a list 1 direction may denote a motion vector used to indicate a block in a reference picture included in a list 1. Also, a motion vector in a unidirection may denote a motion vector used to indicate a block in a reference picture included in a list 0 or list 1, and a motion vector in a bidirection may denote that the motion vector includes a motion vector in a list 0 direction and a motion vector in a list 1 direction.

Hereinafter, an image encoding apparatus and an image decoding apparatus, and an image encoding method and an image decoding method according to embodiments will be described with reference to FIGS. 1 through 16. A method of determining a data unit of an image, according to an embodiment, will be described with reference to FIGS. 3 through 16, and a video encoding/decoding method in which an inter-prediction method is expanded by using a probability motion expression method according to an embodiment will be described with reference to FIGS. 17 through 28.

Hereinafter, a method and apparatus for adaptive selection based on various shapes of coding units, according to an embodiment of the present disclosure, will be described with reference to FIGS. 1 and 2.

FIG. 1 is a schematic block diagram of an image decoding apparatus according to an embodiment.

The image decoding apparatus 100 may include a receiver 110 and a decoder 120. The receiver 110 and the decoder 120 may include at least one processor. Also, the receiver 110 and the decoder 120 may include a memory storing instructions to be performed by the at least one processor.

The receiver 110 may receive a bitstream. The bitstream includes information of an image encoded by an image encoding apparatus 1700 described later. Also, the bitstream may be transmitted from the image encoding apparatus 1700. The image encoding apparatus 1700 and the image decoding apparatus 100 may be connected via wires or wirelessly, and the receiver 110 may receive the bitstream via wires or wirelessly. The receiver 110 may receive the bitstream from a storage medium, such as an optical medium or a hard disk. The decoder 120 may reconstruct an image based on information obtained from the received bitstream. The decoder 120 may obtain, from the bitstream, a syntax element for reconstructing the image. The decoder 120 may reconstruct the image based on the syntax element.

Operations of the image decoding apparatus 100 will be described in detail with reference to FIG. 2.

Figure 2:
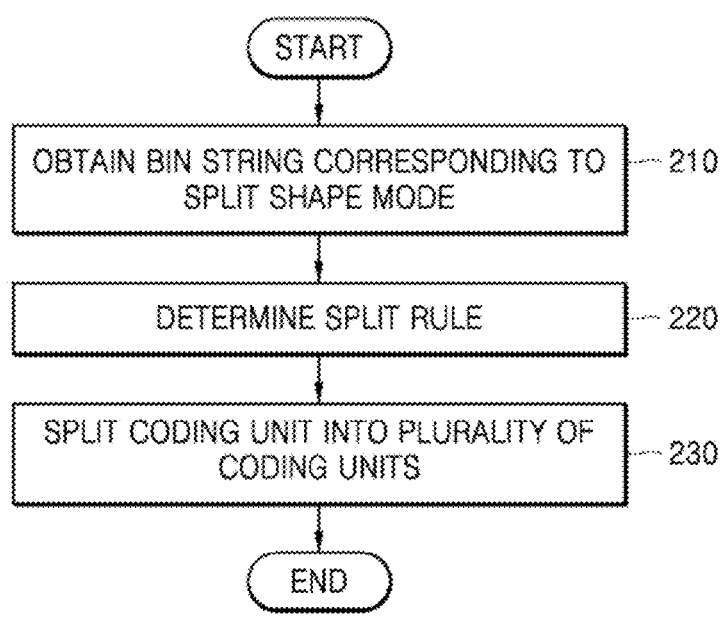
FIG. 2 is a flowchart of an image decoding method according to an embodiment.

FIG. 2 is a flowchart of an image decoding method according to an embodiment.

According to an embodiment of the disclosure, the receiver 110 receives a bitstream.

The image decoding apparatus 100 obtains, from a bitstream, a bin string corresponding to a split shape mode of a coding unit (operation 210). The image decoding apparatus 100 determines a split rule of the coding unit (operation 220). Also, the image decoding apparatus 100 splits the coding unit into a plurality of coding units, based on at least one of the bin string corresponding to the split shape mode and the split rule (operation 230). The image decoding apparatus 100 may determine an allowable first range of a size of the coding unit, according to a ratio of the width and the height of the coding unit, so as to determine the split rule. The image decoding apparatus 100 may determine an allowable second range of the size of the coding unit, according to the split shape mode of the coding unit, so as to determine the split rule.

Hereinafter, splitting of a coding unit will be described in detail according to an embodiment of the present disclosure.

First, one picture may be split into one or more slices or one or more tiles. One slice or one tile may be a sequence of one or more largest coding units (coding tree units (CTUs)). There is a largest coding block (coding tree block (CTB)) conceptually compared to a largest coding unit (CTU).

The largest coding unit (CTB) denotes an N×N block including N×N samples (N is an integer). Each color component may be split into one or more largest coding blocks.

When a picture includes three sample arrays (sample arrays for Y, Cr, and Cb components), a largest coding unit (CTU) includes a largest coding block of a luma sample, two corresponding largest coding blocks of chroma samples, and syntax structures used to encode the luma sample and the chroma samples. When a picture is a monochrome picture, a largest coding unit includes a largest coding block of a monochrome sample and syntax structures used to encode the monochrome samples. When a picture is a picture encoded in color planes separated according to color components, a largest coding unit includes syntax structures used to encode the picture and samples of the picture.

One largest coding block (CTB) may be split into M×N coding blocks including M×N samples (M and N are integers).

When a picture has sample arrays for Y, Cr, and Cb components, a coding unit (CU) includes a coding block of a luma sample, two corresponding coding blocks of chroma samples, and syntax structures used to encode the luma sample and the chroma samples. When a picture is a monochrome picture, a coding unit includes a coding block of a monochrome sample and syntax structures used to encode the monochrome samples. When a picture is a picture encoded in color planes separated according to color components, a coding unit includes syntax structures used to encode the picture and samples of the picture.

As described above, a largest coding block and a largest coding unit are conceptually distinguished from each other, and a coding block and a coding unit are conceptually distinguished from each other. That is, a (largest) coding unit refers to a data structure including a (largest) coding block including a corresponding sample and a syntax structure corresponding to the (largest) coding block. However, because it is understood by one of ordinary skill in the art that a (largest) coding unit or a (largest) coding block refers to a block of a certain size including a certain number of samples, a largest coding block and a largest coding unit, or a coding block and a coding unit are mentioned in the following specification without being distinguished unless otherwise described.

An image may be split into largest coding units (CTUs). A size of each largest coding unit may be determined based on information obtained from a bitstream. A shape of each largest coding unit may be a square shape of the same size. However, the present disclosure is not limited thereto.

For example, information about a maximum size of a luma coding block may be obtained from a bitstream. For example, the maximum size of the luma coding block indicated by the information about the maximum size of the luma coding block may be one of 4×4, 8×8, 16×16, 32×32, 64×64, 128×128, and 256×256.

For example, information about a luma block size difference and a maximum size of a luma coding block that may be split into two may be obtained from a bitstream. The information about the luma block size difference may refer to a size difference between a luma largest coding unit and a largest luma coding block that may be split into two. Accordingly, when the information about the maximum size of the luma coding block that may be split into two and the information about the luma block size difference obtained from the bitstream are combined with each other, a size of the luma largest coding unit may be determined. A size of a chroma largest coding unit may be determined by using the size of the luma largest coding unit. For example, when a Y:Cb:Cr ratio is 4:2:0 according to a color format, a size of a chroma block may be half a size of a luma block, and a size of a chroma largest coding unit may be half a size of a luma largest coding unit.

According to an embodiment, because information about a maximum size of a luma coding block that is binary splittable is obtained from a bitstream, the maximum size of the luma coding block that is binary splittable may be variably determined. In contrast, a maximum size of a luma coding block that is ternary splittable may be fixed. For example, the maximum size of the luma coding block that is ternary splittable in an I-picture may be 32×32, and the maximum size of the luma coding block that is ternary splittable in a P-picture or a B-picture may be 64×64.

Also, a largest coding unit may be hierarchically split into coding units based on split shape mode information obtained from a bitstream. At least one of information indicating whether quad splitting is performed, information indicating whether multi-splitting is performed, split direction information, or split type information may be obtained as the split shape mode information from the bitstream.

For example, the information indicating whether quad splitting is performed may indicate whether a current coding unit is quad split (QUAD_SPLIT) or not.

When the current coding unit is not quad split, the information indicating whether multi-splitting is performed may indicate whether the current coding unit is no longer split (NO_SPLIT) or binary/ternary split.

When the current coding unit is binary split or ternary split, the split direction information indicates that the current coding unit is split in one of a horizontal direction and a vertical direction.

When the current coding unit is split in the horizontal direction or the vertical direction, the split type information indicates that the current coding unit is binary split or ternary split.

A split mode of the current coding unit may be determined according to the split direction information and the split type information. A split mode when the current coding unit is binary split in the horizontal direction may be determined to be a binary horizontal split mode (SPLIT_BT_HOR), a split mode when the current coding unit is ternary split in the horizontal direction may be determined to be a ternary horizontal split mode (SPLIT_TT_HOR), a split mode when the current coding unit is binary split in the vertical direction may be determined to be a binary vertical split mode (SPLIT_BT_VER), and a split mode when the current coding unit is ternary split in the vertical direction may be determined to be a ternary vertical split mode SPLIT_BT_VER.

The image decoding apparatus 100 may obtain, from the bitstream, the split shape mode information from one bin string. A form of the bitstream received by the image decoding apparatus 100 may include fixed length binary code, unary code, truncated unary code, pre-determined binary code, or the like. The bin string is information in a binary number. The bin string may include at least one bit. The image decoding apparatus 100 may obtain the split shape mode information corresponding to the bin string, based on the split rule. The image decoding apparatus 100 may determine whether to quad-split a coding unit, whether not to split a coding unit, a split direction, and a split type, based on one bin string.

The coding unit may be smaller than or same as the largest coding unit. For example, because a largest coding unit is a coding unit having a maximum size, the largest coding unit is one of coding units. When split shape mode information about a largest coding unit indicates that splitting is not performed, a coding unit determined in the largest coding unit has the same size as that of the largest coding unit. When split shape code information about a largest coding unit indicates that splitting is performed, the largest coding unit may be split into coding units. Also, when split shape mode information about a coding unit indicates that splitting is performed, the coding unit may be split into smaller coding units. However, the splitting of the image is not limited thereto, and the largest coding unit and the coding unit may not be distinguished. The splitting of the coding unit will be described in detail with reference to FIGS. 3 through 16.

Also, one or more prediction blocks for prediction may be determined from a coding unit. The prediction block may be the same as or smaller than the coding unit. Also, one or more transform blocks for transform may be determined from a coding unit. The transform block may be the same as or smaller than the coding unit.

The shapes and sizes of the transform block and prediction block may not be related to each other.

In another embodiment, prediction may be performed by using a coding unit as a prediction unit. Also, transform may be performed by using a coding unit as a transform block.

The splitting of the coding unit will be described in detail with reference to FIGS. 3 through 16. A current block and a neighboring block of the present disclosure may indicate one of the largest coding unit, the coding unit, the prediction block, and the transform block. Also, the current block of the current coding unit is a block that is currently being decoded or encoded or a block that is currently being split. The neighboring block may be a block reconstructed before the current block. The neighboring block may be adjacent to the current block spatially or temporally. The neighboring block may be located at one of the lower left, left, upper left, top, upper right, right, lower right of the current block.

Figure 3:
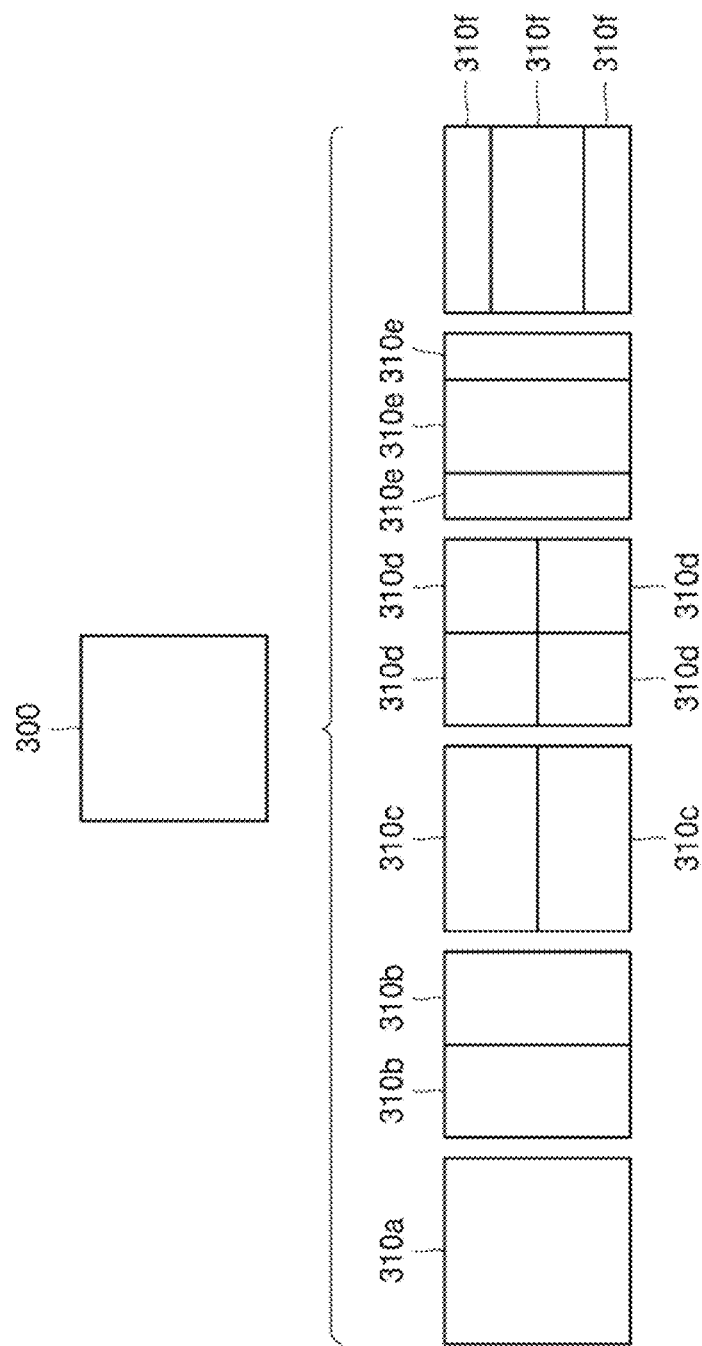
FIG. 3 illustrates a process, performed by an image decoding apparatus, of determining at least one coding unit by splitting a current coding unit, according to an embodiment.

FIG. 3 illustrates a process, performed by an image decoding apparatus, of determining at least one coding unit by splitting a current coding unit, according to an embodiment.

A block shape may include 4N×4N, 4N×2N, 2N×4N, 4N×N, N×4N, 32N×N, N×32N, 16N×N, N×16N, 8N×N, or N×8N. Here, N may be a positive integer. Block shape information is information indicating at least one of a shape, direction, a ratio of width and height, or size of a coding unit.

The shape of the coding unit may include a square and a non-square. When the lengths of the width and height of the coding unit are the same (i.e., when the block shape of the coding unit is 4N×4N), the image decoding apparatus 100 may determine the block shape information of the coding unit as a square. The image decoding apparatus 100 may determine the shape of the coding unit to be a non-square.

When the width and the height of the coding unit are different from each other (i.e., when the block shape of the coding unit is 4N×2N, 2N×4N, 4N×N, N×4N, 32N×N, N×32N, 16N×N, N×16N, 8N×N, or N×8N), the image decoding apparatus 100 may determine the block shape information of the coding unit as a non-square shape. When the shape of the coding unit is non-square, the image decoding apparatus 100 may determine the ratio of the width and height among the block shape information of the coding unit to be at least one of 1:2, 2:1, 1:4, 4:1, 1:8, 8:1, 1:16, 16:1, 1:32, or 32:1. Also, the image decoding apparatus 100 may determine whether the coding unit is in a horizontal direction or a vertical direction, based on the length of the width and the length of the height of the coding unit. Also, the image decoding apparatus 100 may determine the size of the coding unit, based on at least one of the length of the width, the length of the height, or the area of the coding unit.

According to an embodiment of the disclosure, the image decoding apparatus 100 may determine the shape of the coding unit by using the block shape information, and may determine a splitting method of the coding unit by using the split shape mode information. That is, a coding unit splitting method indicated by the split shape mode information may be determined based on a block shape indicated by the block shape information used by the image decoding apparatus 100.

The image decoding apparatus 100 may obtain the split shape mode information from a bitstream. However, an embodiment is not limited thereto, and the image decoding apparatus 100 and the image encoding apparatus 1700 may determine pre-agreed split shape mode information, based on the block shape information. The image decoding apparatus 100 may determine the pre-agreed split shape mode information with respect to a largest coding unit or a smallest coding unit. For example, the image decoding apparatus 100 may determine split shape mode information with respect to the largest coding unit to be a quad split. Also, the image decoding apparatus 100 may determine split shape mode information regarding the smallest coding unit to be "not to perform splitting". In particular, the image decoding apparatus 100 may determine the size of the largest coding unit to be 256×256. The image decoding apparatus 100 may determine the pre-agreed split shape mode information to be a quad split. The quad split is a split shape mode in which the width and the height of the coding unit are both bisected. The image decoding apparatus 100 may obtain a coding unit of a 128×128 size from the largest coding unit of a 256×256 size, based on the split shape mode information. Also, the image decoding apparatus 100 may determine the size of the smallest coding unit to be 4×4. The image decoding apparatus 100 may obtain split shape mode information indicating "not to perform splitting" with respect to the smallest coding unit.

According to an embodiment of the disclosure, the image decoding apparatus 100 may use the block shape information indicating that the current coding unit has a square shape. For example, the image decoding apparatus 100 may determine whether not to split a square coding unit, whether to vertically split the square coding unit, whether to horizontally split the square coding unit, or whether to split the square coding unit into four coding units, based on the split shape mode information. Referring to FIG. 3, when the block shape information of a current coding unit 300 indicates a square shape, the decoder 120 may determine that a coding unit 310*a* having the same size as the current coding unit 300 is not split, based on the split shape mode information indicating not to perform splitting, or may determine coding units 310*b*, 310*c*, 310*d*, 310*e*, or 310*f* split based on the split shape mode information indicating a certain splitting method.

Referring to FIG. 3, according to an embodiment of the disclosure, the image decoding apparatus 100 may determine two coding units 310*b* obtained by splitting the current coding unit 300 in a vertical direction, based on the split shape mode information indicating to perform splitting in a vertical direction. The image decoding apparatus 100 may determine two coding units 310*c* obtained by splitting the current coding unit 300 in a horizontal direction, based on the split shape mode information indicating to perform splitting in a horizontal direction. The image decoding apparatus 100 may determine four coding units 310*d* obtained by splitting the current coding unit 300 in vertical and horizontal directions, based on the split shape mode information indicating to perform splitting in vertical and horizontal directions. According to an embodiment, the image decoding apparatus 100 may determine three coding units 310*e* obtained by splitting the current coding unit 300 in a vertical direction, based on the split shape mode information indicating to perform ternary-splitting in a vertical direction. The image decoding apparatus 100 may determine three coding units 310*f* obtained by splitting the current coding unit 300 in a horizontal direction, based on the split shape mode information indicating to perform ternary-splitting in a horizontal direction. However, splitting methods of the square coding unit are not limited to the above-described methods, and the split shape mode information may indicate various methods. Certain splitting methods of splitting the square coding unit will be described in detail below in relation to various embodiments of the disclosure.

Figure 4:
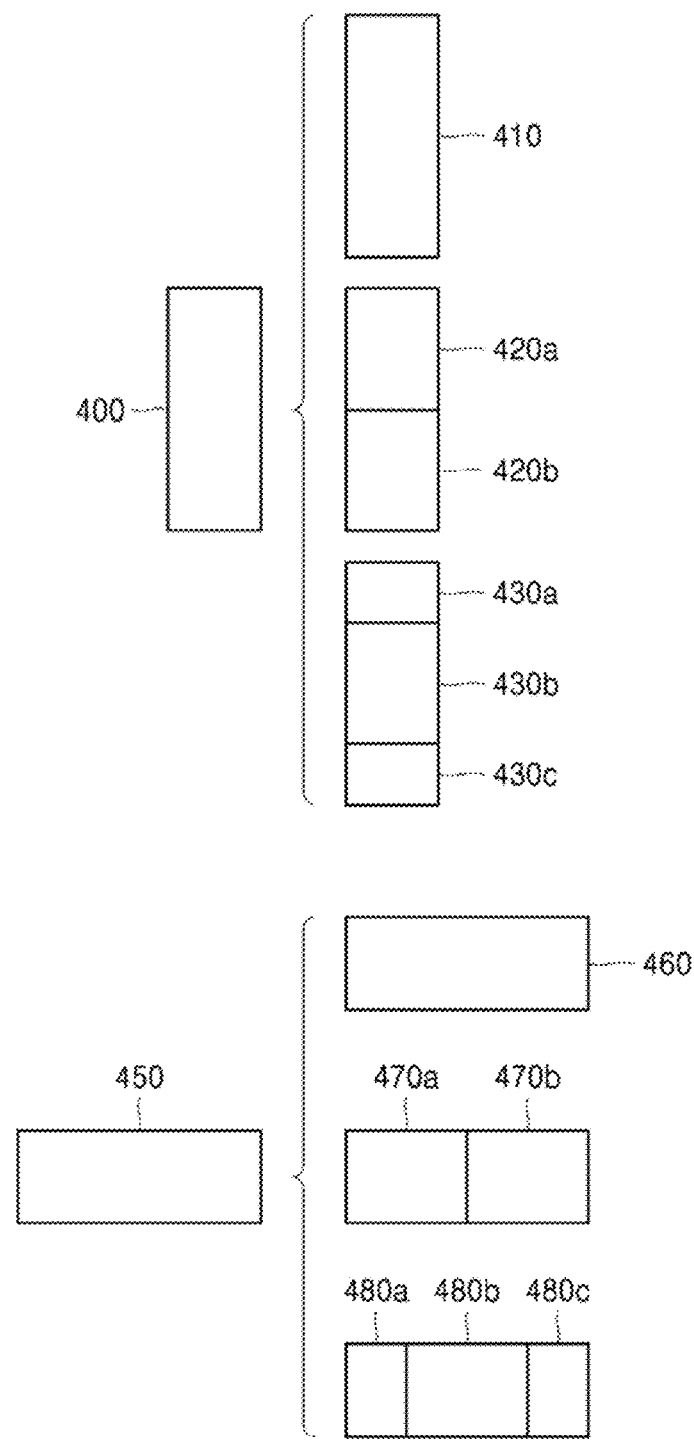
FIG. 4 illustrates a process, performed by an image decoding apparatus, of determining at least one coding unit by splitting a non-square coding unit, according to an embodiment.

FIG. 4 illustrates a process, performed by an image decoding apparatus, of determining at least one coding unit by splitting a non-square coding unit, according to an embodiment.

According to an embodiment, the image decoding apparatus 100 may use block shape information indicating that a current coding unit has a non-square shape. The image decoding apparatus 100 may determine whether not to split the non-square current coding unit or whether to split the non-square current coding unit by using a certain splitting method, based on split shape mode information. Referring to FIG. 4, when the block shape information of a current coding unit 400 or 450 indicates a non-square shape, the image decoding apparatus 100 may determine that a coding unit 410 or 460 having the same size as the current coding unit 400 or 450 is not split, based on the split shape mode information indicating not to perform splitting, or determine coding units 420*a* and 420*b*, 430*a* to 430*c*, 470*a* and 470*b*, or 480*a* to 480*c* split based on the split shape mode information indicating a certain splitting method. Certain splitting methods of splitting a non-square coding unit will be described in detail below in relation to various embodiments.

According to an embodiment, the image decoding apparatus 100 may determine a splitting method of a coding unit by using the split shape mode information and, in this case, the split shape mode information may indicate the number of one or more coding units generated by splitting a coding unit. Referring to FIG. 4, when the split shape mode information indicates to split the current coding unit 400 or 450 into two coding units, the image decoding apparatus 100 may determine two coding units 420*a* and 420*b*, or 470*a* and 470*b* included in the current coding unit 400 or 450, by splitting the current coding unit 400 or 450 based on the split shape mode information.

According to an embodiment, when the image decoding apparatus 100 splits the non-square current coding unit 400 or 450 based on the split shape mode information, the image decoding apparatus 100 may consider the location of a long side of the non-square current coding unit 400 or 450 to split a current coding unit. For example, the image decoding apparatus 100 may determine a plurality of coding units by splitting a long side of the current coding unit 400 or 450, in consideration of the shape of the current coding unit 400 or 450.

According to an embodiment, when the split shape mode information indicates to split (ternary-split) a coding unit into an odd number of blocks, the image decoding apparatus 100 may determine an odd number of coding units included in the current coding unit 400 or 450. For example, when the split shape mode information indicates to split the current coding unit 400 or 450 into three coding units, the image decoding apparatus 100 may split the current coding unit 400 or 450 into three coding units 430*a*, 430*b*, and 430*c*, or 480*a*, 480*b*, and 480*c*.

According to an embodiment of the disclosure, a ratio of the width and height of the current coding unit 400 or 450 may be 4:1 or 1:4. When the ratio of the width and height is 4:1, the block shape information may be a horizontal direction because the length of the width is longer than the length of the height. When the ratio of the width and height is 1:4, the block shape information may be a vertical direction because the length of the width is shorter than the length of the height. The image decoding apparatus 100 may determine to split a current coding unit into the odd number of blocks, based on the split shape mode information. Also, the image decoding apparatus 100 may determine a split direction of the current coding unit 400 or 450, based on the block shape information of the current coding unit 400 or 450. For example, when the current coding unit 400 is in the vertical direction, the image decoding apparatus 100 may determine the coding units 430a to 430c by splitting the current coding unit 400 in the horizontal direction. Also, when the current coding unit 450 is in the horizontal direction, the image decoding apparatus 100 may determine the coding units 480a to 480c by splitting the current coding unit 450 in the vertical direction.

According to an embodiment of the disclosure, the image decoding apparatus 100 may determine the odd number of coding units included in the current coding unit 400 or 450, and not all the determined coding units may have the same size. For example, a certain coding unit 430b or 480b from among the determined odd number of coding units 430a, 430b, and 430c, or 480a, 480b, and 480c may have a size different from the size of the other coding units 430a and 430c, or 480a and 480c. That is, coding units which may be determined by splitting the current coding unit 400 or 450 may have multiple sizes and, in some cases, all of the odd number of coding units 430a, 430b, and 430c, or 480a, 480b, and 480c may have different sizes.

According to an embodiment, when the split shape mode information indicates to split a coding unit into the odd number of blocks, the image decoding apparatus 100 may determine the odd number of coding units included in the current coding unit 400 or 450, and in addition, may put a certain restriction on at least one coding unit from among the odd number of coding units generated by splitting the current coding unit 400 or 450. Referring to FIG. 4, the image decoding apparatus 100 may set a decoding process regarding the coding unit 430b or 480b located at the center among the three coding units 430a, 430b, and 430c or 480a, 480b, and 480c generated as the current coding unit 400 or 450 is split to be different from that of the other coding units 430a and 430c, or 480a or 480c. For example, the image decoding apparatus 100 may restrict the coding unit 430b or 480b at the center location to be no longer split or to be split only a certain number of times, unlike the other coding units 430a and 430c, or 480a and 480c.

Figure 5:
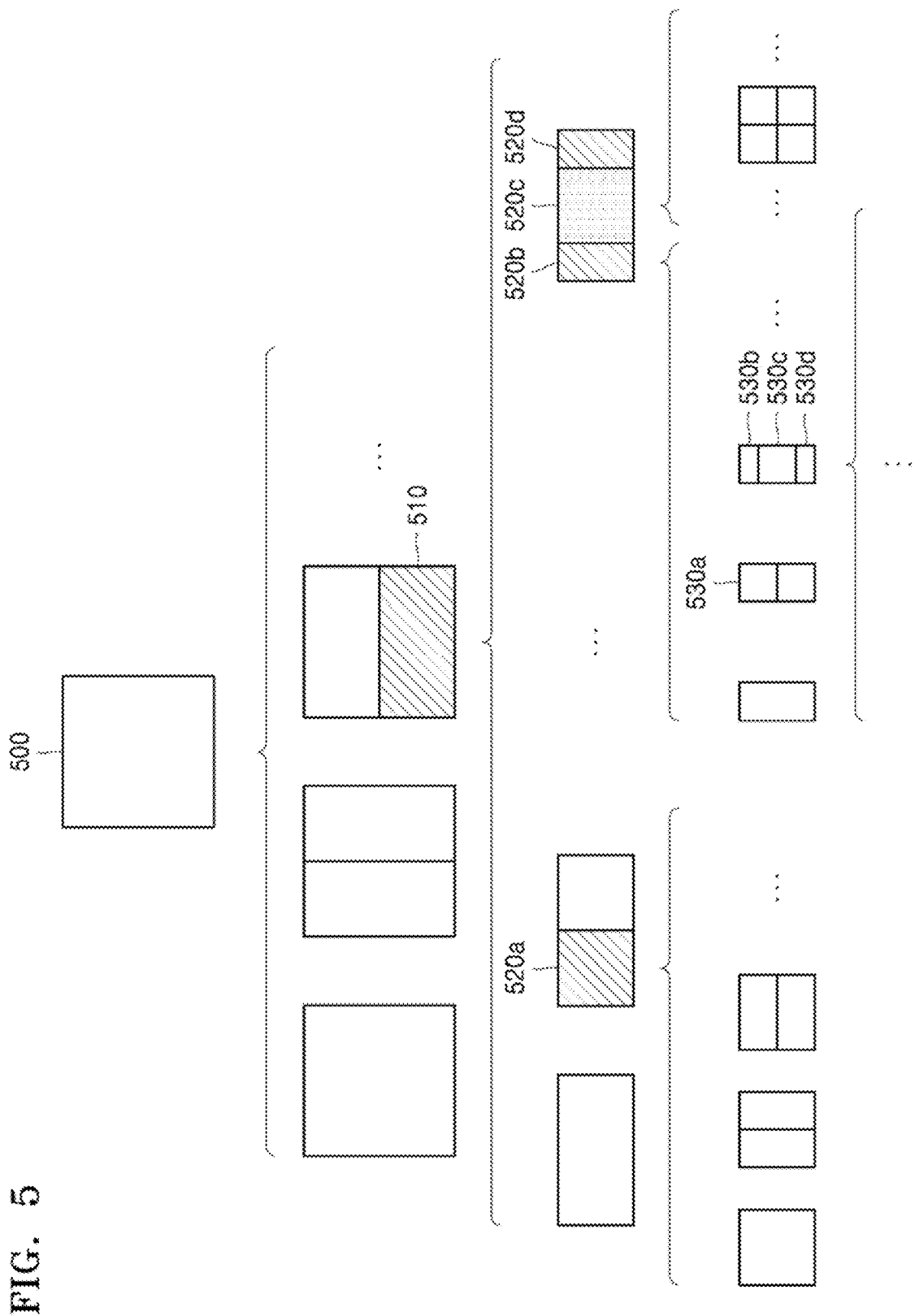
FIG. 5 illustrates a process, performed by an image decoding apparatus, of splitting a coding unit based on at least one of block shape information and split shape mode information, according to an embodiment.

FIG. 5 illustrates a process, performed by an image decoding apparatus, of splitting a coding unit based on at least one of block shape information and split shape mode information, according to an embodiment.

According to an embodiment, the image decoding apparatus 100 may determine to split or not to split a square first coding unit 500 into coding units, based on at least one of the block shape information or the split shape mode information. According to an embodiment, when the split shape mode information indicates to split the first coding unit 500 in a horizontal direction, the image decoding apparatus 100 may determine a second coding unit 510 by splitting the first coding unit 500 in a horizontal direction. A first coding unit, a second coding unit, and a third coding unit used according to an embodiment of the disclosure are terms used to understand a relation before and after splitting a coding unit. For example, a second coding unit may be determined by splitting a first coding unit, and a third coding unit may be determined by splitting the second coding unit. It will be understood that the structure of the first coding unit, the second coding unit, and the third coding unit follows the above descriptions.

According to an embodiment, the image decoding apparatus 100 may determine to split or not to split the determined second coding unit 510 into coding units, based on the split shape mode information. Referring to FIG. 5, the image decoding apparatus 100 may or may not split the non-square second coding unit 510, which is determined by splitting the first coding unit 500, into one or more third coding units 520a, or 520b, 520c, and 520d based on the split shape mode information. The image decoding apparatus 100 may obtain the split shape mode information, and may obtain a plurality of various-shaped second coding units (e.g., the second coding unit 510) by splitting the first coding unit 500, based on the obtained split shape mode information, and the second coding unit 510 may be split by using a splitting method of the first coding unit 500 based on the split shape mode information. According to an embodiment, when the first coding unit 500 is split into the second coding units 510 based on the split shape mode information of the first coding unit 500, the second coding unit 510 may also be split into the third coding units 520a, or 520b, 520c, and 520d based on the split shape mode information of the second coding unit 510. That is, a coding unit may be recursively split based on the split shape mode information of each coding unit. Therefore, a square coding unit may be determined by splitting a non-square coding unit, and a non-square coding unit may be determined by recursively splitting the square coding unit.

Referring to FIG. 5, a certain coding unit from among the odd number of third coding units 520b, 520c, and 520d determined by splitting the non-square second coding unit 510 (e.g., a coding unit at a center location or a square coding unit) may be recursively split. According to an embodiment, the square third coding unit 520c from among the odd number of third coding units 520b, 520c, and 520d may be split in a horizontal direction into a plurality of fourth coding units. A non-square fourth coding unit 530b or 530d from among a plurality of fourth coding units 530a, 530b, 530c, and 530d may be split into a plurality of coding units again. For example, the non-square fourth coding unit 530b or 530d may be split into the odd number of coding units again. A method that may be used to recursively split a coding unit will be described below in relation to various embodiments.

According to an embodiment, the image decoding apparatus 100 may split each of the third coding units 520a, or 520b, 520c, and 520d into coding units, based on the split shape mode information. Also, the image decoding apparatus 100 may determine not to split the second coding unit 510 based on the split shape mode information. According to an embodiment, the image decoding apparatus 100 may split the non-square second coding unit 510 into the odd number of third coding units 520b, 520c, and 520d. The image decoding apparatus 100 may put a certain restriction on a certain third coding unit from among the odd number of third coding units 520b, 520c, and 520d. For example, the image decoding apparatus 100 may restrict the third coding unit 520c at a center location from among the odd number of third coding units 520b, 520c, and 520d to be no longer split or to be split a settable number of times.

Referring to FIG. 5, the image decoding apparatus 100 may restrict the third coding unit 520c, which is at the center location from among the odd number of third coding units 520b, 520c, and 520d included in the non-square second coding unit 510, to be no longer split, to be split by using a certain splitting method (e.g., split into only four coding units or split by using a splitting method of the second coding unit 510), or to be split only a certain number of times (e.g., split only n times (where n>0)). However, the restrictions on the third coding unit 520*c* at the center location are not limited to the above-described examples, and may include various restrictions for decoding the third coding unit 520*c* at the center location differently from the other third coding units 520*b* and 520*d*.

According to an embodiment of the disclosure, the image decoding apparatus 100 may obtain the split shape mode information, which is used to split a current coding unit, from a certain location in the current coding unit.

Figure 6:
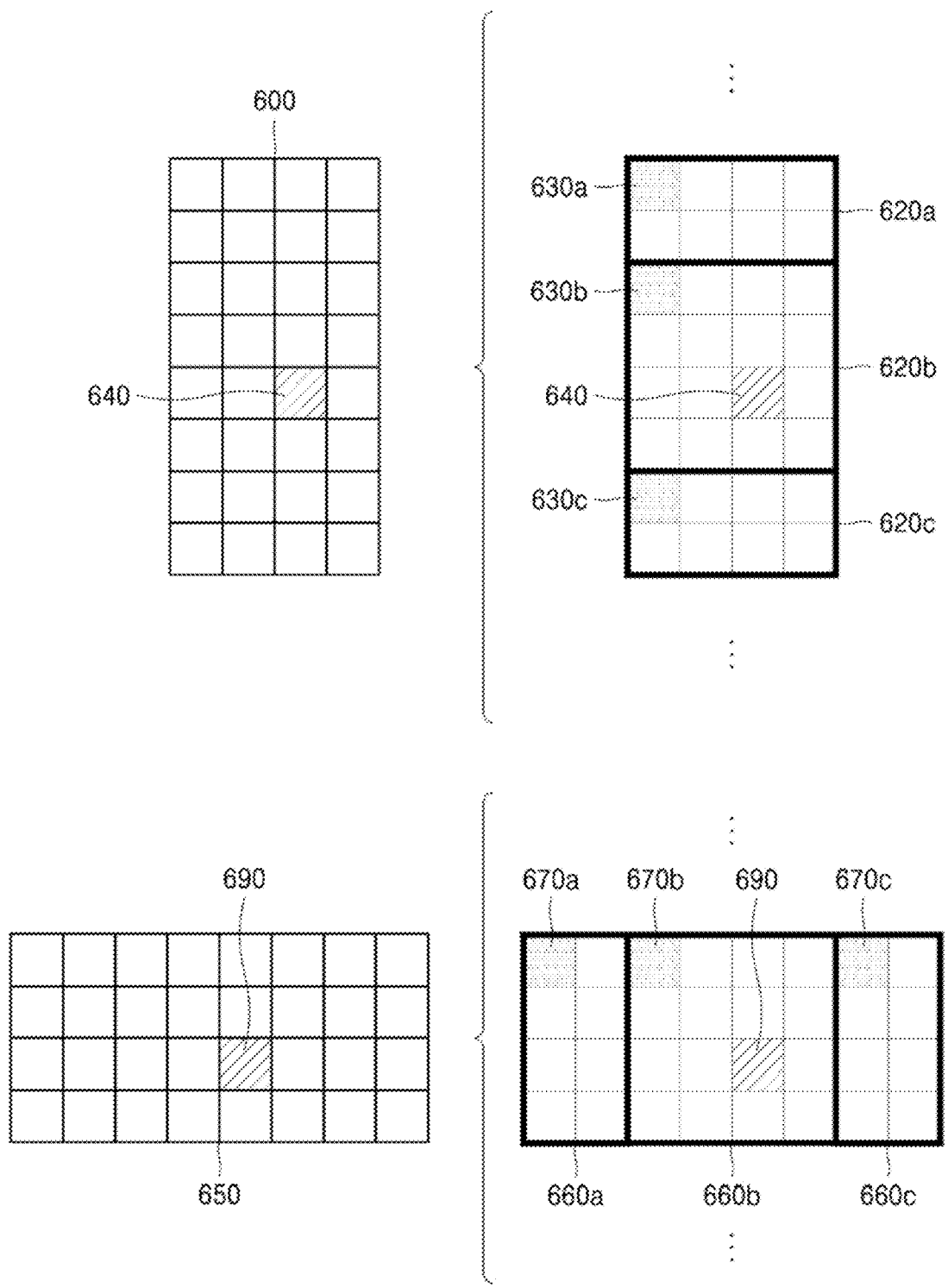
FIG. 6 illustrates a method, performed by an image decoding apparatus, of determining a predetermined coding unit from among an odd number of coding units, according to an embodiment.

FIG. 6 illustrates a method, performed by an image decoding apparatus, of determining a predetermined coding unit from among an odd number of coding units, according to an embodiment.

Referring to FIG. 6, split shape mode information of a current coding unit 600 or 650 may be obtained from a sample of a certain location (e.g., a sample 640 or 690 of a center location) from among a plurality of samples included in the current coding unit 600 or 650. However, the certain location in the current coding unit 600, from which at least one piece of the split shape mode information may be obtained, is not limited to the center location in FIG. 6, and may include various locations included in the current coding unit 600 (e.g., top, bottom, left, right, upper left, lower left, upper right, and lower right locations). The image decoding apparatus 100 may obtain the split shape mode information from the certain location and may determine to split or not to split the current coding unit into various-shaped and various-sized coding units.

According to an embodiment, when the current coding unit is split into a certain number of coding units, the image decoding apparatus 100 may select one of the coding units. Various methods may be used to select one of a plurality of coding units, as will be described below in relation to various embodiments.

According to an embodiment, the image decoding apparatus 100 may split the current coding unit into a plurality of coding units, and may determine a coding unit at a certain location.

According to an embodiment, image decoding apparatus 100 may use information indicating locations of the odd number of coding units, to determine a coding unit at a center location from among the odd number of coding units. Referring to FIG. 6, the image decoding apparatus 100 may determine the odd number of coding units 620*a*, 620*b*, and 620*c* or the odd number of coding units 660*a*, 660*b*, and 660*c* by splitting the current coding unit 600 or the current coding unit 650. The image decoding apparatus 100 may determine the middle coding unit 620*b* or the middle coding unit 660*b* by using information about the locations of the odd number of coding units 620*a*, 620*b*, and 620*c* or the odd number of coding units 660*a*, 660*b*, and 660*c*. For example, the image decoding apparatus 100 may determine the coding unit 620*b* of the center location by determining the locations of the coding units 620*a*, 620*b*, and 620*c* based on information indicating locations of certain samples included in the coding units 620*a*, 620*b*, and 620*c*. In detail, the image decoding apparatus 100 may determine the coding unit 620*b* at the center location by determining the locations of the coding units 620*a*, 620*b*, and 620*c* based on information indicating locations of upper left samples 630*a*, 630*b*, and 630*c* of the coding units 620*a*, 620*b*, and 620*c*.

According to an embodiment, the information indicating the locations of the upper left samples 630*a*, 630*b*, and 630*c*, which are included in the coding units 620*a*, 620*b*, and 620*c*, respectively, may include information about locations or coordinates of the coding units 620*a*, 620*b*, and 620*c* in a picture. According to an embodiment, the information indicating the locations of the upper left samples 630*a*, 630*b*, and 630*c*, which are included in the coding units 620*a*, 620*b*, and 620*c*, respectively, may include information indicating widths or heights of the coding units 620*a*, 620*b*, and 620*c* included in the current coding unit 600, and the widths or heights may correspond to information indicating differences between the coordinates of the coding units 620*a*, 620*b*, and 620*c* in the picture. That is, the image decoding apparatus 100 may determine the coding unit 620*b* at the center location by directly using the information about the locations or coordinates of the coding units 620*a*, 620*b*, and 620*c* in the picture, or by using the information about the widths or heights of the coding units, which correspond to the difference values between the coordinates.

According to an embodiment, information indicating the location of the upper left sample 630*a* of the upper coding unit 620*a* may include coordinates (xa, ya), information indicating the location of the upper left sample 630*b* of the middle coding unit 620*b* may include coordinates (xb, yb), and information indicating the location of the upper left sample 630*c* of the lower coding unit 620*c* may include coordinates (xc, yc). The image decoding apparatus 100 may determine the middle coding unit 620*b* by using the coordinates of the upper left samples 630*a*, 630*b*, and 630*c* which are included in the coding units 620*a*, 620*b*, and 620*c*, respectively. For example, when the coordinates of the upper left samples 630*a*, 630*b*, and 630*c* are sorted in an ascending or descending order, the coding unit 620*b* including the coordinates (xb, yb) of the sample 630*b* at a center location may be determined as a coding unit at a center location from among the coding units 620*a*, 620*b*, and 620*c* determined by splitting the current coding unit 600. However, the coordinates indicating the locations of the upper left samples 630*a*, 630*b*, and 630*c* may include coordinates indicating absolute locations in the picture, or may use coordinates (dxb, dyb) indicating a relative location of the upper left sample 630*b* of the middle coding unit 620*b* and coordinates (dxc, dyc) indicating a relative location of the upper left sample 630*c* of the lower coding unit 620*c* with reference to the location of the upper left sample 630*a* of the upper coding unit 620*a*. A method of determining a coding unit at a certain location by using coordinates of a sample included in the coding unit, as information indicating a location of the sample, is not limited to the above-described method, and may include various arithmetic methods capable of using the coordinates of the sample.

According to an embodiment, the image decoding apparatus 100 may split the current coding unit 600 into a plurality of coding units 620*a*, 620*b*, and 620*c*, and may select one of the coding units 620*a*, 620*b*, and 620*c* based on a certain criterion. For example, the image decoding apparatus 100 may select the coding unit 620*b*, which has a size different from that of the others, from among the coding units 620*a*, 620*b*, and 620*c*.

According to an embodiment, the image decoding apparatus 100 may determine the width or height of each of the coding units 620*a*, 620*b*, and 620*c* by using the coordinates (xa, ya) that is the information indicating the location of the upper left sample 630*a* of the upper coding unit 620*a*, the coordinates (xb, yb) that is the information indicating the location of the upper left sample 630*b* of the middle coding unit 620*b*, and the coordinates (xc, yc) that is the information indicating the location of the upper left sample 630*c* of the lower coding unit 620c. The image decoding apparatus 100 may determine the respective sizes of the coding units 620a, 620b, and 620c by using the coordinates (xa, ya), (xb, yb), and (xc, yc) indicating the locations of the coding units 620a, 620b, and 620c. According to an embodiment, the image decoding apparatus 100 may determine the width of the upper coding unit 620a to be the width of the current coding unit 600. The image decoding apparatus 100 may determine the height of the upper coding unit 620a to be yb-ya. According to an embodiment, the image decoding apparatus 100 may determine the width of the middle coding unit 620b to be the width of the current coding unit 600. The image decoding apparatus 100 may determine the height of the middle coding unit 620b to be ya-yb. According to an embodiment, the image decoding apparatus 100 may determine the width or height of the lower coding unit 620c by using the width or height of the current coding unit 600 or the widths or heights of the upper and middle coding units 620a and 620b. The image decoding apparatus 100 may determine a coding unit, which has a size different from that of the others, based on the determined widths and heights of the coding units 620a to 620c. Referring to FIG. 6, the image decoding apparatus 100 may determine the middle coding unit 620b, which has a size different from the size of the upper and lower coding units 620a and 620c, as the coding unit of the certain location. However, the above-described method, performed by the image decoding apparatus 100, of determining a coding unit having a size different from the size of the other coding units merely corresponds to an example of determining a coding unit at a certain location by using the sizes of coding units, which are determined based on coordinates of samples, and thus various methods of determining a coding unit at a certain location by comparing the sizes of coding units, which are determined based on coordinates of certain samples, may be used.

The image decoding apparatus 100 may determine the width or height of each of the coding units 660a, 660b, and 660c by using the coordinates (xd, yd) that is information indicating the location of a upper left sample 670a of the left coding unit 660a, the coordinates (xe, ye) that is information indicating the location of a upper left sample 670b of the middle coding unit 660b, and the coordinates (xf, yf) that is information indicating a location of the upper left sample 670c of the right coding unit 660c. The image decoding apparatus 100 may determine the respective sizes of the coding units 660a, 660b, and 660c by using the coordinates (xd, yd), (xe, ye), and (xf, yf) indicating the locations of the coding units 660a, 660b, and 660c.

According to an embodiment, the image decoding apparatus 100 may determine the width of the left coding unit 660a to be xe-xd. The image decoding apparatus 100 may determine the height of the left coding unit 660a to be the height of the current coding unit 650. According to an embodiment, the image decoding apparatus 100 may determine the width of the middle coding unit 660b to be xf-xe. The image decoding apparatus 100 may determine the height of the middle coding unit 660b to be the height of the current coding unit 650. According to an embodiment, the image decoding apparatus 100 may determine the width or height of the right coding unit 660c by using the width or height of the current coding unit 650 or the widths or heights of the left and middle coding units 660a and 660b. The image decoding apparatus 100 may determine a coding unit, which has a size different from that of the others, based on the determined widths and heights of the coding units 660a to 660c. Referring to FIG. 6, the image decoding apparatus 100 may determine the middle coding unit 660b, which has a size different from the sizes of the left and right coding units 660a and 660c, as the coding unit of the certain location. However, the above-described method, performed by the image decoding apparatus 100, of determining a coding unit having a size different from the size of the other coding units merely corresponds to an example of determining a coding unit at a certain location by using the sizes of coding units, which are determined based on coordinates of samples, and thus various methods of determining a coding unit at a certain location by comparing the sizes of coding units, which are determined based on coordinates of certain samples, may be used.

However, locations of samples considered to determine locations of coding units are not limited to the above-described upper left locations, and information about arbitrary locations of samples included in the coding units may be used.

According to an embodiment, the image decoding apparatus 100 may select a coding unit at a certain location from among an odd number of coding units determined by splitting the current coding unit, considering the shape of the current coding unit. For example, when the current coding unit has a non-square shape, a width of which is longer than a height, the image decoding apparatus 100 may determine the coding unit at the certain location in a horizontal direction. That is, the image decoding apparatus 100 may determine one of coding units at different locations in a horizontal direction and put a restriction on the coding unit. When the current coding unit has a non-square shape, a height of which is longer than a width, the image decoding apparatus 100 may determine the coding unit at the certain location in a vertical direction. That is, the image decoding apparatus 100 may determine one of coding units at different locations in a vertical direction and may put a restriction on the coding unit.

According to an embodiment, the image decoding apparatus 100 may use information indicating respective locations of an even number of coding units, to determine the coding unit at the certain location from among the even number of coding units. The image decoding apparatus 100 may determine an even number of coding units by splitting (binary-splitting) the current coding unit, and may determine the coding unit at the certain location by using the information about the locations of the even number of coding units. An operation related thereto may correspond to the operation of determining a coding unit at a certain location (e.g., a center location) from among an odd number of coding units, which has been described in detail above in relation to FIG. 6, and thus detailed descriptions thereof are not provided here.

According to an embodiment, when a non-square current coding unit is split into a plurality of coding units, certain information about a coding unit at a certain location may be used in a splitting operation to determine the coding unit at the certain location from among the plurality of coding units. For example, the image decoding apparatus 100 may use at least one of block shape information or split shape mode information, which is stored in a sample included in a middle coding unit, in a splitting operation to determine a coding unit at a center location from among the plurality of coding units determined by splitting the current coding unit.

Referring to FIG. 6, the image decoding apparatus 100 may split the current coding unit 600 into the plurality of coding units 620a, 620b, and 620c based on the split shape mode information, and may determine the coding unit 620b at a center location from among the plurality of the coding units 620a, 620b, and 620c. Furthermore, the image decoding apparatus 100 may determine the coding unit 620b at the center location, in consideration of a location from which the split shape mode information is obtained. That is, the split shape mode information of the current coding unit 600 may be obtained from the sample 640 at a center location of the current coding unit 600 and, when the current coding unit 600 is split into the plurality of coding units 620a, 620b, and 620c based on the split shape mode information, the coding unit 620b including the sample 640 may be determined as the coding unit at the center location. However, information used to determine the coding unit at the center location is not limited to the split shape mode information, and various types of information may be used to determine the coding unit at the center location.

According to an embodiment, certain information for identifying the coding unit at the certain location may be obtained from a certain sample included in a coding unit to be determined. Referring to FIG. 6, the image decoding apparatus 100 may use the split shape mode information, which is obtained from a sample at a certain location in the current coding unit 600 (e.g., a sample at a center location of the current coding unit 600) to determine a coding unit at a certain location from among the plurality of the coding units 620a, 620b, and 620c determined by splitting the current coding unit 600 (e.g., a coding unit at a center location from among a plurality of split coding units). That is, the image decoding apparatus 100 may determine the sample at the certain location by considering a block shape of the current coding unit 600, determine the coding unit 620b including a sample, from which certain information (e.g., the split shape mode information) may be obtained, from among the plurality of coding units 620a, 620b, and 620c determined by splitting the current coding unit 600, and may put a certain restriction on the coding unit 620b. Referring to FIG. 6, according to an embodiment, the image decoding apparatus 100 may determine the sample 640 at the center location of the current coding unit 600 as the sample from which the certain information may be obtained, and may put a certain restriction on the coding unit 620b including the sample 640, in a decoding operation. However, the location of the sample from which the certain information may be obtained is not limited to the above-described location, and may include arbitrary locations of samples included in the coding unit 620b to be determined for a restriction.

According to an embodiment, the location of the sample from which the certain information may be obtained may be determined based on the shape of the current coding unit 600. According to an embodiment, the block shape information may indicate whether the current coding unit has a square or non-square shape, and the location of the sample from which the certain information may be obtained may be determined based on the shape. For example, the image decoding apparatus 100 may determine a sample located on a boundary for splitting at least one of a width or height of the current coding unit in half, as the sample from which the certain information may be obtained, by using at least one of information about the width of the current coding unit or information about the height of the current coding unit. As another example, when the block shape information of the current coding unit indicates a non-square shape, the image decoding apparatus 100 may determine one of samples including a boundary for splitting a long side of the current coding unit in half, as the sample from which the predetermined information may be obtained.

According to an embodiment, when the current coding unit is split into a plurality of coding units, the image decoding apparatus 100 may use the split shape mode information to determine a coding unit at a certain location from among the plurality of coding units. According to an embodiment, the image decoding apparatus 100 may obtain the split shape mode information from a sample at a certain location in a coding unit, and split the plurality of coding units, which are generated by splitting the current coding unit, by using the split shape mode information, which is obtained from the sample of the certain location in each of the plurality of coding units. That is, a coding unit may be recursively split based on the split shape mode information, which is obtained from the sample at the certain location in each coding unit. An operation of recursively splitting a coding unit has been described above in relation to FIG. 5, and thus detailed descriptions thereof will not be provided here.

According to an embodiment, the image decoding apparatus 100 may determine one or more coding units by splitting the current coding unit, and may determine an order of decoding the one or more coding units, based on a certain block (e.g., the current coding unit).

Figure 7:
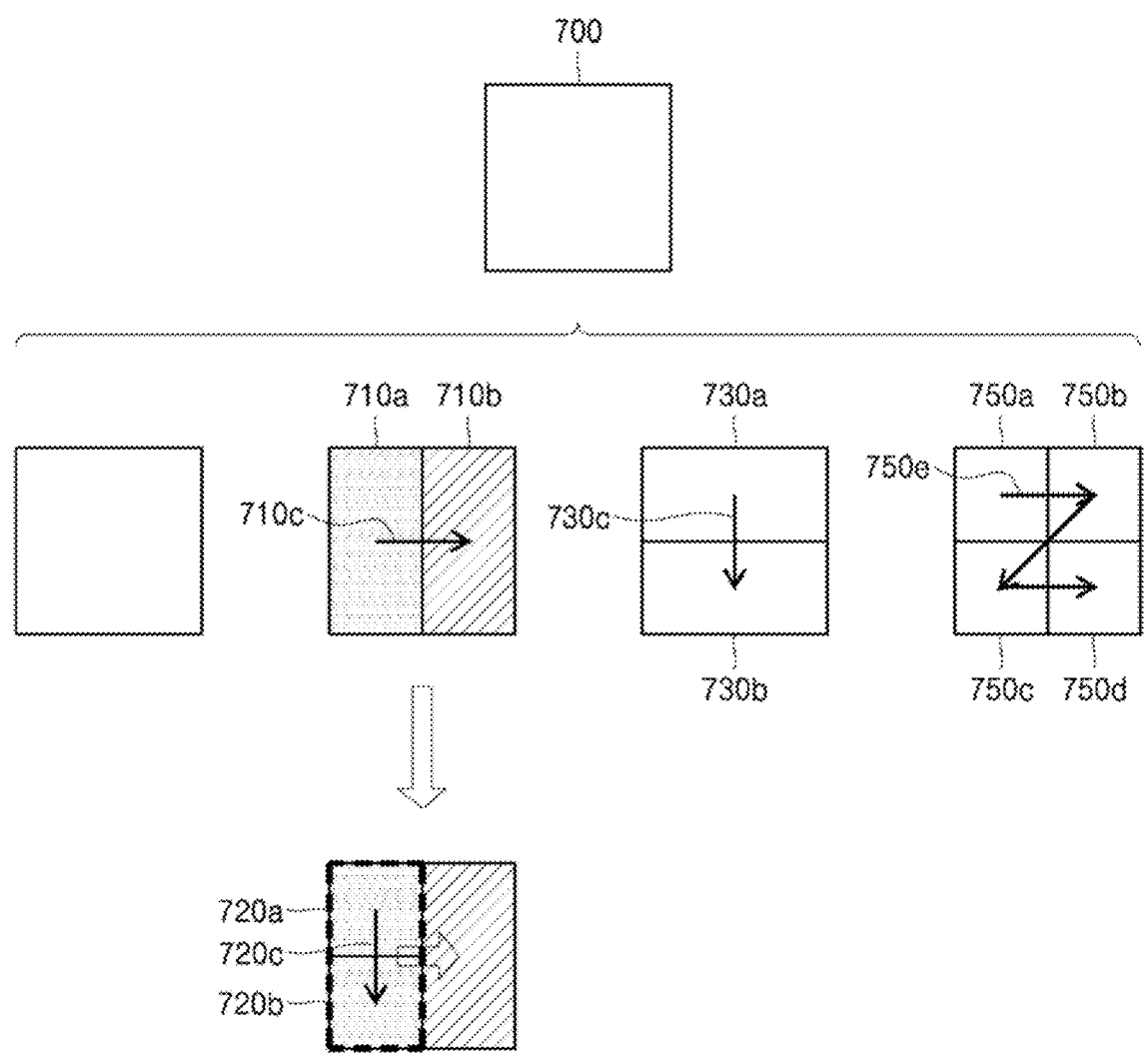
FIG. 7 illustrates an order of processing a plurality of coding units when an image decoding apparatus determines the plurality of coding units by splitting a current coding unit, according to an embodiment.

FIG. 7 illustrates an order of processing a plurality of coding units when an image decoding apparatus determines the plurality of coding units by splitting a current coding unit, according to an embodiment.

According to an embodiment, the image decoding apparatus 100 may determine second coding units 710a and 710b by splitting a first coding unit 700 in a vertical direction, determine second coding units 730a and 730b by splitting the first coding unit 700 in a horizontal direction, or determine second coding units 750a to 750d by splitting the first coding unit 700 in vertical and horizontal directions, based on split shape mode information.

Referring to FIG. 7, the image decoding apparatus 100 may determine to process the second coding units 710a and 710b, which are determined by splitting the first coding unit 700 in a vertical direction, in a horizontal direction order 710c. The image decoding apparatus 100 may determine to process the second coding units 730a and 730b, which are determined by splitting the first coding unit 700 in a horizontal direction, in a vertical direction order 730c. The image decoding apparatus 100 may determine to process the second coding units 750a to 750d, which are determined by splitting the first coding unit 700 in vertical and horizontal directions, in a certain order for processing coding units in a row and then processing coding units in a next row (e.g., in a raster scan order or Z-scan order 750e).

According to an embodiment, the image decoding apparatus 100 may recursively split coding units. Referring to FIG. 7, the image decoding apparatus 100 may determine the plurality of coding units 710a and 710b, 730a and 730b, or 750a to 750d by splitting the first coding unit 700, and recursively split each of the determined plurality of coding units 710b, 730a and 730b, or 750a to 750d. A splitting method of the plurality of coding units 710b, 730a and 730b, or 750a to 750d may correspond to a splitting method of the first coding unit 700. As such, each of the plurality of coding units 710b, 730a and 730b, or 750a to 750d may be independently split into a plurality of coding units. Referring to FIG. 7, the image decoding apparatus 100 may determine the second coding units 710a and 710b by splitting the first coding unit 700 in a vertical direction, and may determine to independently split or not to split each of the second coding units 710a and 710b.

According to an embodiment, the image decoding apparatus 100 may determine third coding units 720a and 720b by splitting the left second coding unit 710a in a horizontal direction, and may not split the right second coding unit 710b.

According to an embodiment, a processing order of coding units may be determined based on an operation of splitting a coding unit. In other words, a processing order of split coding units may be determined based on a processing order of coding units immediately before being split. The image decoding apparatus 100 may determine a processing order of the third coding units 720a and 720b determined by splitting the left second coding unit 710a, independently of the right second coding unit 710b. Because the third coding units 720a and 720b are determined by splitting the left second coding unit 710a in a horizontal direction, the third coding units 720a and 720b may be processed in a vertical direction order 720c. Because the left and right second coding units 710a and 710b are processed in the horizontal direction order 710c, the right second coding unit 710b may be processed after the third coding units 720a and 720b included in the left second coding unit 710a are processed in the vertical direction order 720c. An operation of determining a processing order of coding units based on a coding unit before being split is not limited to the above-described example, and various methods may be used to independently process coding units, which are split and determined to various shapes, in a certain order.

Figure 8:
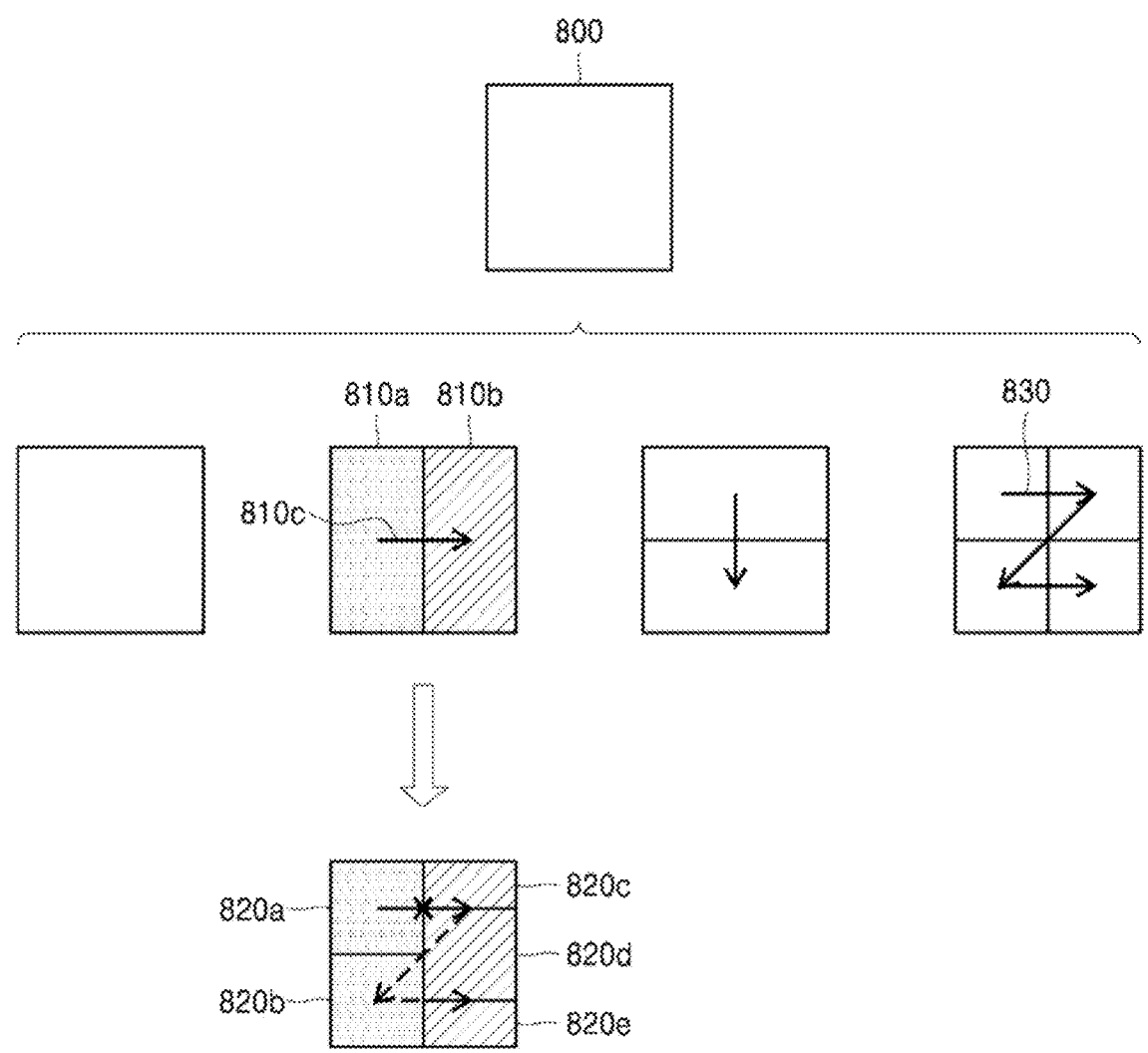
FIG. 8 illustrates a process, performed by an image decoding apparatus, of determining that a current coding unit is to be split into an odd number of coding units, when the coding units are not processable in a predetermined order, according to an embodiment.

FIG. 8 illustrates a process, performed by an image decoding apparatus, of determining that a current coding unit is to be split into an odd number of coding units, when the coding units are not processable in a predetermined order, according to an embodiment.

According to an embodiment, the image decoding apparatus 100 may determine whether the current coding unit is split into an odd number of coding units, based on obtained split shape mode information. Referring to FIG. 8, a square first coding unit 800 may be split into non-square second coding units 810a and 810b, and the second coding units 810a and 810b may be independently split into third coding units 820a and 820b, and 820c to 820e. According to an embodiment, the image decoding apparatus 100 may determine the plurality of third coding units 820a and 820b by splitting the left second coding unit 810a in a horizontal direction, and may split the right second coding unit 810b into the odd number of third coding units 820c to 820e.

According to an embodiment, the image decoding apparatus 100 may determine whether any coding unit is split into an odd number of coding units, by determining whether the third coding units 820a and 820b, and 820c to 820e are processable in a certain order. Referring to FIG. 8, the image decoding apparatus 100 may determine the third coding units 820a and 820b, and 820c to 820e by recursively splitting the first coding unit 800. The image decoding apparatus 100 may determine whether any of the first coding unit 800, the second coding units 810a and 810b, and the third coding units 820a and 820b, and 820c to 820e are split into an odd number of coding units, based on at least one of the block shape information or the split shape mode information. For example, the right second coding unit 810b among the second coding units 810a and 810b may be split into an odd number of third coding units 820c, 820d, and 820e. A processing order of a plurality of coding units included in the first coding unit 800 may be a certain order (e.g., a Z-scan order 830), and the image decoding apparatus 100 may determine whether the third coding units 820c, 820d, and 820e, which are determined by splitting the right second coding unit 810b into an odd number of coding units, satisfy a condition for processing in the certain order.

According to an embodiment, the image decoding apparatus 100 may determine whether the third coding units 820a and 820b, and 820c to 820e included in the first coding unit 800 satisfy the condition for processing in the certain order, and the condition relates to whether at least one of a width or height of the second coding units 810a and 810b is split in half along a boundary of the third coding units 820a and 820b, and 820c to 820e. For example, the third coding units 820a and 820b determined when the height of the left second coding unit 810a of the non-square shape is split in half may satisfy the condition. It may be determined that the third coding units 820c to 820e do not satisfy the condition because the boundaries of the third coding units 820c to 820e determined when the right second coding unit 810b is split into three coding units are unable to split the width or height of the right second coding unit 810b in half. When the condition is not satisfied as described above, the image decoding apparatus 100 may determine disconnection of a scan order, and may determine that the right second coding unit 810b is split into an odd number of coding units, based on a result of the determination. According to an embodiment, when a coding unit is split into an odd number of coding units, the image decoding apparatus 100 may put a certain restriction on a coding unit at a certain location from among the split coding units. The restriction or the certain location has been described above in relation to various embodiments, and thus detailed descriptions thereof are not provided again.

Figure 9:
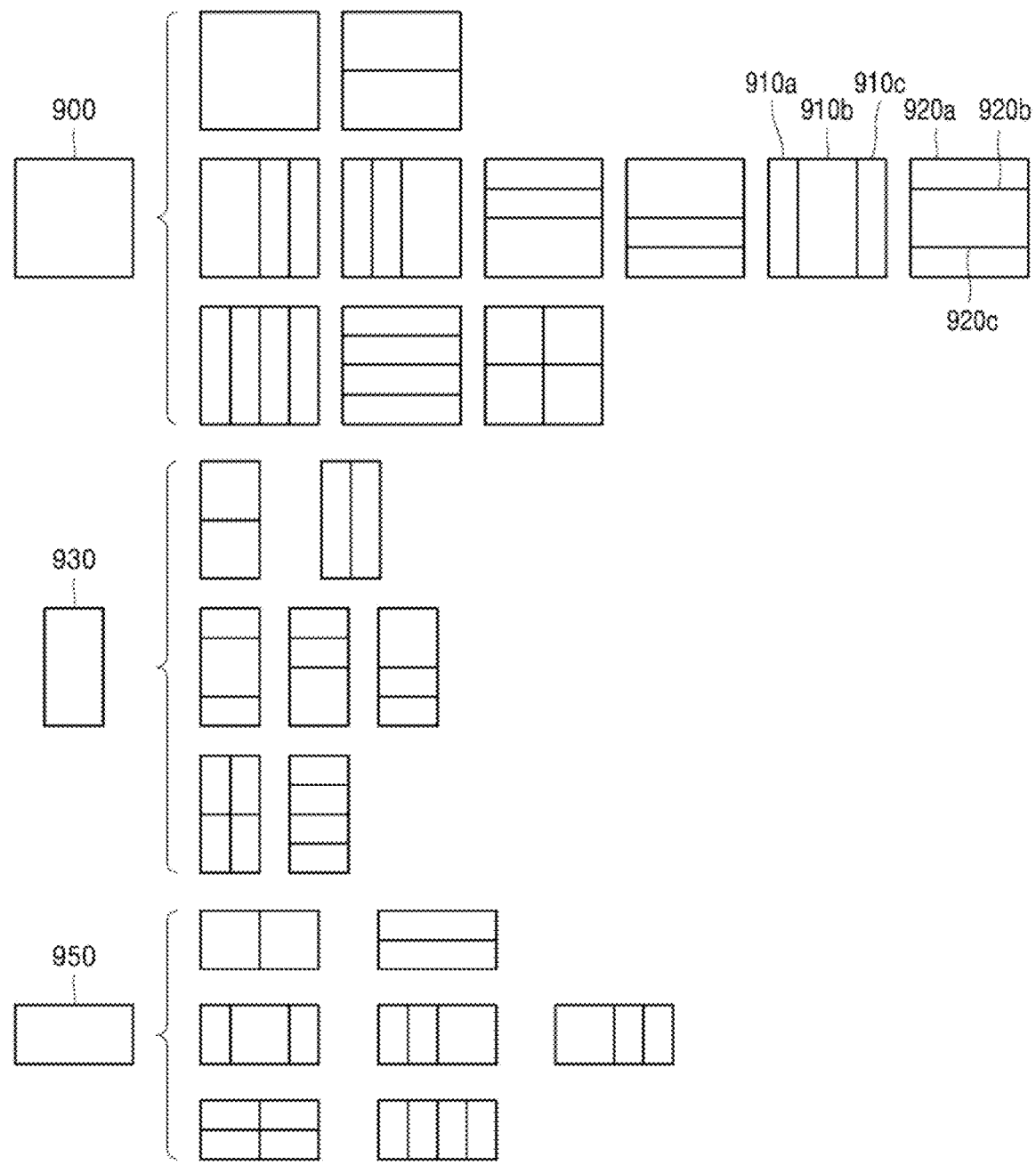
FIG. 9 illustrates a process, performed by an image decoding apparatus, of determining at least one coding unit by splitting a first coding unit, according to an embodiment.

FIG. 9 illustrates a process, performed by an image decoding apparatus, of determining at least one coding unit by splitting a first coding unit, according to an embodiment.

According to an embodiment, the image decoding apparatus 100 may split the first coding unit 900, based on split shape mode information, which is obtained through the receiver 110. The square first coding unit 900 may be split into four square coding units, or may be split into a plurality of non-square coding units. For example, referring to FIG. 9, when the split shape mode information indicates to split the first coding unit 900 into non-square coding units, the image decoding apparatus 100 may split the first coding unit 900 into a plurality of non-square coding units. In detail, when the split shape mode information indicates to determine an odd number of coding units by splitting the first coding unit 900 in a horizontal direction or a vertical direction, the image decoding apparatus 100 may split the square first coding unit 900 into an odd number of coding units, e.g., second coding units 910a, 910b, and 910c determined by splitting the square first coding unit 900 in a vertical direction or second coding units 920a, 920b, and 920c determined by splitting the square first coding unit 900 in a horizontal direction.

According to an embodiment, the image decoding apparatus 100 may determine whether the second coding units 910a, 910b, 910c, 920a, 920b, and 920c included in the first coding unit 900 satisfy a condition for processing in a certain order, and the condition relates to whether at least one of a width or height of the first coding unit 900 is split in half along a boundary of the second coding units 910a, 910b, 910c, 920a, 920b, and 920c. Referring to FIG. 9, because boundaries of the second coding units 910a, 910b, and 910c determined by splitting the square first coding unit 900 in a vertical direction do not split the width of the first coding unit 900 in half, it may be determined that the first coding unit 900 does not satisfy the condition for processing in the certain order. In addition, because boundaries of the second coding units 920a, 920b, and 920c determined by splitting the square first coding unit 900 in a horizontal direction do not split the width of the first coding unit 900 in half, it may be determined that the first coding unit 900 does not satisfy the condition for processing in the predetermined order. When the condition is not satisfied as described above, the image decoding apparatus 100 may decide disconnection of a scan order, and may determine that the first coding unit 900 is split into an odd number of coding units, based on a result of the decision. According to an embodiment, when a coding unit is split into an odd number of coding units, the image decoding apparatus 100 may put a certain restriction on a coding unit at a certain location from among the split coding units. The restriction or the certain location has been described above in relation to various embodiments, and thus detailed descriptions thereof are not provided again.

According to an embodiment, the image decoding apparatus 100 may determine various-shaped coding units by splitting a first coding unit.

Referring to FIG. 9, the image decoding apparatus 100 may split the square first coding unit 900 or a non-square first coding unit 930 or 950 into various-shaped coding units.

Figure 10:
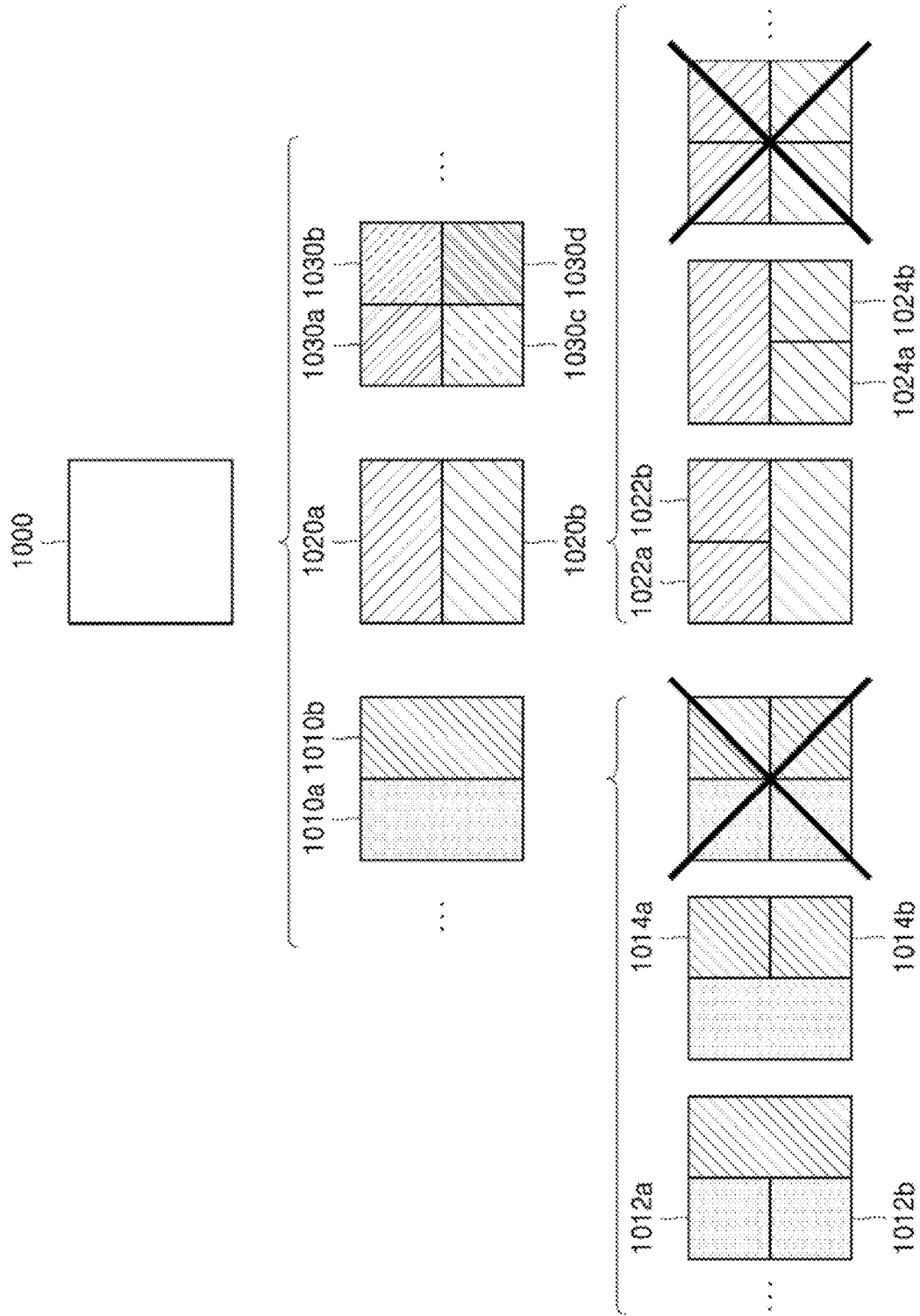
FIG. 10 illustrates that a shape into which a second coding unit is splittable is restricted when the second coding unit having a non-square shape, which is determined when an image decoding apparatus splits a first coding unit, satisfies a predetermined condition, according to an embodiment.

FIG. 10 illustrates that a shape into which a second coding unit is splittable is restricted when the second coding unit having a non-square shape, which is determined when an image decoding apparatus splits a first coding unit, satisfies a predetermined condition, according to an embodiment.

According to an embodiment, the image decoding apparatus 100 may determine to split the square first coding unit 1000 into non-square second coding units 1010a, and 1010b or 1020a and 1020b, based on split shape mode information, which is obtained by the receiver 110. The second coding units 1010a and 1010b or 1020a and 1020b may be independently split. As such, the image decoding apparatus 100 may determine to split or not to split each of the second coding units 1010a and 1010b or 1020a and 1020b into a plurality of coding units, based on the split shape mode information of each of the second coding units 1010a and 1010b or 1020a and 1020b. According to an embodiment, the image decoding apparatus 100 may determine third coding units 1012a and 1012b by splitting the non-square left second coding unit 1010a, which is determined by splitting the first coding unit 1000 in a vertical direction, in a horizontal direction. However, when the left second coding unit 1010a is split in a horizontal direction, the image decoding apparatus 100 may restrict the right second coding unit 1010b to not be split in a horizontal direction in which the left second coding unit 1010a is split. When third coding units 1014a and 1014b are determined by splitting the right second coding unit 1010b in a same direction, because the left and right second coding units 1010a and 1010b are independently split in a horizontal direction, the third coding units 1012a and 1012b or 1014a and 1014b may be determined. However, this case serves equally as a case in which the image decoding apparatus 100 splits the first coding unit 1000 into four square second coding units 1030a, 1030b, 1030c, and 1030d, based on the split shape mode information, and may be inefficient in terms of image decoding.

According to an embodiment, the image decoding apparatus 100 may determine third coding units 1022a and 1022b or 1024a and 1024b by splitting the non-square second coding unit 1020a or 1020b, which is determined by splitting the first coding unit 1000 in a horizontal direction, in a vertical direction. However, when a second coding unit (e.g., the upper second coding unit 1020a) is split in a vertical direction, for the above-described reason, the image decoding apparatus 100 may restrict the other second coding unit (e.g., the lower second coding unit 1020b) to not be split in a vertical direction in which the upper second coding unit 1020a is split.

Figure 11:
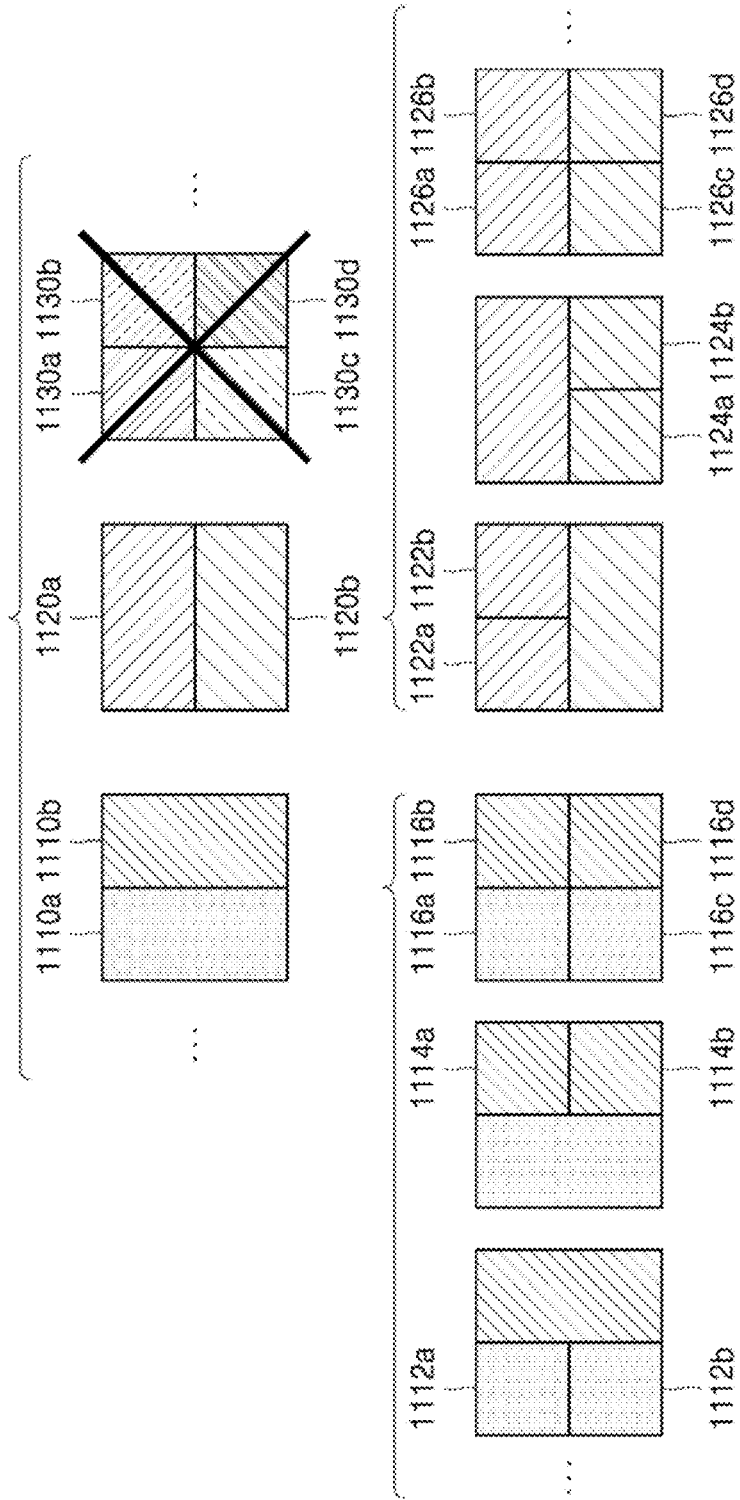
FIG. 11 illustrates a process, performed by an image decoding apparatus, of splitting a square coding unit when split shape mode information is unable to indicate that the square coding unit is split into four square coding units, according to an embodiment.

FIG. 11 illustrates a process, performed by an image decoding apparatus, of splitting a square coding unit when split shape mode information is unable to indicate that the square coding unit is split into four square coding units, according to an embodiment.

According to an embodiment, the image decoding apparatus 100 may determine second coding units 1110a and 1110b or 1120a and 1120b, etc. by splitting a first coding unit 1100, based on split shape mode information. The split shape mode information may include information about various methods of splitting a coding unit but, the information about various splitting methods may not include information for splitting a coding unit into four square coding units. According to such split shape mode information, the image decoding apparatus 100 may not split the square first coding unit 1100 into four square second coding units 1130a, 1130b, 1130c, and 1130d. The image decoding apparatus 100 may determine the non-square second coding units 1110a and 1110b or 1120a and 1120b, etc., based on the split shape mode information.

According to an embodiment, the image decoding apparatus 100 may independently split the non-square second coding units 1110a and 1110b or 1120a and 1120b, etc. Each of the second coding units 1110a and 1110b or 1120a and 1120b, etc. may be recursively split in a certain order, and this splitting method may correspond to a method of splitting the first coding unit 1100, based on the split shape mode information.

For example, the image decoding apparatus 100 may determine square third coding units 1112a and 1112b by splitting the left second coding unit 1110a in a horizontal direction, and may determine square third coding units 1114a and 1114b by splitting the right second coding unit 1110b in a horizontal direction. Furthermore, the image decoding apparatus 100 may determine square third coding units 1116a, 1116b, 1116c, and 1116d by splitting both of the left and right second coding units 1110a and 1110b in a horizontal direction. In this case, coding units having the same shape as the four square second coding units 1130a, 1130b, 1130c, and 1130d split from the first coding unit 1100 may be determined.

As another example, the image decoding apparatus 100 may determine square third coding units 1122a and 1122b by splitting the upper second coding unit 1120a in a vertical direction, and may determine square third coding units 1124a and 1124b by splitting the lower second coding unit 1120b in a vertical direction. Furthermore, the image decoding apparatus 100 may determine square third coding units 1126a, 1126b, 1126c, and 1126d by splitting both of the upper and lower second coding units 1120a and 1120b in a vertical direction. In this case, coding units having the same shape as the four square second coding units 1130a, 1130b, 1130c, and 1130d split from the first coding unit 1100 may be determined.

Figure 12:
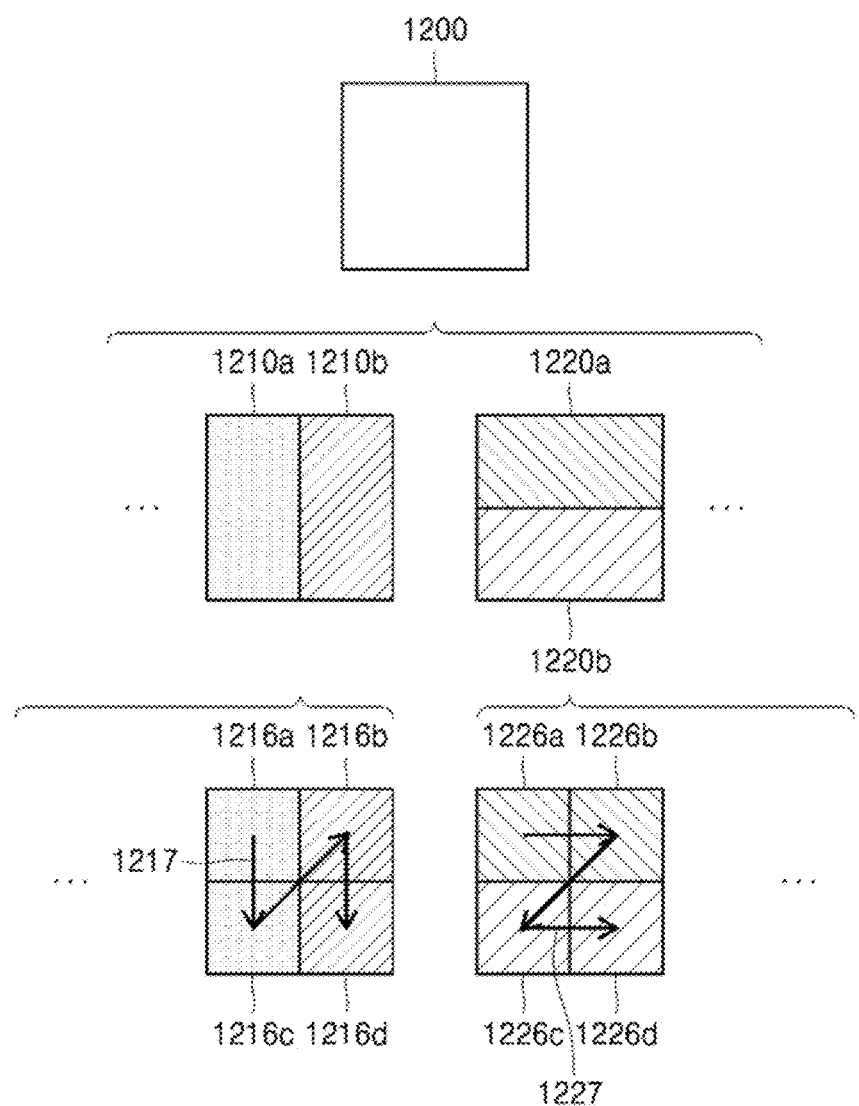
FIG. 12 illustrates that a processing order between a plurality of coding units may be changed depending on a process of splitting a coding unit, according to an embodiment.

FIG. 12 illustrates that a processing order between a plurality of coding units may be changed depending on a process of splitting a coding unit, according to an embodiment.

According to an embodiment, the image decoding apparatus 100 may split a first coding unit 1200, based on split shape mode information. When a block shape indicates a square shape and the split shape mode information indicates to split the first coding unit 1200 in at least one of a horizontal direction or a vertical direction, the image decoding apparatus 100 may determine second coding units 1210*a* and 1210*b* or 1220*a* and 1220*b*, etc. by splitting the first coding unit 1200. Referring to FIG. 12, the non-square second coding units 1210*a* and 1210*b* or 1220*a* and 1220*b* determined by splitting the first coding unit 1200 in only a horizontal direction or vertical direction may be independently split based on the split shape mode information of each coding unit. For example, the image decoding apparatus 100 may determine third coding units 1216*a*, 1216*b*, 1216*c*, and 1216*d* by splitting the second coding units 1210*a* and 1210*b*, which are generated by splitting the first coding unit 1200 in a vertical direction, in a horizontal direction, and may determine third coding units 1226*a*, 1226*b*, 1226*c*, and 1226*d* by splitting the second coding units 1220*a* and 1220*b*, which are generated by splitting the first coding unit 1200 in a horizontal direction, in a vertical direction. An operation of splitting the second coding units 1210*a* and 1210*b* or 1220*a* and 1220*b* has been described above in relation to FIG. 11, and thus detailed descriptions thereof will not be provided herein.

According to an embodiment, the image decoding apparatus 100 may process coding units in a certain order. An operation of processing coding units in a predetermined order has been described above in relation to FIG. 7, and thus detailed descriptions thereof will not be provided herein. Referring to FIG. 12, the image decoding apparatus 100 may determine four square third coding units 1216*a*, 1216*b*, 1216*c*, and 1216*d*, and 1226*a*, 1226*b*, 1226*c*, and 1226*d* by splitting the square first coding unit 1200. According to an embodiment, the image decoding apparatus 100 may determine processing orders of the third coding units 1216*a*, 1216*b*, 1216*c*, and 1216*d*, and 1226*a*, 1226*b*, 1226*c*, and 1226*d* based on a splitting method of the first coding unit 1200.

According to an embodiment, the image decoding apparatus 100 may determine the third coding units 1216*a*, 1216*b*, 1216*c*, and 1216*d* by splitting the second coding units 1210*a* and 1210*b* generated by splitting the first coding unit 1200 in a vertical direction, in a horizontal direction, and may process the third coding units 1216*a*, 1216*b*, 1216*c*, and 1216*d* in a processing order 1217 for initially processing the third coding units 1216*a* and 1216*c*, which are included in the left second coding unit 1210*a*, in a vertical direction and then processing the third coding unit 1216*b* and 1216*d*, which are included in the right second coding unit 1210*b*, in a vertical direction.

According to an embodiment, the image decoding apparatus 100 may determine the third coding units 1226*a*, 1226*b*, 1226*c*, and 1226*d* by splitting the second coding units 1220*a* and 1220*b* generated by splitting the first coding unit 1200 in a horizontal direction, in a vertical direction, and may process the third coding units 1226*a*, 1226*b*, 1226*c*, and 1226*d* in a processing order 1227 for initially processing the third coding units 1226*a* and 1226*b*, which are included in the upper second coding unit 1220*a*, in a horizontal direction and then processing the third coding unit 1226*c* and 1226*d*, which are included in the lower second coding unit 1220*b*, in a horizontal direction.

Referring to FIG. 12, the square third coding units 1216*a*, 1216*b*, 1216*c*, and 1216*d*, and 1226*a*, 1226*b*, 1226*c*, and 1226*d* may be determined by splitting the second coding units 1210*a* and 1210*b*, and 1220*a* and 1220*b*, respectively. Although the second coding units 1210*a* and 1210*b* are determined by splitting the first coding unit 1200 in a vertical direction differently from the second coding units 1220*a* and 1220*b* which are determined by splitting the first coding unit 1200 in a horizontal direction, the third coding units 1216*a*, 1216*b*, 1216*c*, and 1216*d*, and 1226*a*, 1226*b*, 1226*c*, and 1226*d* split therefrom eventually show same-shaped coding units split from the first coding unit 1200. As such, by recursively splitting a coding unit in different manners based on the split shape mode information, the image decoding apparatus 100 may process a plurality of coding units in different orders even when the coding units are eventually determined to be the same shape.

FIG. 13 illustrates a process of determining a depth of a coding unit as a shape and size of the coding unit change, when the coding unit is recursively split such that a plurality of coding units are determined, according to an embodiment.

According to an embodiment, the image decoding apparatus 100 may determine the depth of the coding unit, based on a certain criterion. For example, the certain criterion may be the length of a long side of the coding unit. When the length of a long side of a coding unit before being split is 2n times (n>0) the length of a long side of a split current coding unit, the image decoding apparatus 100 may determine that a depth of the current coding unit is increased from a depth of the coding unit before being split, by n. In the following description, a coding unit having an increased depth is expressed as a coding unit of a lower depth.

Referring to FIG. 13, according to an embodiment, the image decoding apparatus 100 may determine a second coding unit 1302 and a third coding unit 1304 of lower depths by splitting a square first coding unit 1300 based on block shape information indicating a square shape (for example, the block shape information may be expressed as '0: SQUARE'). Assuming that the size of the square first coding unit 1300 is 2N×2N, the second coding unit 1302 determined by splitting a width and height of the first coding unit 1300 in ½ may have a size of N×N. Furthermore, the third coding unit 1304 determined by splitting a width and height of the second coding unit 1302 in ½ may have a size of N/2×N/2. In this case, a width and height of the third coding unit 1304 are ¼ times those of the first coding unit 1300. When a depth of the first coding unit 1300 is D, a depth of the second coding unit 1302, the width and height of which are ½ times those of the first coding unit 1300, may be D+1, and a depth of the third coding unit 1304, the width and height of which are ¼ times those of the first coding unit 1300, may be D+2.

According to an embodiment, the image decoding apparatus 100 may determine a second coding unit 1312 or 1322 and a third coding unit 1314 or 1324 of lower depths by splitting a non-square first coding unit 1310 or 1320 based on block shape information indicating a non-square shape (for example, the block shape information may be expressed as '1: NS_VER' indicating a non-square shape, a height of which is longer than a width, or as '2: NS_HOR' indicating a non-square shape, a width of which is longer than a height).

The image decoding apparatus 100 may determine a second coding unit 1302, 1312, or 1322 by splitting at least one of a width or height of the first coding unit 1310 having a size of N×2N. That is, the image decoding apparatus 100 may determine the second coding unit 1302 having a size of N×N or the second coding unit 1322 having a size of N×N/2 by splitting the first coding unit 1310 in a horizontal direction, or may determine the second coding unit 1312 having a size of N/2×N by splitting the first coding unit 1310 in horizontal and vertical directions.

According to an embodiment, the image decoding apparatus 100 may determine the second coding unit 1302, 1312, or 1322 by splitting at least one of a width or height of the first coding unit 1320 having a size of 2N×N. That is, the image decoding apparatus 100 may determine the second coding unit 1302 having a size of N×N or the second coding unit 1312 having a size of N/2×N by splitting the first coding unit 1320 in a vertical direction, or may determine the second coding unit 1322 having a size of N×N/2 by splitting the first coding unit 1320 in horizontal and vertical directions.

According to an embodiment, the image decoding apparatus 100 may determine a third coding unit 1304, 1314, or 1324 by splitting at least one of a width or height of the second coding unit 1302 having a size of N×N. That is, the image decoding apparatus 100 may determine the third coding unit 1304 having a size of N/2×N/2, the third coding unit 1314 having a size of N/4×N/2, or the third coding unit 1324 having a size of N/2×N/4 by splitting the second coding unit 1302 in vertical and horizontal directions.

According to an embodiment, the image decoding apparatus 100 may determine the third coding unit 1304, 1314, or 1324 by splitting at least one of a width or height of the second coding unit 1312 having a size of N/2×N. That is, the image decoding apparatus 100 may determine the third coding unit 1304 having a size of N/2×N/2 or the third coding unit 1324 having a size of N/2×N/4 by splitting the second coding unit 1312 in a horizontal direction, or may determine the third coding unit 1314 having a size of N/4×N/2 by splitting the second coding unit 1312 in vertical and horizontal directions.

According to an embodiment, the image decoding apparatus 100 may determine the third coding unit 1304, 1314, or 1324 by splitting at least one of a width or height of the second coding unit 1322 having a size of N×N/2. That is, the image decoding apparatus 100 may determine the third coding unit 1304 having a size of N/2×N/2 or the third coding unit 1314 having a size of N/4×N/2 by splitting the second coding unit 1322 in a vertical direction, or may determine the third coding unit 1324 having a size of N/2×N/4 by splitting the second coding unit 1322 in vertical and horizontal directions.

According to an embodiment, the image decoding apparatus 100 may split the square coding unit 1300, 1302, or 1304 in a horizontal or vertical direction. For example, the image decoding apparatus 100 may determine the first coding unit 1310 having a size of N×2N by splitting the first coding unit 1300 having a size of 2N×2N in a vertical direction, or may determine the first coding unit 1320 having a size of 2N×N by splitting the first coding unit 1300 in a horizontal direction. According to an embodiment, when a depth is determined based on the length of the longest side of a coding unit, a depth of a coding unit determined by splitting the first coding unit 1300 having a size of 2N×2N in a horizontal or vertical direction may be the same as the depth of the first coding unit 1300.

According to an embodiment, a width and height of the third coding unit 1314 or 1324 may be ¼ times those of the first coding unit 1310 or 1320. When a depth of the first coding unit 1310 or 1320 is D, a depth of the second coding unit 1312 or 1322, the width and height of which are ½ times those of the first coding unit 1310 or 1320, may be D+1, and a depth of the third coding unit 1314 or 1324, the width and height of which are ¼ times those of the first coding unit 1310 or 1320, may be D+2.

Figure 14:
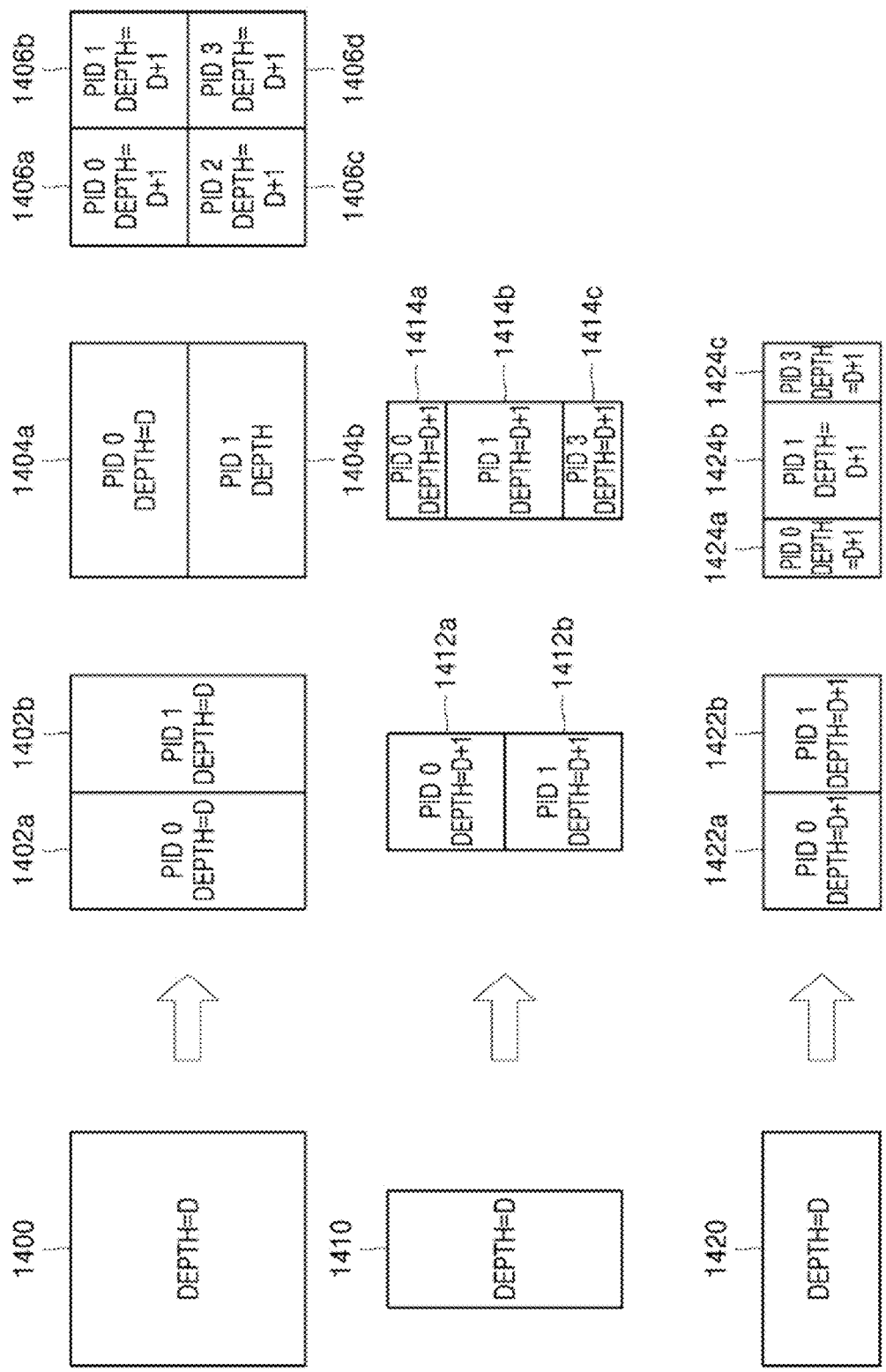
FIG. 14 illustrates depths that are determinable based on shapes and sizes of coding units, and part indexes (PIDs) that are for distinguishing the coding units, according to an embodiment.

FIG. 14 illustrates depths that are determinable based on shapes and sizes of coding units, and part indexes (PIDs) that are for distinguishing the coding units, according to an embodiment.

According to an embodiment, the image decoding apparatus 100 may determine various-shape second coding units by splitting a square first coding unit 1400. Referring to FIG. 14, the image decoding apparatus 100 may determine second coding units 1402a and 1402b, 1404a and 1404b, and 1406a, 1406b, 1406c, and 1406d by splitting the first coding unit 1400 in at least one of a vertical direction and a horizontal direction based on split shape mode information. That is, the image decoding apparatus 100 may determine the second coding units 1402a and 1402b, 1404a and 1404b, and 1406a, 1406b, 1406c, and 1406d, based on the split shape mode information of the first coding unit 1400.

According to an embodiment, a depth of the second coding units 1402a and 1402b, 1404a and 1404b, and 1406a, 1406b, 1406c, and 1406d, which are determined based on the split shape mode information of the square first coding unit 1400, may be determined based on the length of a long side thereof. For example, because the length of a side of the square first coding unit 1400 equals the length of a long side of the non-square second coding units 1402a and 1402b, and 1404a and 1404b, the first coding unit 2100 and the non-square second coding units 1402a and 1402b, and 1404a and 1404b may have the same depth, e.g., D. However, when the image decoding apparatus 100 splits the first coding unit 1400 into the four square second coding units 1406a, 1406b, 1406c, and 1406d based on the split shape mode information, because the length of a side of the square second coding units 1406a, 1406b, 1406c, and 1406d is ½ times the length of a side of the first coding unit 1400, a depth of the second coding units 1406a, 1406b, 1406c, and 1406d may be D+1 which is lower than the depth D of the first coding unit 1400 by 1.

According to an embodiment, the image decoding apparatus 100 may determine a plurality of second coding units 1412a and 1412b, and 1414a, 1414b, and 1414c by splitting a first coding unit 1410, a height of which is longer than a width, in a horizontal direction based on the split shape mode information. According to an embodiment, the image decoding apparatus 100 may determine a plurality of second coding units 1422a and 1422b, and 1424a, 1424b, and 1424c by splitting a first coding unit 1420, a width of which is longer than a height, in a vertical direction based on the split shape mode information.

According to an embodiment, depths of the second coding units 1412a and 1412b, and 1414a, 1414b, and 1414c, or 1422a and 1422b, and 1424a, 1424b, and 1424c that are determined based on the split shape mode information of the non-square first coding unit 1410 or 1420 may be determined based on the length of a long side thereof. For example, because the length of a side of the square second coding units 1412a and 1412b is ½ times the length of a long side of the first coding unit 1410 having a non-square shape, a height of which is longer than a width, a depth of the square second coding units 1412a and 1412b is D+1 which is lower than the depth D of the non-square first coding unit 1410 by 1.

Furthermore, the image decoding apparatus 100 may split the non-square first coding unit 1410 into an odd number of second coding units 1414a, 1414b, and 1414c based on the split shape mode information. The odd number of second coding units 1414a, 1414b, and 1414c may include the non-square second coding units 1414a and 1414c and the square second coding unit 1414b. In this case, because the length of a long side of the non-square second coding units 1414a and 1414c and the length of a side of the square second coding unit 1414b are ½ times the length of a long side of the first coding unit 1410, a depth of the second coding units 1414a, 1414b, and 1414c may be D+1 which is lower than the depth D of the non-square first coding unit

1410 by 1. The image decoding apparatus 100 may determine depths of coding units split from the first coding unit 1420 having a non-square shape, a width of which is longer than a height, by using the above-described method of determining depths of coding units split from the first coding unit 1410.

According to an embodiment, the image decoding apparatus 100 may determine PIDs for identifying split coding units, based on a size ratio between the coding units when an odd number of split coding units do not have equal sizes. Referring to FIG. 14, a coding unit 1414b of a center location among an odd number of split coding units 1414a, 1414b, and 1414c may have a width equal to that of the other coding units 1414a and 1414c and a height which is two times that of the other coding units 1414a and 1414c. That is, in this case, the coding unit 1414b at the center location may include two of the other coding unit 1414a or 1414c. Therefore, when a PID of the coding unit 1414b at the center location is 1 based on a scan order, a PID of the coding unit 1414c located next to the coding unit 1414b may be increased by 2 and thus may be 3. That is, discontinuity in PID values may be present. According to an embodiment, the image decoding apparatus 100 may determine whether an odd number of split coding units do not have equal sizes, based on whether discontinuity is present in PIDs for identifying the split coding units.

According to an embodiment, the image decoding apparatus 100 may determine whether to use a specific splitting method, based on PID values for identifying a plurality of coding units determined by splitting a current coding unit. Referring to FIG. 14, the image decoding apparatus 100 may determine an even number of coding units 1412a and 1412b or an odd number of coding units 1414a, 1414b, and 1414c by splitting the first coding unit 1410 having a rectangular shape, a height of which is longer than a width. The image decoding apparatus 100 may use PIDs indicating respective coding units so as to identify the respective coding units. According to an embodiment, the PID may be obtained from a sample of a certain location of each coding unit (e.g., an upper left sample).

According to an embodiment, the image decoding apparatus 100 may determine a coding unit at a certain location from among the split coding units, by using the PIDs for distinguishing the coding units. According to an embodiment, when the split shape mode information of the first coding unit 1410 having a rectangular shape, a height of which is longer than a width, indicates to split a coding unit into three coding units, the image decoding apparatus 100 may split the first coding unit 1410 into three coding units 1414a, 1414b, and 1414c. The image decoding apparatus 100 may assign a PID to each of the three coding units 1414a, 1414b, and 1414c. The image decoding apparatus 100 may compare PIDs of an odd number of split coding units to determine a coding unit at a center location from among the coding units. The image decoding apparatus 100 may determine the coding unit 1414b having a PID corresponding to a middle value among the PIDs of the coding units, as the coding unit at the center location from among the coding units determined by splitting the first coding unit 1410. According to an embodiment, the image decoding apparatus 100 may determine PIDs for distinguishing split coding units, based on a size ratio between the coding units when the split coding units do not have equal sizes. Referring to FIG. 14, the coding unit 1414b generated by splitting the first coding unit 1410 may have a width equal to that of the other coding units 1414a and 1414c and a height which is two times that of the other coding units 1414a and 1414c. In this case, when the PID of the coding unit 1414b at the center location is 1, the PID of the coding unit 1414c located next to the coding unit 1414b may be increased by 2 and thus may be 3. When the PID is not uniformly increased as described above, the image decoding apparatus 100 may determine that a coding unit is split into a plurality of coding units including a coding unit having a size different from that of the other coding units. According to an embodiment, when the split shape mode information indicates to split a coding unit into an odd number of coding units, the image decoding apparatus 100 may split a current coding unit in such a manner that a coding unit of a certain location among an odd number of coding units (e.g., a coding unit of a center location) has a size different from that of the other coding units. In this case, the image decoding apparatus 100 may determine the coding unit of the center location, which has a different size, by using PIDs of the coding units. However, the PIDs and the size or location of the coding unit of the certain location are not limited to the above-described examples, and various PIDs and various locations and sizes of coding units may be used.

According to an embodiment, the image decoding apparatus 100 may use a certain data unit where a coding unit starts to be recursively split.

Figure 15:
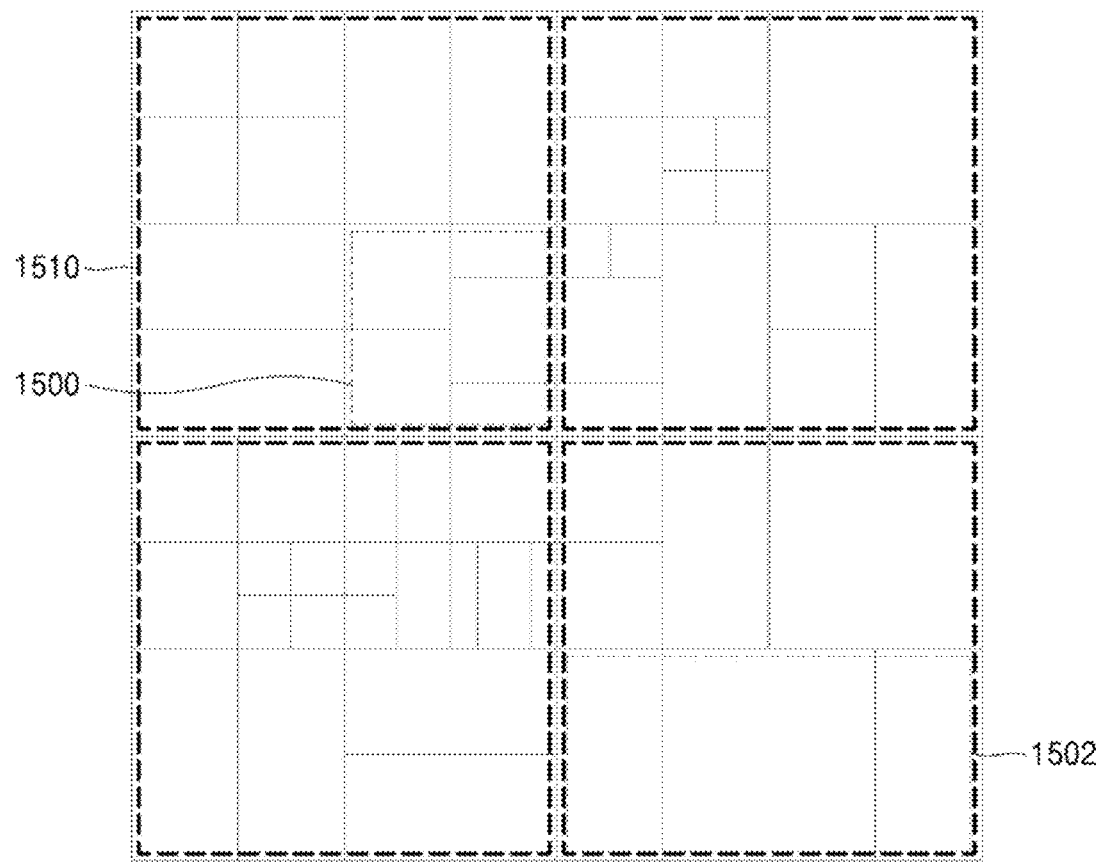
FIG. 15 illustrates that a plurality of coding units are determined based on a plurality of certain data units included in a picture, according to an embodiment.

FIG. 15 illustrates that a plurality of coding units are determined based on a plurality of certain data units included in a picture, according to an embodiment.

According to an embodiment, a certain data unit may be defined as a data unit where a coding unit starts to be recursively split by using split shape mode information. That is, the certain data unit may correspond to a coding unit of an uppermost depth, which is used to determine a plurality of coding units split from a current picture. In the following descriptions, for convenience of explanation, the certain data unit is referred to as a reference data unit.

According to an embodiment, the reference data unit may have a certain size and a certain size shape. According to an embodiment, a reference data unit may include M×N samples. Herein, M and N may be equal to each other, and may be integers expressed as powers of 2. That is, the reference data unit may have a square or non-square shape, and may be split into an integer number of coding units.

According to an embodiment, the image decoding apparatus 100 may split the current picture into a plurality of reference data units. According to an embodiment, the image decoding apparatus 100 may split the plurality of reference data units, which are split from the current picture, by using the split shape mode information of each reference data unit. The operation of splitting the reference data unit may correspond to a splitting operation using a quadtree structure.

According to an embodiment, the image decoding apparatus 100 may previously determine the minimum size allowed for the reference data units included in the current picture. Accordingly, the image decoding apparatus 100 may determine various reference data units having sizes equal to or greater than the minimum size, and may determine one or more coding units by using the split shape mode information with reference to the determined reference data unit.

Referring to FIG. 15, the image decoding apparatus 100 may use a square reference coding unit 1500 or a non-square reference coding unit 1502. According to an embodiment, the shape and size of reference coding units may be determined based on various data units capable of including one or more reference coding units (e.g., sequences, pictures, slices, slice segments, tiles, tile groups, largest coding units, or the like).

According to an embodiment, the receiver 110 of the image decoding apparatus 100 may obtain, from a bitstream, at least one of reference coding unit shape information and reference coding unit size information with respect to each of the various data units. An operation of splitting the square reference coding unit 1500 into one or more coding units has been described above in relation to the operation of splitting the current coding unit 300 of FIG. 3, and an operation of splitting the non-square reference coding unit 1502 into one or more coding units has been described above in relation to the operation of splitting the current coding unit 400 or 450 of FIG. 4. Thus, detailed descriptions thereof are not provided again.

According to an embodiment, the image decoding apparatus 100 may use a PID for identifying the size and shape of reference coding units, to determine the size and shape of reference coding units according to some data units previously determined based on a certain condition. That is, the receiver 110 may obtain, from the bitstream, only the PID for identifying the size and shape of reference coding units with respect to each slice, slice segment, tile, tile group, or largest coding unit which is a data unit satisfying a predetermined condition (e.g., a data unit having a size equal to or smaller than a slice) among the various data units (e.g., sequences, pictures, slices, slice segments, tiles, tile groups, largest coding units, or the like). The image decoding apparatus 100 may determine the size and shape of reference data units with respect to each data unit, which satisfies the certain condition, by using the PID. When the reference coding unit shape information and the reference coding unit size information are obtained and used from the bitstream according to each data unit having a relatively small size, efficiency of using the bitstream may not be high, and therefore, only the PID may be obtained and used instead of directly obtaining the reference coding unit shape information and the reference coding unit size information. In this case, at least one of the size or shape of reference coding units corresponding to the PID for identifying the size and shape of reference coding units may be previously determined. That is, the image decoding apparatus 100 may determine at least one of the size or shape of reference coding units included in a data unit serving as a unit for obtaining the PID, by selecting the previously determined at least one of the size or shape of reference coding units based on the PID.

According to an embodiment, the image decoding apparatus 100 may use one or more reference coding units included in a largest coding unit. That is, a largest coding unit split from a picture may include one or more reference coding units, and coding units may be determined by recursively splitting each reference coding unit. According to an embodiment, at least one of a width and height of the largest coding unit may be integer times at least one of the width and height of the reference coding units. According to an embodiment, the size of reference coding units may be obtained by splitting the largest coding unit n times based on a quadtree structure. That is, the image decoding apparatus 100 may determine the reference coding units by splitting the largest coding unit n times based on a quadtree structure, and may split the reference coding unit based on at least one of the block shape information and the split shape mode information according to various embodiments.

According to an embodiment, the image decoding apparatus 100 may obtain block shape information indicating the shape of a current coding unit or split shape mode information indicating a splitting method of the current coding unit, from the bitstream, and may use the obtained information.

The split shape mode information may be included in the bitstream related to various data units. For example, the image decoding apparatus 100 may use the split shape mode information included in a sequence parameter set, a picture parameter set, a video parameter set, a slice header, a slice segment header, a tile header, or a tile group header. Furthermore, the image decoding apparatus 100 may obtain, from the bitstream, a syntax element corresponding to the block shape information or the split shape mode information according to each largest coding unit, each reference coding unit, or each processing block, and may use the obtained syntax element.

Hereinafter, a method of determining a split rule, according to an embodiment of the present disclosure will be described in detail.

The image decoding apparatus 100 may determine a split rule of an image. The split rule may be pre-determined between the image decoding apparatus 100 and the image encoding apparatus 1700. The image decoding apparatus 100 may determine the split rule of the image, based on information obtained from a bitstream. The image decoding apparatus 100 may determine the split rule based on the information obtained from at least one of a sequence parameter set, a picture parameter set, a video parameter set, a slice header, a slice segment header, a tile header, or a tile group header. The image decoding apparatus 100 may determine the split rule differently according to frames, slices, tiles, temporal layers, largest coding units, or coding units.

The image decoding apparatus 100 may determine the split rule based on a block shape of a coding unit. The block shape may include a size, shape, a ratio of width and height, and a direction of the coding unit. The image decoding apparatus 100 may pre-determine to determine the split rule based on block shape information of a coding unit. However, the present disclosure is not limited thereto. The image decoding apparatus 100 may determine the split rule of the image, based on information obtained from a received bitstream.

The shape of the coding unit may include a square and a non-square. When the lengths of the width and height of the coding unit are the same, the image decoding apparatus 100 may determine the shape of the coding unit to be a square. Also, when the lengths of the width and height of the coding unit are not the same, the image decoding apparatus 100 may determine the shape of the coding unit to be a non-square.

The size of the coding unit may include various sizes, such as 4×4, 8×4, 4×8, 8×8, 16×4, 16×8, and to 256×256. The size of the coding unit may be classified based on the length of a long side of the coding unit, the length of a short side, or the area. The image decoding apparatus 100 may apply the same split rule to coding units classified as the same group. For example, the image decoding apparatus 100 may classify coding units having the same lengths of the long sides as having the same size. Also, the image decoding apparatus 100 may apply the same split rule to coding units having the same lengths of long sides.

The ratio of the width and height of the coding unit may include 1:2, 2:1, 1:4, 4:1, 1:8, 8:1, 1:16, 16:1, 32:1, 1:32, or the like. Also, a direction of the coding unit may include a horizontal direction and a vertical direction. The horizontal direction may indicate a case in which the length of the width of the coding unit is longer than the length of the height thereof. The vertical direction may indicate a case in which the length of the width of the coding unit is shorter than the length of the height thereof.

The image decoding apparatus 100 may adaptively determine the split rule based on the size of the coding unit. The image decoding apparatus 100 may differently determine an allowable split shape mode based on the size of the coding unit. For example, the image decoding apparatus 100 may determine whether splitting is allowed based on the size of the coding unit. The image decoding apparatus 100 may determine a split direction according to the size of the coding unit. The image decoding apparatus 100 may determine an allowable split type according to the size of the coding unit.

The split rule determined based on the size of the coding unit may be a split rule pre-determined in the image decoding apparatus 100. Also, the image decoding apparatus 100 may determine the split rule based on the information obtained from the bitstream.

The image decoding apparatus 100 may adaptively determine the split rule based on a location of the coding unit. The image decoding apparatus 100 may adaptively determine the split rule based on the location of the coding unit in the image.

Also, the image decoding apparatus 100 may determine the split rule such that coding units generated via different splitting paths do not have the same block shape. However, the present disclosure is not limited thereto, and the coding units generated via different splitting paths have the same block shape. The coding units generated via the different splitting paths may have different decoding processing orders. Because the decoding processing orders have been described above with reference to FIG. 12, details thereof are not provided again.

Figure 16:
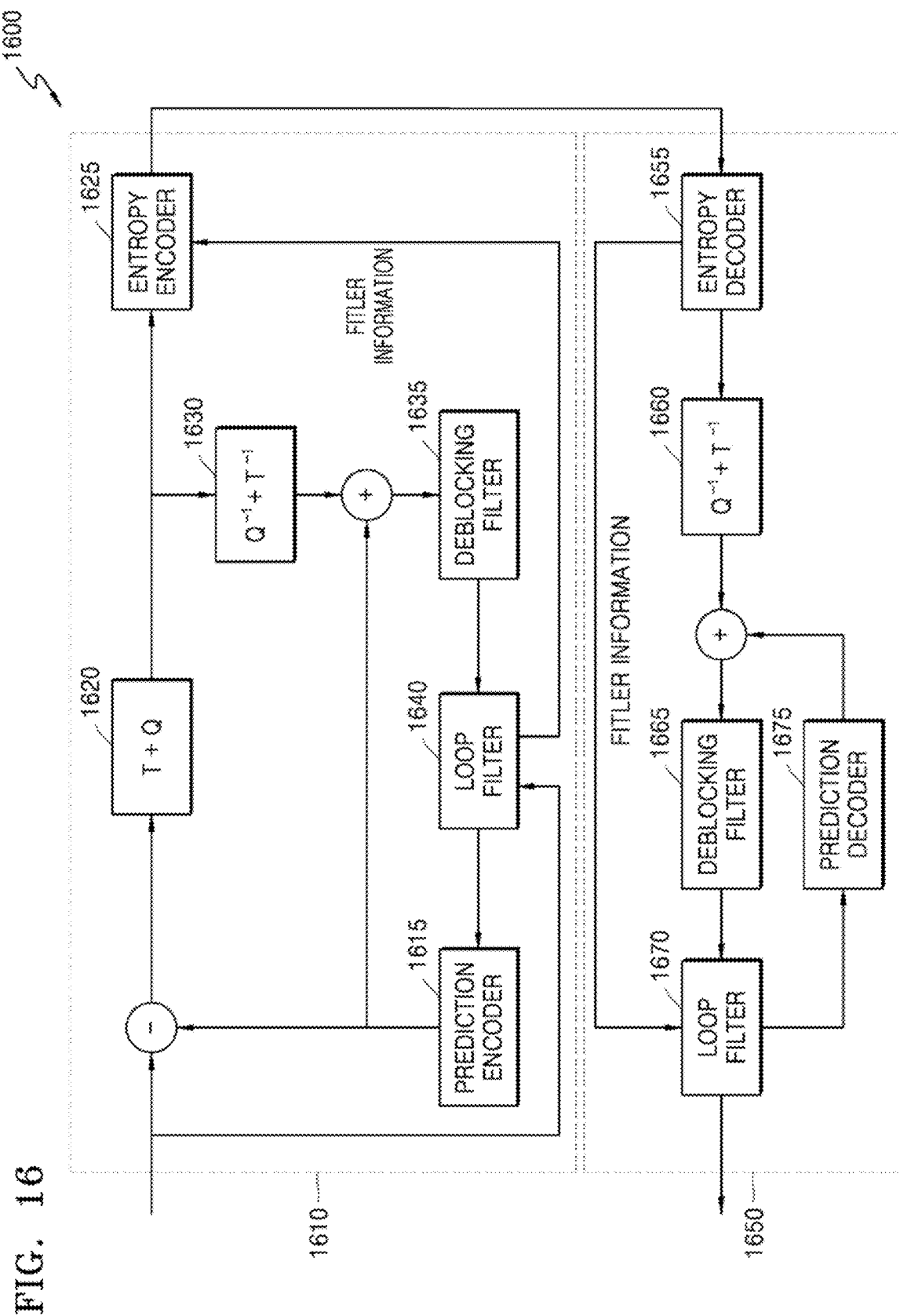
FIG. 16 is a block diagram of an image encoding and decoding system.

FIG. 16 is a block diagram of an image encoding and decoding system.

An encoding end 1610 of an image encoding and decoding system 1600 transmits an encoded bitstream of an image and a decoding end 1650 outputs a reconstructed image by receiving and decoding the bitstream. Here, the decoding end 1650 may have a similar configuration as the image decoding apparatus 100.

At the encoding end 1610, a prediction encoder 1615 outputs a reference image via inter-prediction and intra-prediction, and a transformer and quantizer 1620 quantizes residual data between the reference picture and a current input image to a quantized transform coefficient and outputs the quantized transform coefficient. An entropy encoder 1625 transforms the quantized transform coefficient by encoding the quantized transform coefficient, and outputs the transformed quantized transform coefficient as a bitstream. The quantized transform coefficient is reconstructed as data of a spatial domain via an inverse quantizer and inverse transformer 1630, and the data of the spatial domain is output as a reconstructed image via a deblocking filter 1635 and a loop filter 1640. The reconstructed image may be used as a reference image of a next input image via the prediction encoder 1615.

Encoded image data among the bitstream received by the decoding end 1650 is reconstructed as residual data of a spatial domain via an entropy decoder 1655 and an inverse quantizer and inverse transformer 1660. Image data of a spatial domain is configured when a reference image and residual data output from a prediction decoder 1675 are combined, and a deblocking filter 1665 and a loop filter 1670 may output a reconstructed image regarding a current original image by performing filtering on the image data of the spatial domain. The reconstructed image may be used by the prediction decoder 1675 as a reference image for a next original image.

The loop filter 1640 of the encoding end 1610 performs loop filtering by using filter information input according to a user input or system setting. The filter information used by the loop filter 1640 is output to the entropy encoder 1625 and transmitted to the decoding end 1650 together with the encoded image data. The loop filter 1670 of the decoding end 1650 may perform loop filtering based on the filter information input from the decoding end 1650.

Hereinafter, a method and apparatus for encoding or decoding a video by expanding an inter-prediction method by using a probability motion expression method, according to an embodiment of the present disclosure will be described with reference to FIGS. 17 through 20.

Figure 17:
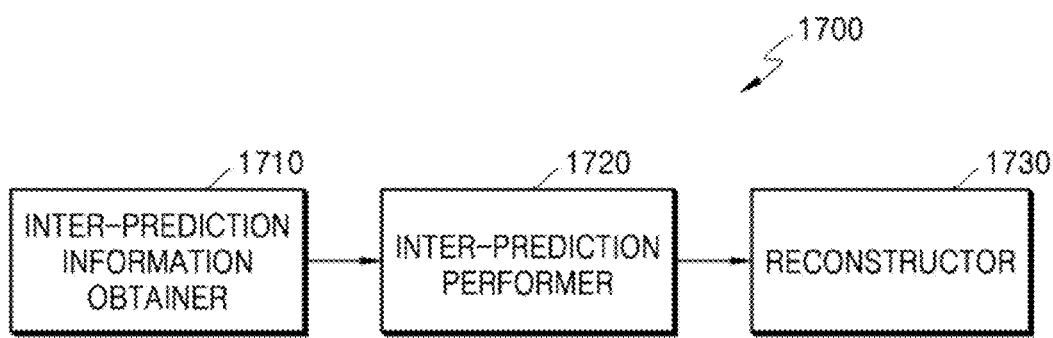
FIG. 17 is a block diagram of a video decoding apparatus according to an embodiment.

FIG. 17 is a block diagram of a video decoding apparatus according to an embodiment.

Referring to FIG. 17, a video decoding apparatus 1700 according to an embodiment may include an inter-prediction information obtainer 1710, an inter-prediction performer 1720, and a reconstructor 1730.

The video decoding apparatus 1700 may obtain a bitstream generated as a result of encoding an image and decode motion information for inter-prediction based on information included in the bitstream.

The video decoding apparatus 1700 according to an embodiment may include a central processor (not shown) for controlling the inter-prediction information obtainer 1710, the inter-prediction performer 1720, and the reconstructor 1730. Alternatively, the inter-prediction information obtainer 1710, the inter-prediction performer 1720, and the reconstructor 1730 may operate by their own processors (not shown), and the processors may systematically operate with each other to operate the video decoding apparatus 1700. Alternatively, the inter-prediction information obtainer 1710, the inter-prediction performer 1720, and the reconstructor 1730 may be controlled according to control of an external processor (not shown) of the video decoding apparatus 1700.

The video decoding apparatus 1700 may include one or more data storages (not shown) storing input/output data of the inter-prediction information obtainer 1710, the inter-prediction performer 1720, and the reconstructor 1730. The video decoding apparatus 1700 may include a memory controller (not shown) for controlling data input and output of the data storage.

The video decoding apparatus 1700 may perform an image decoding operation including prediction by connectively operating with an internal video decoding processor or an external video decoding processor so as to reconstruct an image via image decoding. The internal video decoding processor of the video decoding apparatus 1700 according to an embodiment may perform a basic image decoding operation not only as a separate processor, but also as a central processing apparatus or a graphic processing apparatus including an image decoding processing module.

The video decoding apparatus 1700 may be included in the image decoding apparatus 100 described above. For example, the inter-prediction information obtainer 1710 may be included in the receiver 110 of the image decoding apparatus 100 of FIG. 1, and the inter-prediction performer 1720 and reconstructor 1730 may be included in the decoder 120 of the image decoding apparatus 100.

The inter-prediction information obtainer 1710 receives a bitstream generated as a result of encoding an image. The bitstream may include information for determining a motion vector used for inter-prediction of a current block. The current block is a block generated when an image is split according to a tree structure, and for example, may correspond to a largest coding unit, a coding unit, or a transform unit.

The inter-prediction information obtainer 1710 may determine the current block based on block shape information and/or information about a split shape mode, which are included in at least one of a sequence parameter set, a picture parameter set, a video parameter set, a slice header, and a slice segment header. Furthermore, the inter-prediction information obtainer 1710 may obtain, from the bitstream, a syntax element corresponding to the block shape information or the information about the split shape mode according to each largest coding unit, each reference coding unit, or each processing block, and may use the obtained syntax element to determine the current block.

The bitstream may include information indicating a prediction mode of the current block, and the prediction mode of the current block may include an intra mode and an inter mode. When the prediction mode of the current block is the inter mode, an encoding/decoding method of a motion vector may include at least one of a merge mode, a skip mode, and a merge motion vector difference mode according to the present disclosure. The merge motion vector difference mode may be a mode of determining a prediction motion vector of the current block by applying a motion vector difference distinguished according to a differential distance and a differential direction, to one base motion vector determined based on merge motion vector candidates.

According to an embodiment, information related to the merge motion vector difference mode may be obtained from the bitstream. The information related to the merge motion vector difference mode according to an embodiment may include at least one of information indicating whether the merge motion vector difference mode is applied to the current block (hereinafter, merge difference mode information), information indicating the base motion vector of the current block (hereinafter, merge candidate information), information indicating the differential distance from the base motion vector to motion vector candidates (hereinafter, differential distance index), and information indicating the differential direction from the base motion vector to the motion vector candidates (hereinafter, differential direction index).

The inter-prediction information obtainer 1710 may obtain the information related to the merge motion vector difference mode from a level corresponding to at least one unit from among a coding unit, a transform unit, a largest coding unit, a slice unit, and a picture unit.

The inter-prediction performer 1720 determines the motion vector of the current block based on information included in the bitstream.

The inter-prediction performer 1720 may verify whether the merge motion vector difference mode is applied to the current block, based on the information included in the bitstream. The information indicating whether the merge motion vector difference mode is applied may include a flag or an index.

According to an embodiment, the inter-prediction information obtainer 1710 may extract, from the bitstream, information indicating whether the merge motion vector difference mode is applied, when a skip mode or a merge mode is applied to the current block.

When the merge motion vector difference mode is applied to the current block, the motion vector candidates may be set according to variable differential distance and differential direction from the base motion vector.

The differential distance is a value determined based on a base pixel unit (for example, a ¼ pixel unit) and may indicate a difference by base pixel units. For example, when the differential distance between the base motion vector and the motion vector is 1, the motion vector and the base motion vector are different by a pixel distance corresponding to one ¼ pixel unit. The differential distance may have a value corresponding to an integer, a rational number, or an irrational number.

When a smallest pixel unit capable of being indicated by the motion vector of the current block is the same as the base pixel unit, the inter-prediction performer 1720 may determine motion vectors according to a pre-determined differential distance.

However, when the smallest pixel unit capable of being indicated by the motion vector of the current block is different from the base pixel unit, the inter-prediction performer 1720 may scale the pre-determined differential distance and then determine the motion vector candidate for the base motion vector, based on the scaled differential distance.

When the motion vector of the current block is capable of indicating pixels corresponding to an integer pixel unit, a ½ pixel unit, a ¼ pixel unit, and a ⅛ pixel unit, the smallest pixel unit capable of being indicated by the motion vector of the current block is ⅛ pixel unit. Also, when the base pixel unit is a ¼ pixel unit, the inter-prediction performer 1720 may up-scale the differential distance for determining the motion vector.

According to an embodiment, the inter-prediction performer 1720 may scale the differential distance according to a ratio of the base pixel unit to the smallest pixel unit capable of being indicated by the motion vector of the current block.

According to an embodiment, the inter-prediction performer 1720 may up-scale the differential distance when the base pixel unit is greater than the smallest pixel unit capable of being indicated by the motion vector of the current block.

According to an embodiment, the base motion vector of the current block may be determined from a merge candidate list used in the skip mode and the merge mode. The merge candidate list may include neighboring blocks related to the current block spatially and temporally. The neighboring blocks related to the current block spatially and temporally may include a block decoded before the current block. Accordingly, the base motion vector according to an embodiment may be determined from a motion vector of a neighboring block determined from the merge candidate list.

The neighboring block related to the current block spatially may include, for example, a block located left of the current block and a block located top of the current block, but is not limited thereto. Also, the neighboring block related to the current block temporally may include, for example, a block located at a same point as the current block from among blocks included in a reference picture different from a current picture including the current block, and a block spatially adjacent to the block at the same point.

According to an embodiment, the inter-prediction performer 1720 may determine motion vectors of the neighboring blocks related to the current block as the base motion vector. The inter-prediction performer 1720 may determine the base motion vector among the merge candidate list by using merge candidate information obtained from the bitstream.

The merge candidate information according to an embodiment may indicate up to second candidate in the merge candidate list.

Alternatively, the inter-prediction performer 1720 may modify the motion vectors of the neighboring blocks related to the current block and determine the modified motion vectors as the base motion vector. According to an embodiment, the inter-prediction performer 1720 may determine the base motion vector in a same manner as a method of determining a candidate list of motion vector predictors in an advanced motion vector prediction (AMVP) mode of the high efficiency video coding (HEVC) standard.

According to an embodiment, the inter-prediction performer 1720 may determine a zero motion vector having 0 as a component as the base motion vector.

The merge candidate information of the current block according to an embodiment may be encoded via a fixed length coding (FLC) method, a unary coding method, or a truncated unary coding method, and then included in the bitstream. For example, when the merge candidate information is decoded via the FLC method, a cMax value may be 1.

When the base motion vector for the current block is determined, the inter-prediction performer 1720 may determine the motion vector by applying the base motion vector to the merge motion vector difference.

The inter-prediction information obtainer 1710 may obtain, from the bitstream, information indicating at least one of a differential distance index and a differential direction index, and the inter-prediction performer 1720 may determine the merge motion vector difference, based on at least one of the differential distance index and the differential direction index. The motion vector of the current block may be determined from the base motion vector.

The inter-prediction information obtainer 1710 according to an embodiment may decode the differential distance index via the truncated unary coding method, and at this time, a cMax value may be 7 and a cRiceParam value may be 0. The inter-prediction information obtainer 1710 according to an embodiment may decode the differential direction index via the FLC method, and at this time, a cMax value may be 3 and a cRiceParam value may be 0.

The inter-prediction performer 1720 according to an embodiment may scale the differential distance verified from the bitstream according to a ratio of the base pixel unit to the smallest pixel unit capable of being indicated by the motion vector of the current block. When the base pixel unit (for example, a ¼ pixel unit) is greater than the smallest pixel unit (for example, a ⅛ pixel unit) capable of being indicated by the motion vector of the current block, the inter-prediction performer 1720 may up-scale the differential distance verified from the bitstream.

The scaled differential distance may indicate a difference by smallest pixel units. For example, when the smallest pixel unit capable of being indicated by the motion vector of the current block is a ⅛ pixel unit and the scaled differential distance is 2, the inter-prediction performer 1720 may determine the motion vector having a difference by a pixel distance corresponding to two ⅛ pixel units from the base motion vector.

As described above, the differential distance pre-determined based on the base pixel unit is used to determine the motion vector of the current block based on the base motion vector determined from the merge candidate list, and because information indicating the differential distance based on the base pixel unit is signaled via the bitstream, the inter-prediction performer 1720 of a precision capable of indicating the smallest pixel unit different from the base pixel unit may scale the differential distance signaled via the bitstream, according to the smallest pixel unit.

The differential distance determined based on the base pixel unit and the differential distance scaled based on the smallest pixel unit may be the same with respect to a pixel distance.

According to an embodiment, information indicating the smallest pixel unit capable of being indicated by the motion vector of the current block may be included in the bitstream. The inter-prediction information obtainer 1710 may obtain the information indicating the smallest pixel unit from the bitstream corresponding to at least one level from among a block, a slice, and a picture.

At least one of the differential distance index and the differential direction index for determining the motion vector of the current block may be obtained from the bitstream in a transform unit level, a coding unit level, a largest coding unit level, a slice level, or a picture level.

The inter-prediction information obtainer 1710 according to an embodiment may obtain some bins among the differential distance index by performing entropy decoding using context information (context variable) and obtain remaining bins by performing entropy decoding in a bypass mode.

By performing entropy decoding in a context adaptive binary arithmetic coding (CABAC) manner on the bitstream, each bin of a syntax element may be extracted and context information may be used for each bin. Decoding in the bypass mode, probability-based entropy decoding, may be performed in an equal probability (0.5) without using context information. For entropy decoding of a current bin, it is determined whether the context information is used and which context information is to be used.

The inter-prediction information obtainer 1710 according to an embodiment may perform, on the bitstream, the entropy decoding using context information and obtain a first bin of a distance index of the merge motion vector difference. Also, the inter-prediction information obtainer 1710 may obtain remaining bins of the distance index of the merge motion vector difference by performing the entropy decoding on the bitstream in a bypass mode.

The inter-prediction information obtainer 1710 according to an embodiment may perform the entropy decoding on the bitstream in the bypass mode to obtain a bin of two bits indicating the differential direction index.

The inter-prediction information obtainer 1710 may obtain information indicating a residual motion vector from the bitstream in the transform unit level, the coding unit level, the largest coding unit level, the slice level, or the picture level.

Motion vector candidates that may be determined from the base motion vector in the merge motion vector difference mode according to an embodiment will be described below with reference to FIG. 21.

Figure 21:
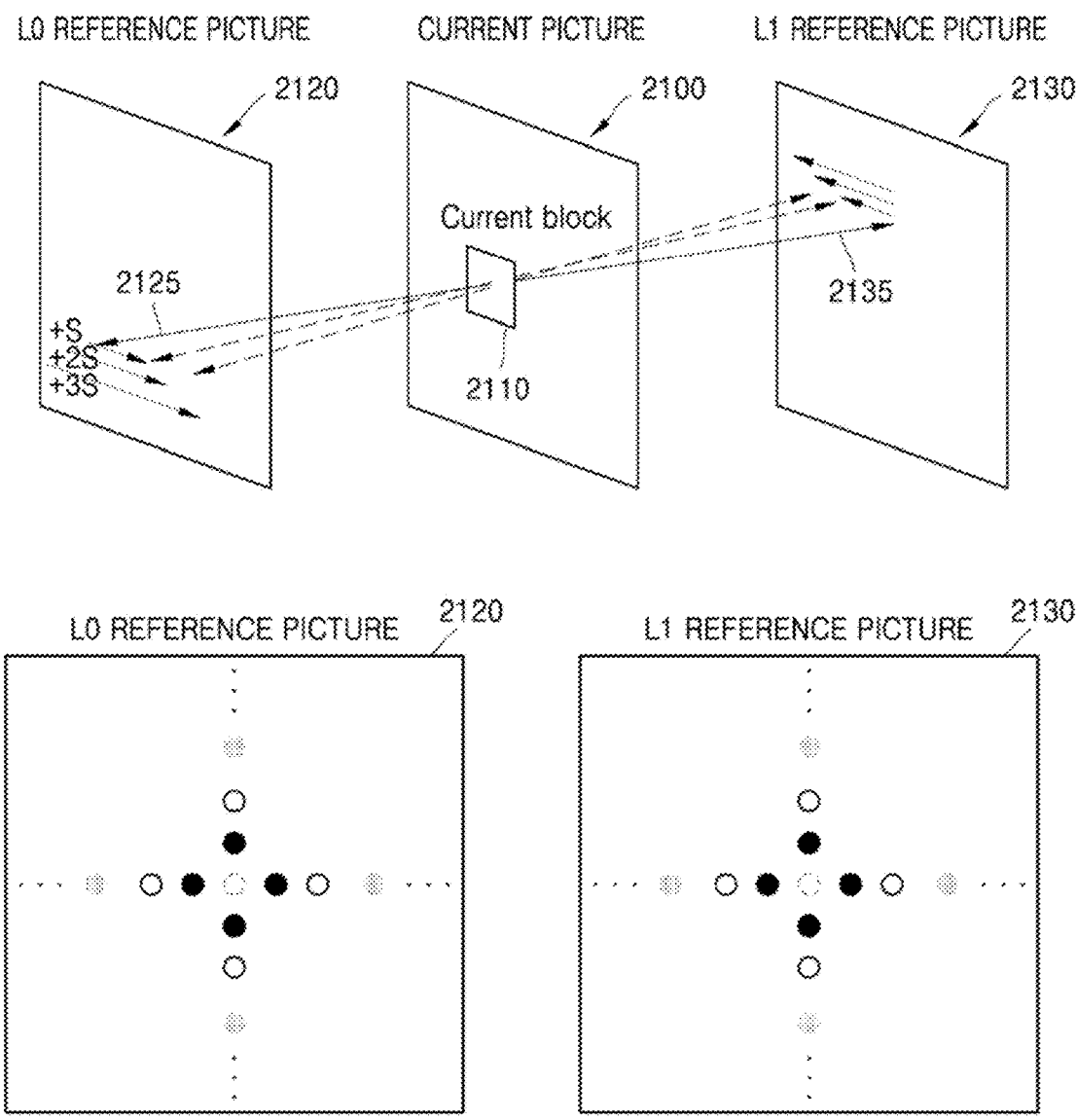
FIG. 21 illustrates positions of motion vector candidates, according to an embodiment.

FIG. 21 illustrates positions of motion vector candidates, according to an embodiment.

The inter-prediction performer 1720 according to an embodiment may determine the motion vector of the current block by applying the merge motion vector difference to the base motion vector. According to an embodiment, when a prediction direction of the current block is bi-direction, the merge motion vector difference may be included in the bitstream only for one uni-direction. For example, information indicating the merge motion vector difference may be included in the bitstream only for a uni-direction of any one of a list 0 direction and a list 1 direction.

FIG. 21 illustrates motion vectors that may be determined in the merge motion vector difference mode in bi-directional prediction.

A base motion vector 2125 in an L0 direction and a base motion vector 2135 in an L1 direction of a current block 2110 of a current picture 2100 are determined from a merge candidate list. The base motion vector 2125 in the L0 direction indicates a location of a broken line shape in an L0 reference picture 2120, and the base motion vector 2135 in the L1 direction indicates a location of a broken line shape in an L1 reference picture 2130.

However, in the merge motion vector difference mode, the motion vector difference may be applied to each of the base motion vector 2125 and the base motion vector 2135 in the L1 direction, based on the differential direction index and the differential distance index.

For example, it may be determined whether a distance between a base motion vector and a motion vector candidate is s, 2s, 3s, or the like according to the differential distance index. When the differential distance index indicates s, a motion vector candidate generated as a result of applying the motion vector difference to the base motion vector may indicate a location of a black circle among the L0 reference picture 2120 and the L1 reference picture 2130. When the differential distance index indicates 2s, the motion vector candidate generated as the result of applying the motion vector difference to the base motion vector may indicate a location of a white circle among the L0 reference picture 2120 and the L1 reference picture 2130.

For example, it may be determined whether a direction between the base motion vector and the motion vector candidate is + or − in x and y axis directions, according to the differential direction index. In particular, the differential direction index may indicate one of (+, 0), (−, 0), (0, +), and (0, −) in an (x,y) axis direction.

Accordingly, a motion vector indicating one location among the L0 reference picture 2120 and the L1 reference picture 2130 may be determined by combining the differential distance index and the differential direction index.

Figure 22:
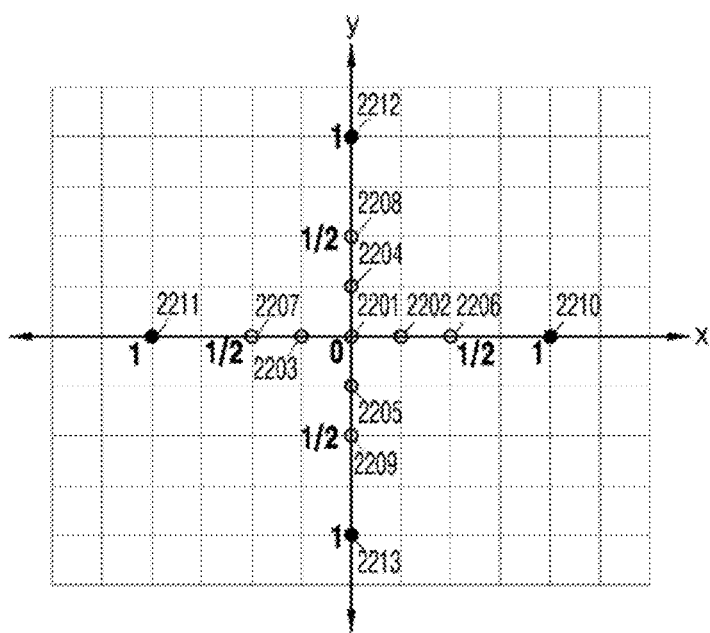
FIG. 22 illustrates motion vector candidates displayed on a coordinate plane.

Hereinafter, a method of determining the motion vector candidates that may be determined from the base motion vector will be described with reference to FIG. 22. FIG. 22 is a diagram showing the motion vector candidates displayed on a coordinate plane, and illustrates the motion vector candidates determined according to the differential distance pre-determined based on the base pixel unit corresponding to a ¼ pixel unit.

Referring to FIG. 22, the inter-prediction performer 1720 may determine candidates located according to a certain shape with respect to configuring the motion vector candidates. The certain shape may similar to a polygon such as a diamond or a rectangle, or a circle.

The inter-prediction performer 1720 may determine candidates in a uniform differential distance from a point corresponding to the base motion vector as the motion vector candidates. The inter-prediction performer 1720 may determine the motion vector candidates in a first differential distance from a pre-set point, determine the motion vector candidates in a second differential distance from the pre-set point, and determine the motion vector candidates in an n-th differential distance from the pre-set point. The differential distance may be determined according to a definition of a user. Alternatively, the inter-prediction performer 1720 may directly determine the differential distance based on information related to the current block, a temporal layer, or a group of pictures (GOP), or obtain, via the bitstream, information indicating the differential distance for determining the motion vector candidates.

The inter-prediction performer 1720 may determine the differential distance for determining the motion vector candidate of the current block according to a differential distance determined in a high level higher than a level corresponding to the current block.

The number of motion vector candidates may be determined independently for each differential distance. The inter-prediction performer 1720 may determine the number of motion vector candidates for each differential distance of the current block, according to information about the number determined in the high level higher than the level corresponding to the current block.

FIG. 22 illustrates cases in which the number of motion vector candidates in each differential distance is 4. Also, in FIG. 22, there are 3 differential distances, but the number of differential distances is not limited to 3.

Referring to FIG. 22, the inter-prediction performer 1720 may determine motion vector candidates having a distribution of a diamond shape based on a base motion vector (x,y) 2201.

The inter-prediction performer 1720 may determine motion vector candidates (x+1, y) 2202, (x−1, y) 2203, (x, y+1) 2204, and (x, y−1) 2205 in the differential distance of 1 from the base motion vector (x,y) 2201.

The inter-prediction performer 1720 may determine motion vector candidates (x+2, y) 2206, (x−2, y) 2207, (x, y+2) 2208, and (x, y−2) 2209 in the differential distance of 2 from the base motion vector (x,y) 2201.

The inter-prediction performer 1720 may determine motion vector candidates (x+4, y) 2210, (x−4, y) 2211, (x, y+4) 2212, and (x, y−4) 2213 in the differential distance of 4 from the base motion vector (x,y) 2201.

According to an embodiment, the inter-prediction performer 1720 may determine the motion vector candidates located in different differential distances for each base motion vector. For example, from among a plurality of base motion vectors, a motion vector candidate having a differential distance of 1 may be determined for a first base motion vector, and a motion vector candidate having a differential distance of 2 may be determined for a second base motion vector. Alternatively, for example, a motion vector candidate having a differential distance of 1 and a motion vector candidate having a differential distance of 2 may be determined for the first base motion vector, and a motion vector candidate having a differential distance of 4 and a motion vector candidate having a differential distance of 8 may be determined for the second base motion vector.

When different differential distances are mapped to base motion vectors in a 1:1 manner, the inter-prediction information obtainer 1710 may obtain, from the bitstream, only information indicating the base motion vector of the current block or information indicating the differential distance and determine the differential distance for specifying the motion vector of the current block and the base motion vector of the current block.

As described above, the differential distance for determining the motion vector candidates may be determined based on the base pixel unit, and when the smallest pixel unit capable of being indicated by the motion vector of the current block is different from the base pixel unit, the inter-prediction performer 1720 may scale the pre-set differential distance for configuring a candidate group for each base motion vector.

When the motion vector of the current block is capable of indicating pixels corresponding to an integer pixel unit, a ½ pixel unit, a ¼ pixel unit, and a ⅛ pixel unit, the smallest pixel unit capable of being indicated by the motion vector of the current block is ⅛ pixel unit. Also, when the base pixel unit is a ¼ pixel unit, the inter-prediction performer 1720 may up-scale the differential distance. According to an embodiment, the inter-prediction performer 1720 may up-scale the differential distance according to a ratio of the base pixel unit to the smallest pixel unit capable of being indicated by the motion vector of the current block. When the smallest pixel unit capable of being indicated by the motion vector of the current block is an m pixel unit, the base pixel unit is an n pixel unit, and the differential distance is k, the inter-prediction performer 1720 may up-scale the differential distance of k by k×n/m.

The inter-prediction information obtainer 1710 according to an embodiment may determine the prediction mode of the current block to be one of the skip mode and the merge mode. In a skip mode or merge mode, the inter-prediction performer 1720 according to an embodiment may generate a merge candidate list including neighboring blocks referred to predict the motion vector of the current block in the skip mode or merge mode.

In the skip mode or merge mode, the inter-prediction information obtainer 1710 may obtain merge difference mode information indicating whether a merge motion vector difference and a motion vector determined from a merge candidate list of the current block are used. When the merge motion vector difference is used according to the merge difference mode information, prediction may be performed according to a merge motion vector difference mode using the merge motion vector difference and the motion vector determined from the merge candidate list of the current block. When the merge motion vector difference is used according to the merge difference mode information, the inter-prediction information obtainer 1710 may obtain merge candidate information from the bitstream. The inter-prediction performer 1720 according to an embodiment may determine the base motion vector from the one candidate determined based on the merge candidate information, in the merge candidate list. The inter-prediction performer 1720 may determine the merge motion vector difference by using the distance index of the merge motion vector difference and the direction index of the merge motion vector difference of the current block, and determine the motion vector of the current block by using the base motion vector and the merge motion vector difference.

The reconstructor 1730 according to an embodiment may reconstruct the current block by using the motion vector of the current block. The reconstructor 1730 may determine a reference block in a reference picture by using the motion vector of the current block, and determine prediction samples corresponding to the current block from among reference samples included in the reference block.

When the prediction mode of the current block according to an embodiment is the merge mode and the merge motion vector difference mode is selected, the inter-prediction performer 1720 may determine the base motion vector of the current block from the merge candidate list and determine the motion vector of the current block by using the base motion vector and the merge motion vector difference. When the prediction mode of the current block is the merge mode, the video decoding apparatus 1700 may parse transform coefficients of the current block from the bitstream and obtain residual samples by performing inverse quantization and inverse transform on the transform coefficients. The reconstructor 1730 may determine reconstructed samples of the current block by combining the prediction samples of the current block and the residual samples of the current block.

When the prediction mode of the current block according to an embodiment is the skip mode and the merge motion vector difference mode is selected, the inter-prediction performer 1720 may determine the motion vector of the current block by using the merge motion vector difference and the base motion vector determined from the merge candidate list. However, because the prediction mode of the current block is the skip mode, the video decoding apparatus 1700 does not parse the transform coefficients of the current block from the bitstream and thus does not obtain the residual samples. In the skip mode, the reconstructor 1730 may determine the prediction samples of the current block as the reconstructed samples of the current block without the residual samples.

Hereinafter, a video decoding method in which inter-prediction is performed by obtaining prediction information to execute the merge motion vector difference mode in the skip mode or the merge mode will be described with reference to FIG. 18.

Figure 18:
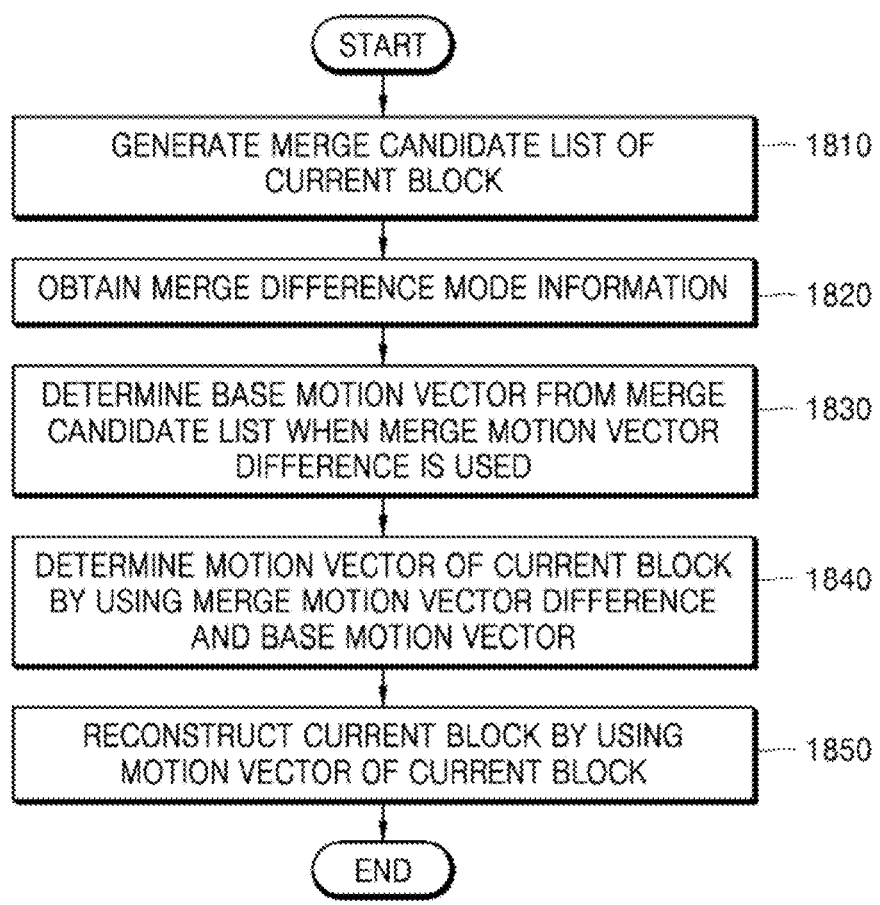
FIG. 18 is a flowchart of a video decoding method according to an embodiment.

FIG. 18 is a flowchart of a video decoding method according to an embodiment.

In operation 1810, when a prediction mode of a current block is determined as a skip mode or merge mode, the inter-prediction performer 1720 may generate a merge candidate list including neighboring blocks referred to predict a motion vector of the current block.

In operation 1820, the inter-prediction information obtainer 1710 may obtain merge difference mode information indicating whether a merge motion vector difference and a motion vector determined from the merge candidate list of the current block are used. In other words, the merge difference mode information indicates whether a merge motion vector difference mode is applied when the current block is in the skip mode or merge mode.

The inter-prediction information obtainer 1710 may perform entropy decoding using context information to obtain the merge difference mode information in the skip mode or the merge mode.

When the merge difference mode information is obtained, operation 1830 is performed.

In operation 1830, the inter-prediction information obtainer 1710 may obtain merge candidate information from a bitstream when the merge motion vector difference is used according to the merge difference mode information. The merge candidate information indicates one candidate in the merge candidate list. The inter-prediction information obtainer 1710 may determine a base motion vector from the one candidate determined from the merge candidate list based on the merge candidate information.

The inter-prediction performer 1720 may determine whether the merge motion vector difference mode is selected for the current block, based on the merge difference mode information obtained in the skip mode or the merge mode. When the merge motion vector difference mode is selected for the current block, i.e., when the merge motion vector difference and the motion vector determined from the merge candidate list of the current block are used, the inter-prediction information obtainer 1710 may obtain the merge candidate information from the bitstream.

The merge candidate information is information of 1 bit. Also, the merge candidate information may be obtained by using one piece of context information for a first bin of the merge candidate information. The inter-prediction information obtainer 1710 may perform entropy decoding using context information to obtain the merge candidate information in the skip mode or the merge mode.

When the merge motion vector difference mode is selected in the skip mode or the merge mode, a largest number of candidates allowed to be selected by the merge candidate information may be smaller than a largest number of candidates included in the merge candidate list. For example, the merge candidate information is a flag of one bit, and thus the merge candidate information may indicate one of up to two candidates in the merge candidate list.

According to an embodiment, when prediction is performed in the merge mode, the number of pieces of context information required to obtain a general merge index indicating one candidate in the merge candidate list and the number of pieces of context information required to obtain the merge candidate information may be the same.

In operation 1840, the inter-prediction performer 1720 may determine the merge motion vector difference of the current block by using a distance index of the merge motion vector difference of the current block and a direction index of the merge motion vector difference, and determine the motion vector of the current block by using the base motion vector and the merge motion vector difference.

The inter-prediction information obtainer 1710 may obtain two bins indicating the direction index of the merge motion vector difference by performing entropy decoding on the bitstream in a bypass mode. The inter-prediction information obtainer 1710 may obtain a first bin indicating the distance index of the merge motion vector difference by performing the entropy decoding using the context information on the bitstream, and obtain remaining bins indicating the distance index of the merge motion vector difference by performing the entropy decoding in the bypass mode.

In operation 1850, the reconstructor 1730 according to an embodiment may reconstruct the current block by using the motion vector of the current block. The reconstructor 1730 may determine a reference block in a reference picture by using the motion vector of the current block, and determine prediction samples corresponding to the current block from among reference samples included in the reference block. The reconstructor 1730 may determine reconstructed samples of the current block by adding the prediction samples of the current block and residual samples of the current block in a prediction mode excluding the skip mode. When there are no residual samples as in the skip mode, the reconstructed samples of the current block may be determined only with the prediction samples of the current block.

In a general motion vector prediction mode (AMVP or advanced temporal motion vector prediction (ATMVP)) that is neither the skip mode nor the merge mode, the video decoding apparatus 1700 obtains a motion vector predictor index and a motion vector difference. The video decoding apparatus 1700 may determine a motion vector predictor indicated by the motion vector predictor index in a motion vector predictor list, and determine a motion vector by combining the motion vector predictor and motion vector difference information.

Compared to the general motion vector prediction mode, the skip mode and the merge mode do not use the motion vector difference. However, when the merge motion vector difference mode is selected in the skip mode or the merge mode, the merge motion vector difference is used. The merge motion vector difference in the merge motion vector difference mode has concisely expressed compared to a motion vector difference in the general motion vector prediction mode.

For example, information required to represent a general motion vector difference in an L0 prediction direction or an L1 prediction direction includes information abs_mvd_greater0_flag indicating whether an absolute value of the motion vector difference is greater than 0, information abs_mvd_greater1_flag indicating whether the absolute value of the motion vector difference is greater than 1, information abs_mvd_minus2 indicating a value obtained by subtracting 2 from the absolute value of the motion vector difference, and information mvd_sign_flag indicating a sign of the motion vector difference.

On the other hand, information required to represent the merge motion vector difference in the L0 prediction direction or the L1 prediction direction is only differential direction information and differential distance information. Accordingly, because the merge motion vector difference may be represented by using only the differential direction information and the differential distance index, an amount of bits required to signal the merge motion vector difference may be remarkably low compared to an amount of bits required to signal the general motion vector difference.

Hereinafter, a video encoding apparatus performing inter-prediction by selecting a merge motion vector difference mode in a skip mode or a merge mode will be described with reference to FIG. 19.

Figure 19:
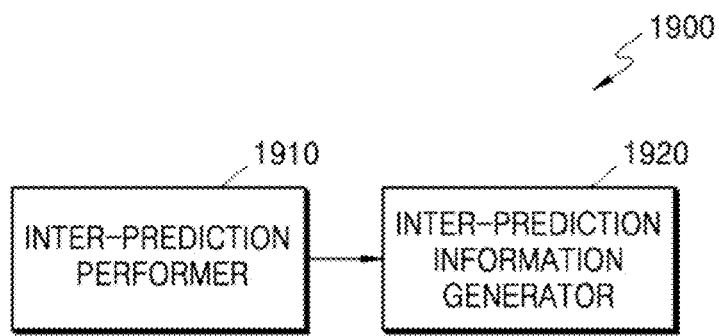
FIG. 19 is a block diagram of a video encoding apparatus according to an embodiment.

FIG. 19 is a block diagram of a video encoding apparatus according to an embodiment.

Referring to FIG. 19, a video encoding apparatus 1900 according to an embodiment may include an inter-prediction performer 1910, and an inter-prediction information generator 1920.

The video encoding apparatus 1900 may encode motion information determined by performing inter-prediction and output the encoded motion information in a form of a bitstream.

The video encoding apparatus 1900 according to an embodiment may include a central processor (not shown) for controlling the inter-prediction performer 1910 and the inter-prediction information generator 1920. Alternatively, the inter-prediction performer 1910 and the inter-prediction information generator 1920 may operate by their own processors (not shown), and the processors may systematically operate with each other to operate the video encoding apparatus 1900. Alternatively, the inter-prediction performer 1910 and the inter-prediction information generator 1920 may be controlled according to control of an external processor (not shown) of the video encoding apparatus 1900.

The video encoding apparatus 1900 may include one or more data storages (not shown) storing input/output data of the inter-prediction performer 1910 and the inter-prediction information generator 1920. The video encoding apparatus 1900 may include a memory controller (not shown) for controlling data input and output of the data storage.

The video encoding apparatus 1900 may perform an image encoding operation including prediction by connectively operating with an internal video encoding processor or an external video encoding processor so as to encode an image. The internal video encoding processor of the video encoding apparatus 1900 according to an embodiment may perform a basic image encoding operation not only as a separate processor, but also as a central processing apparatus or a graphic processing apparatus including an image encoding processing module.

The inter-prediction performer 1910 according to an embodiment may determine a motion vector of a current block by performing inter-prediction on the current block.

The inter-prediction information generator 1920 according to an embodiment may generate a merge candidate list including neighboring blocks referred to prediction-encode the motion vector of the current block, when inter-prediction is performed on the current block in one of a skip mode and a merge mode.

The inter-prediction information generator 1920 according to an embodiment may determine whether a merge motion vector difference and a base motion vector determined from the merge candidate list of the current block are used in the skip mode or the merge mode. When the merge motion vector difference is used, the inter-prediction information generator 1920 may generate merge candidate information and perform entropy encoding on a bit string of the merge candidate information. The merge candidate information indicates the base motion vector in the merge candidate list.

The inter-prediction information generator 1920 may generate a distance index of a merge motion vector difference corresponding to a difference between the base motion vector and the motion vector of the current block, and a direction index of the merge motion vector difference. The inter-prediction information generator 1920 may perform entropy encoding on a bit string of the distance index of the merge motion vector difference and perform entropy encoding on the direction index of the merge motion vector difference.

Hereinafter, a process by which the video encoding apparatus 1900 performs the inter-prediction by selecting a merge motion vector difference mode in the skip mode or the merge mode will be described with reference to FIG. 20.

Figure 20:
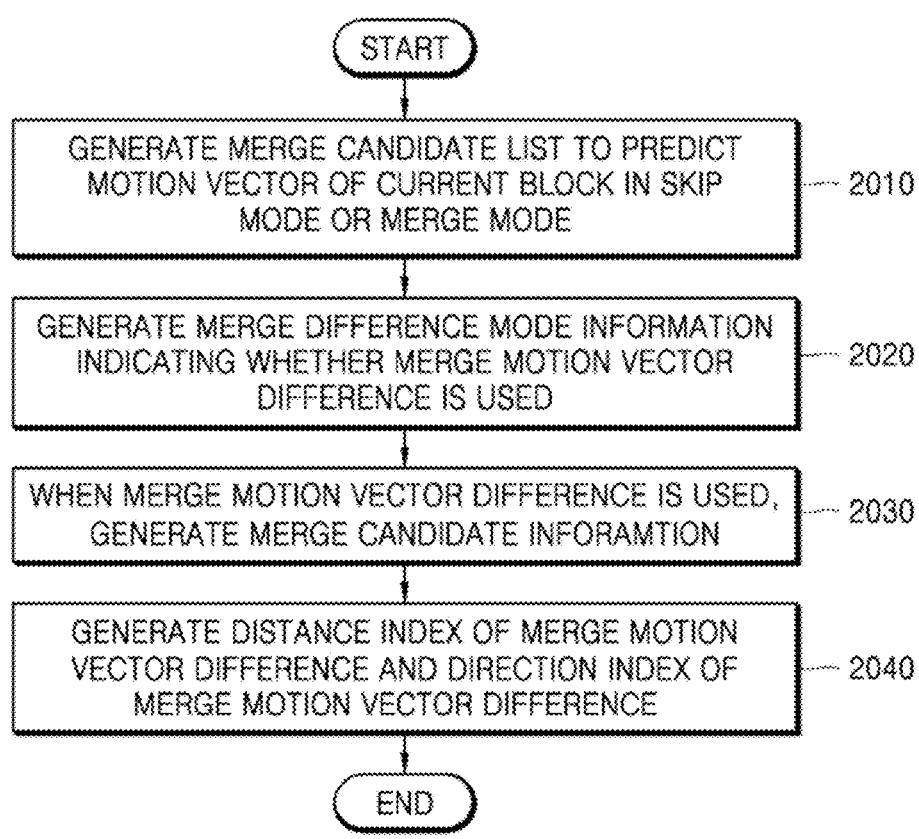
FIG. 20 is a flowchart of a video encoding method according to an embodiment.

FIG. 20 is a flowchart of a video encoding method according to an embodiment.

In operation 2010, the inter-prediction performer 1910 may generate a merge candidate list including neighboring blocks referred to predict a motion vector of a current block, when inter-prediction is performed on the current block in one of a skip mode and a merge mode. In operation 2020, the inter-prediction information generator 1920 may generate merge difference mode information indicating whether a merge motion vector difference and a base motion vector determined from the merge candidate list of the current block are used.

In operation 2030, the inter-prediction information generator 1920 may generate merge candidate information indicating one base motion vector from the merge candidate list when the merge motion vector difference is used. The inter-prediction information generator 1920 may perform entropy encoding on a bit string of the merge candidate information by using one piece of context information.

In operation 2040, the inter-prediction information generator 1920 may generate a distance index of the merge motion vector difference corresponding to a difference between the base motion vector and the motion vector of the current block, and a direction index of the merge motion vector difference.

The inter-prediction performer 1910 according to an embodiment may determine the motion vector of the current block, which indicates a reference block in a reference picture.

The inter-prediction performer 1910 according to an embodiment may determine a prediction mode of the motion vector of the current block to be one of the skip mode and the merge mode. The inter-prediction information generator 1920 may generate skip mode information indicating whether the prediction mode of the current block is the skip mode and merge mode information indicating whether the prediction mode is the merge mode.

When the prediction mode of the current block is the skip mode or the merge mode, the inter-prediction information generator 1920 may determine whether the motion vector of the current block is predicted in the merge motion vector difference mode using the merge motion vector difference and the base motion vector determined from the merge candidate list of the current block. The inter-prediction information generator 1920 may generate the merge difference mode information indicating whether the motion vector is predicted in the merge motion vector difference mode.

When motion information is predicted according to the merge motion vector difference mode, the inter-prediction information generator 1920 according to an embodiment may determine the merge candidate information indicating the base motion vector in the merge candidate list. The inter-prediction information generator 1920 may perform entropy decoding applying one piece of context information on the merge candidate information to encode the merge candidate information indicating one candidate in the merge candidate list.

According to an embodiment, the number of candidates indicatable by the merge candidate information from the merge candidate list is up to 2, and therefore, the merge candidate information may be information of 1 bit.

The inter-prediction information generator 1920 may determine the merge motion vector difference between the motion vector of the current block and the base motion vector and generate the distance index of the merge motion vector difference of the current block and the direction index of the merge motion vector difference.

When the prediction mode of the current block according to an embodiment is the merge mode and the merge motion vector difference mode is selected, the inter-prediction information generator 1920 may generate the merge candidate information indicating the base motion vector of the current block from the merge candidate list and generate differential distance information and differential direction information for indicating the merge motion vector difference between the motion vector of the current block and the base motion vector.

When the prediction mode of the current block is the merge mode, the video encoding apparatus 1900 may determine samples of the reference block indicated by the motion vector of the current block as prediction samples of the current block. The video encoding apparatus 1900 may determine residual samples that are difference between original samples and the prediction samples of the current block. The video encoding apparatus 1900 may encode transform coefficients generated by performing transform and quantization on the residual samples of the current block.

According to an embodiment, when the prediction mode of the current block is the skip mode, the current block is encoded only with the prediction samples of the current block, and thus the video encoding apparatus 1900 does not encode the residual samples of the current block. Even when the prediction mode of the current block according to an embodiment is the skip mode and the merge motion vector difference mode is selected, the inter-prediction information generator 1920 may encode the merge difference mode information, the merge candidate information, the differential distance information, and the differential direction information without encoding the residual samples.

When the motion vector is encoded in the merge motion vector difference mode, the inter-prediction information generator 1920 may perform the entropy encoding by applying one piece of context information to the merge candidate information. The merge candidate information indicates one candidate in the merge candidate list. The merge candidate information according to an embodiment is information of 1 bit and thus may be obtained by using one piece of context information for a first bin.

According to an embodiment, when prediction is performed in the merge mode, the number of pieces of context information required to obtain a general merge index indicating one candidate in the merge candidate list and the number of pieces of context information required to obtain the merge candidate information may be the same.

The inter-prediction information generator 1920 may perform entropy encoding on the distance index of the merge motion vector difference of the current block and the direction index of the merge motion vector difference.

The inter-prediction information generator 1920 according to an embodiment may perform entropy encoding on two bins indicating the direction index of the merge motion vector difference respectively in a bypass mode. The inter-prediction information generator 1920 may perform the entropy encoding on the first bin indicating the distance index of the merge motion vector difference by using the context information, and perform the entropy encoding on remaining bins indicating the distance index of the merge motion vector difference respectively in the bypass mode.

FIG. 23 illustrate values and meanings of merge candidate information, merge differential distance indexes, and merge differential direction indexes, according to an embodiment.

The merge differential distance index indicates a distance index of a merge motion vector difference. The merge differential direction index indicates a direction index of the merge motion vector difference.

The video decoding apparatus 1700 may determine a motion vector of a current block based on the merge candidate information, the merge differential distance index, and the merge differential direction index.

A table 2600 of FIG. 23 illustrates the merge candidate information according to an embodiment and a motion vector candidate corresponding thereto. A merge candidate list according to an embodiment includes four motion vector candidates ($1^{st}$, $2^{nd}$, $3^{rd}$, and $4^{th}$ MV candidates) and the merge candidate information may be displayed in an index (0, 1, 2, or 3) indicating one of them.

In a merge motion vector difference mode, one motion vector candidate indicated by the merge candidate information among the merge candidate list may be determined as a base motion vector.

In a table 2610 of FIG. 23, the merge differential distance index according to an embodiment is an integer among 0 to 7, and each index may be binarized according to a truncated unary coding method. The merge differential distance index may indicate one of 2N, wherein N is 0 to 7. A merge differential distance is determined based on a base pixel unit, and when the base pixel unit is ¼, a merge motion vector differential distance corresponding to the merge differential distance index 0 may denote a ¼ pixel distance and a merge motion vector differential distance corresponding to the merge differential distance index 1 may denote a ½ pixel distance. A merge motion vector differential distance corresponding to the merge differential distance index 7 may denote a 32 pixel distance.

As described above, when a smallest pixel unit capable of being indicated by the motion vector of the current block is smaller than the base pixel unit, the merge motion vector differential distance may be scaled according to a ratio of the smallest pixel unit to the base pixel unit. For example, when the base pixel unit is ¼ pixel unit and the smallest pixel unit is ⅛ pixel unit, and when an index indicating the merge motion vector differential distance obtained from a bitstream is 0, a merge motion vector differential distance 1 corresponding to the index 0 may be up-scaled to 2.

Also, in a table 2620, a merge motion vector differential direction index of a binary string 00 denotes a motion vector candidate changed along a + direction in an X axis based on the base motion vector, and a merge motion vector differential direction of a binary string 11 denotes a motion vector candidate changed along a − direction in a Y axis based on the base motion vector.

The merge candidate information, the merge differential distance index, and the merge differential direction index of FIG. 23 are only examples and indexes available in the merge motion vector difference mode proposed in the present disclosure are not limited thereto.

For example, the number of candidates selectable from the merge candidate list in the merge motion vector difference mode may be limited to 2, and the merge candidate information may be an index of 1 bit.

FIG. 24 illustrates equations for obtaining a motion vector by using a base motion vector and a merge motion vector difference, according to an embodiment.

mvLX[x][y][n] denotes a motion vector of a current block. x, y denotes x, y coordinates of the current block, and n denotes one of a horizontal direction component and a vertical direction component of a motion vector mvLX. mvLX[x][y][0] denotes the horizontal direction component of the motion vector mvLX and mvLX[x][y][1] denotes the vertical direction component of the motion vector mvLX.

mxLXN[m] denotes a base motion vector indicated by merge candidate information in the merge candidate list. m denotes one of a horizontal direction component and a vertical direction component of a base motion vector mvLXN. mvLXN[0] denotes the horizontal direction component of the base motion vector mvLXN and mvLXN[1] denotes the vertical direction component of the base motion vector mvLXN.

refineMxLX[I] denotes a merge motion vector difference. I denotes one of a horizontal direction component and a vertical direction component of a merge motion vector difference refineMxLX. refineMxLX[0] denotes the horizontal direction component of the merge motion vector difference refineMxLX and refineMxLX[1] denotes the vertical direction component of the merge motion vector difference refineMxLX.

In mvLX, mxLXN, and refineMxLX, LX denotes one of an L0 prediction direction and an L1 prediction direction. Accordingly, mvL0, mxL0N, and refineMxL0 denote the motion vector, the base motion vector, and the merge motion vector difference in the L0 prediction direction, and mvL1, mxL1N, and refineMxL1 denote the motion vector, the base motion vector, and the merge motion vector difference in the L1 prediction direction.

The video decoding apparatus 1700 according to an embodiment obtains the merge candidate information from a bitstream, and determines the horizontal direction component mxLXN[0] of the base motion vector indicated by the merge candidate information from the merge candidate list and the vertical direction component mxLXN[1] of the base motion vector.

The video decoding apparatus 1700 according to an embodiment obtains a merge differential direction index and a merge differential distance index from the bitstream, and determines the horizontal direction component refineMxLX[0] of the merge motion vector difference and the vertical direction component refineMxLX[1] of the merge motion vector difference by using the merge differential direction index and the merge differential distance index.

The video decoding apparatus 1700 according to an embodiment may obtain the horizontal direction component mvLX[0][0][0] of the motion vector of the current block by adding the horizontal direction component mxLXN[0] of the base motion vector and the horizontal direction component refineMxLX[0] of the merge motion vector difference, and obtain the vertical direction component mvLX[0][0][1] of the motion vector of the current block by adding the vertical direction component mxLXN[1] of the base motion vector and the vertical direction component refineMxLX[1] of the merge motion vector difference.

FIG. 25 illustrates syntaxes for obtaining merge difference mode information, merge candidate information, merge differential distance indexes, and merge differential direction indexes, according to an embodiment.

The video decoding apparatus 1700 according to an embodiment may obtain a syntax element cu_skip_flag indicating whether a current block is predicted in a skip mode, from a coding_unit syntax of a bitstream. When the current block is predicted in the skip mode (if(cu_skip_flag)), the video decoding apparatus 1700 may obtain a syntax element umve_flag indicating whether the current block is predicted in a merge motion vector difference mode. When umve_flag is 1, the video decoding apparatus 1700 may invoke the umve_idx_coding syntax. The video decoding apparatus 1700 may obtain a syntax element base_mv_idx corresponding to the merge candidate information, a syntax element distance_idx corresponding to a distance index of a merge motion vector difference, and a syntax element direction_idx corresponding to a direction index of the merge motion vector difference, from the umv_idx_coding syntax of the bitstream.

When the current block is not predicted in the skip mode (when cu_skip_flag is not 0), the video decoding apparatus 1700 may obtain a syntax element merge_flag indicating whether the current block is predicted in a merge mode. When the current block is predicted in the merge mode (if(merge_flag)), the syntax element umve_flag indicating whether the current block is predicted in the merge motion vector difference mode may be obtained. When umve_flag is 1, the video decoding apparatus 1700 may invoke the umve_idx_coding syntax. The video decoding apparatus 1700 may obtain the syntax element base_mv_idx corresponding to the merge candidate information, the syntax element distance_idx corresponding to the merge differential distance index, and the syntax element direction_idx corresponding to the merge differential direction index, from the umv_idx_coding syntax of the bitstream.

Accordingly, the video decoding apparatus 1700 may obtain the syntax element umve_flag indicating whether the current block is predicted in the merge motion vector difference mode in the skip mode and the merge mode. Even when umve_flag of the skip mode and umve_flag of the merge mode are separately obtained, both umve_flag may be obtained via entropy decoding using same context information.

Also, the video decoding apparatus 1700 may obtain the merge candidate information base_mv_idx in the skip mode and the merge mode. Even when base_mv_idx of the skip mode and base_mv_idx of the merge mode are separately obtained, both base_mv_idx may be obtained via entropy decoding using same context information.

FIG. 26 illustrates syntaxes for obtaining merge difference mode information, merge candidate information, merge differential distance indexes, and merge differential direction indexes, according to another embodiment.

The video decoding apparatus 1700 according to another embodiment may obtain a syntax element regular_merge_flag indicating whether a current block is predicted in a merge mode, from a merge_data syntax of a bitstream. When the current block is predicted in the merge mode (if(regular_merge_flag==1)), the video decoding apparatus 1700 may obtain a syntax element mmvd_merge_flag indicating whether the current block is predicted in a merge motion vector difference mode. When the current block is predicted in the merge motion vector difference mode (if (mmvd_merge_flag==1)), the video decoding apparatus 1700 may obtain a syntax element mmvd_cand_flag corresponding to the merge candidate information, a syntax element mmvd_distance_idx corresponding to a distance index of a merge motion vector difference, and a syntax element mmvd_direction_idx corresponding to a direction index of the merge motion vector difference.

Even when the current block is predicted in a skip mode, the video decoding apparatus 1700 may implicitly consider regular_merge_flag to be 1. Accordingly, when the current block is predicted in the skip mode, the video decoding apparatus 1700 may obtain the syntax element mmvd_merge_flag indicating whether the current block is predicted in the merge motion vector difference mode, and when the current block is predicted in the merge motion vector difference mode (if(mmvd_merge_flag==1)), the video decoding apparatus 1700 may obtain the syntax element mmvd_cand_flag corresponding to the merge candidate information, the syntax element mmvd_distance_idx corresponding to the distance index of the merge motion vector difference, and the syntax element mmvd_direction_idx corresponding to the direction index of the merge motion vector difference.

According to the merge_data syntax, the video decoding apparatus 1700 may analyze information related to the merge motion vector difference mode (whether the current block is predicted in the merge motion vector difference mode, the merge candidate information, the distance index of the merge motion vector difference, and the direction index of the merge motion vector difference) via the same syntax elements mmvd_merge_flag, mmvd_cand_flag, mmvd_distance_idx, and mmvd_direction_idx in the skip mode and the merge mode. However, because a prediction mode of the current block is unable to be the skip mode and the merge mode at the same time, mmvd_merge_flag, mmvd_cand_flag, mmvd_distance_idx, and mmvd_direction_idx of the skip mode are not obtained at the same time as mmvd_merge_flag, mmvd_cand_flag, mmvd_distance_idx, and mmvd_direction_idx of the merge mode, and the information related to the merge motion vector difference mode in the skip mode and the information related to the merge motion vector difference mode in the merge mode may be interpreted as independent information.

The video decoding apparatus 1700 obtains the syntax element mmvd_merge_flag indicating whether the current block is predicted in the merge motion vector difference mode in each of the skip mode and the merge mode, but may obtain the mmvd_merge_flag via entropy decoding using one piece of context information.

Also, the video decoding apparatus 1700 may obtain the merge candidate information mmvd_cand_flag in the skip mode and the merge mode. Even when mmvd_cand_flag of the skip mode and mmvd_cand_flag of the merge mode are separately obtained, both mmvd_cand_flag may be obtained via entropy decoding using same context information.

FIG. 27 is a reference table for determining binarization of merge-related information, according to another embodiment.

For example, binarization method of a syntax element mmvd_merge_flag indicating prediction in a merge motion vector difference mode is fixed-length (FL) binarization and at this time, a cMax parameter value is 1. Binarization of mmvd_cand_flag corresponding to merge candidate information is also FL binarization and at this time, a cMax parameter value may be 1.

Binarization of a syntax element mmvd_distance_idx corresponding to a distance index of a merge motion vector difference is truncated rice (TR) binarization and at this time, a cMax parameter value may be 7 and a cRiceParam value may be 0. Binarization of a syntax element mmvd_direction_idx corresponding to a direction index of the merge motion vector difference is FL binarization and at this time, a cMax parameter value may be 3.

FIG. 28 is a reference table for determining context information of merge-related information, according to another embodiment.

The reference table of FIG. 28 illustrates the context information required to perform entropy decoding for each bin index of each syntax element.

For example, context information required to decode a bin index 0 of a syntax element mmvd_merge_flag indicating prediction in a merge motion vector difference mode, i.e., a first bin, is 0. Because the mmvd_merge_flag is information of 1 bit, context information for bins other than the bin index 0 is not defined (na). Accordingly, the number of pieces of context information required to perform entropy decoding on the syntax element mmvd_merge_flag indicating whether the video decoding apparatus 1700 performs prediction in the merge motion vector difference mode, i.e., on merge difference mode information, may be 1.

Also, when prediction is performed in a merge mode, the video decoding apparatus 1700 may obtain, from a bitstream, information indicating one motion vector candidate from a merge candidate list. The video decoding apparatus 1700 may obtain a syntax element merge_idx corresponding to the information indicating the motion vector candidate from the merge candidate list via entropy decoding. Context information required to decode a bin index 0, i.e., a first bin, of the merge_idx, may be 0. Remaining bins of the merge_idx may be decoded in a bypass mode.

Accordingly, the numbers of pieces of context information required to obtain the information indicating whether the video decoding apparatus 1700 performs prediction in the merge motion vector difference mode and the information indicating the motion vector candidate from the merge candidate list may be the same, i.e., 1.

One piece of context information is required to obtain a first bin of a syntax element mmvd_distance_idx corresponding to a distance index of the merge motion vector difference, and remaining bins may be decoded in a bypass mode without context information. A syntax element mmvd_direction_idx corresponding to a direction index of the merge motion vector difference may be decoded in a bypass mode without context information.

Hereinafter, a method by which the video decoding apparatus 1700 and the video encoding apparatus 1900 configure a merge candidate list in a merge motion vector difference mode, according to another embodiment, will be described.

An existing method for configuring a merge candidate list compares motion vectors of neighboring blocks that may be included in the merge candidate list and removes a motion vector that is the same as a motion vector already present in the merge candidate list. However, when a candidate list only for a merge motion vector difference mode (hereinafter, a merge difference mode candidate list) is configured, candidates of a wider search range may be searched for by applying a method different from a merge candidate list in a general merge mode.

Generally, a pruning processor of a candidate is present while configuring the merge difference mode candidate list, but when a pruning process is partially performed on some candidates, an overlapping candidate may be present between base motion vector candidates.

Accordingly, when two or more base motion vector candidates are used, a pruning process may be added such that a base motion vector does not overlap. When there are two or more base motion vector candidates and two motion vectors are identified to be the same, one candidate that does not overlap in the merge candidate list may be added as a second motion vector candidate.

Also, only motion vector difference values +1 and −1 may be additionally signaled after a motion vector resolution is first signaled. Here, an offset (distance) and a sign (direction) of a same motion vector difference may be applied simultaneously in an x direction and a y direction.

As another example, offsets and signs of separate motion vector differences may be applied in the x direction and the y direction.

Motion vector resolution information according to an embodiment may be matched to resolution information used to predict a motion vector difference in an AMVP mode.

When a motion vector is not detected from a neighboring block while inducing a base motion vector candidate in the merge motion vector difference mode, a zero motion vector (0,0) may be used as the base motion vector candidate or a specific motion vector value may be used as a default value.

When the merge difference mode candidate list is configured in the merge motion vector difference mode, information about an existing merge candidate list may be used or a candidate may be newly configured and used. Total number of merge candidates belonging to the merge difference mode candidate list is determined to be N (N: integer, such as 1, 2, 3, or the like).

The merge difference mode candidate list may include following items.

i) A first candidate of a general merge candidate list ii) A modified candidate obtained by modifying a candidate in the merge difference mode candidate list ii-1) The modified candidate may be generated by applying a specific offset to a motion vector of the merge difference mode candidate list. The offset may be determined based on information accumulated in a frame, such as a history-based motion vector. The accumulated information may be determined by referring to an offset of a merge motion vector difference of a neighboring block. The offset may be determined from information obtained in a high level, such as a slice or a picture.

ii-2) A reference picture index of the merge difference mode candidate list may be modified and used. The reference picture index may be determined based on information accumulated in a frame. The accumulated information may be determined based on a reference picture index of a neighboring block. The accumulated information may be obtained in a high level, such as a slice or a picture. Here, the motion vector may be used by being scaled according to the modified reference picture index or without being scaled.

iii) A candidate included in a candidate list in ATMVP may be used.

iii-1) Only a representative temporal motion vector predictor (TMVP) at a center position (x0, y0) may be employed as a candidate of the merge difference mode candidate list. Here, the center position (x0, y0) denotes following.

x0=x+(block width/2), y0=y+(block height/2), wherein x and y are at left-top position of a block.

iii) TMVPs of all sub-blocks used in AMVP may also be employed as candidates of the merge difference mode candidate list.

iii-3) When iii-1) and iii-2), a candidate having a reference picture closest to a current picture may be first selected.

iii-4) When iii-1) and iii-2), a candidate using a reference picture most referred to among neighboring blocks may be first selected.

iv) A candidate of another merge candidate list may be used. Alternatively, a candidate included in an affine merge candidate list derived from a neighboring block may be used in the merge difference mode candidate list.

v) The merge difference mode candidate list may be configured by generating a largest number of candidates includable in the merge difference mode candidate list by performing pruning process on candidates of a general merge candidate list.

Hereinafter, a pruning process of a merge difference mode candidate list will be described.

According to an embodiment, when a candidate among candidates to be included in the merge difference mode candidate list is not different from a motion vector by a certain size N or greater, the candidate is considered as a similar motion vector and removed. Here, motion vectors of the candidates may be compared by adjusting reference picture indexes of the candidates to be the same. Accordingly, two motion vectors that are to be compared may be moved to a position of a same reference picture index, and then compared.

The pruning process may be performed as below so as to prevent use of a motion vector that is similar to be used as a base motion vector predictor of a merge motion vector difference mode. When a coordinate of a pre-inserted motion vector predictor is on an x-axis based on a motion vector inserted to the merge difference mode candidate list, a candidate on the x-axis in a next order is not inserted into the merge difference mode candidate list. Similarly, when a pre-inserted predictor is on a y-axis, a candidate on the y-axis in a next order is not inserted. Here, information on the x-axis or y-axis may be a motion vector represented in accuracy of 1/16 (or 1/4). As another example, the information on the x-axis or y-axis may be coordinates of x and y after pre-determined N-pel rounding is performed in the merge motion vector difference mode. This is to identify large directionality of a current motion vector instead of coordinates on the x-axis or y-axis of fine values, such as noise.

According to another embodiment, the video decoding apparatus 1700 and the video encoding apparatus 1900 may immediately use a specific candidate list without a separate pruning process because candidates pre-pruned in the specific candidate list are used according to a certain condition. In other words, up to N candidates among candidates of a general merge candidate list may be selected for the merge difference mode candidate list.

Hereinafter, various embodiments of the video decoding apparatus 1700 and the video encoding apparatus 1900 according to another embodiment pruning a base motion vector in a merge motion vector difference mode will be described.

As described above, the merge motion vector difference mode according to an embodiment includes first N candidates of a general merge candidate list used in a merge mode or a skip mode. A candidate selected from the general merge candidate list is a base motion vector and an offset (distance) of a merge motion vector difference may be added to the base motion vector in one of an x-direction and a y-direction.

When an x-coordinate value or y-coordinate value of the base motion vector is the same, candidates according to the merge motion vector difference may overlap. Accordingly, candidates according to the merge motion vector difference may be less uniformly distributed in a spatial domain. Accordingly, a candidate of a motion vector of a merge difference mode may need to be pruned such that the candidates according to the merge motion vector difference are further uniformly distributed. In this regard, it may be determined whether to exclude a newly added base motion vector from an existing candidate and add a motion vector difference between the existing candidate and the newly added base motion vector to the merge difference mode candidate list. When the motion vector difference has a value of 0 in an x-axis or y-axis in at least one of L0 and L1 prediction directions, the motion vector difference may be added to the merge difference mode candidate list.

Hereinafter, various embodiments of a method by which the video decoding apparatus 1700 and the video encoding apparatus 1900 according to another embodiment derive a merge difference mode candidate list will be described.

When the merge difference mode candidate list uses a method of configuring a general merge candidate list, a list configuring process may be immediately ended after maximum N candidates are secured for the merge difference mode candidate list.

When a merge type other than a general merge mode is present, a candidate included in a candidate list of the corresponding merge type may not be included in the merge difference mode candidate list.

Hereinafter, a merge motion vector difference mode in uni-prediction performed by the video decoding apparatus 1700 and video encoding apparatus 1900, according to another embodiment, will be described.

According to an embodiment, an operating method of the merge motion vector difference mode may vary depending on a motion vector predictor (hereinafter, referred to as a base motion vector predictor) determined by a base motion vector. In the uni-prediction, motion vector information may be reconfigured when difference information derived from a distance index and direction index of a merge motion vector difference is added to the base motion vector predictor.

According to another embodiment, another predictor may be generated and used when the base motion vector predictor is the uni-prediction. This method may exhibit high performance in a P-slice and low delay B situation. A following method may indicate whether two or more predictors are used by additionally signaling 1 bit in case of the uni-prediction.

A method of generating two or more predictors in the uni-prediction in the merge motion vector difference mode is as follows.

i) A first predictor may be generated by using a reference picture index and a motion vector of a base motion vector predictor. A second predictor may be generated by using a reference index of the base motion vector predictor and a new motion vector generated by adding merge motion vector difference information (distance index and direction index) based on the motion vector.

ii) Same as the process of i), but an additional reference picture index may be received together with the merge motion vector difference information while generating the second predictor, and the motion vector of the base motion vector predictor may be scaled according to a distance to a reference picture indicated by the received reference picture index. The second predictor may be generated by using a motion vector newly generated by adding the scaled merge motion vector difference information based on the scaled motion vector.

iii) A motion vector is pre-generated by adding the merge motion vector difference information to the motion vector of the base motion vector predictor before scaling, based on the reference picture index during the process of ii), and the pre-generated motion vector may be used after being scaled according to a distance to a reference picture indicated by a reference picture index that is additionally received or an implicit reference picture index.

Hereinafter, a context model of information used in a merge motion vector difference mode by the video decoding apparatus 1700 and the video encoding apparatus 1900, according to another embodiment, will be described.

First, various embodiments of context models of merge difference information are as follows.

The merge difference information according to an embodiment may be used after a skip mode flag or after a merge mode flag. The merge difference information (skip my difference information) used after the skip mode flag and the merge difference information (merge my difference information) used after the merge mode flag may be distinguishably used and context models may also be separately encoded. As another example, the skip my difference information and the merge my difference information may not be distinguished by separate flags, but may be encoded in one context model.

When the context model is used for entropy decoding of the merge difference information, different numbers of context models may be determined depending on the number of adjacent blocks.

For example, when adjacent blocks are left and upper blocks, there may be total three possible cases that may occur. There are a case where there is no block where a merge motion vector difference mode is used among neighboring blocks, a case where there is one block, and a case where two blocks are both encoded in the merge motion vector difference mode.

In the three cases, one or more context models may be used for entropy decoding of the merge difference information, and an embodiment thereof is as follows.

First, two context models may be used. A first context model may be used when all neighboring blocks do not use the merge motion vector difference mode. A second context model may be used when at least one of the neighboring blocks uses the merge motion vector difference mode.

A case where three context models are used for entropy decoding of the merge difference information is as a following embodiment. A first context model may be used when all neighboring blocks do not use the merge motion vector difference mode, a second context model may be used when one of the neighboring blocks uses the merge motion vector difference mode, and a third context model may be used when two of the neighboring blocks use the merge motion vector difference mode.

Context information for entropy decoding of merge candidate information, according to an embodiment, may be determined as follows. For example, a context model may be applied only when a first bin of the merge candidate information is decoded. Alternatively, the merge candidate information may be decoded by using a context model identical to a context model used to decode a general merge index indicating one candidate included in a merge candidate list in a general merge mode.

A context model may be used to decode only a first bin of a distance index of a merge motion vector difference, according to an embodiment. A context model is not applied to decode remaining bins of the distance index of the merge motion vector difference.

One of bins of a direction index of a merge motion vector difference according to an embodiment may indicate an x-axis direction or y-axis direction, and a context model may be applied to decode the corresponding bin. Another one of the bins may include a cross shape or an X shape, and a context model may be applied to decode the corresponding bin.

Hereinafter, a method of representing a motion vector difference in various resolutions in a merge motion vector difference mode is proposed.

In the merge motion vector difference mode, a plurality of motion vector resolutions may be applied, and a method of applying thereof will be described. However, first, a method encoding a base motion vector type will be described.

Information about an existing motion vector type including a motion vector difference type is represented by distinguishing information between an x-coordinate and a y-coordinate. The x-coordinate will be described as an example. In an existing method, sign information (+ or −) corresponding to a motion direction is signaled. Also, magnitude about how long the motion direction is away on an axis is signaled. In addition, because there is a high occurrence possibility of 0 and 1, a bit indicating information of 0 or not, or 1 or not is also signaled, and a context model may be applied for each bit.

The video decoding apparatus 1700 and the video encoding apparatus 1900 according to another embodiment may signal a distance index of a motion vector difference instead of the magnitude of a motion vector in the merge motion vector difference mode. Also, instead of sign information indicating a direction of a motion vector, a direction index of the merge motion vector difference may be signaled in the merge motion vector difference mode.

The direction index of the motion vector difference may be expressed based on resolution of a motion vector used in a video codec mounted on the video decoding apparatus 1700 and the video encoding apparatus 1900. For example, in a WC codec, a motion vector is used in ⅙ pixel units internally. However, resolution indicating the motion vector is expressed in ¼. Accordingly, when the distance index of the merge motion vector difference mode is 1, shift of the motion vector is expressed in a resolution of ¼. When the distance index of the merge motion vector difference mode is 2, shift of the motion vector is expressed in a resolution of ½. The plurality of motion vector resolutions may be expressed by the distance index, and a direction of the motion vector may be expressed by the direction index of the merge motion vector difference.

The merge motion vector difference may be added to a motion vector predictor corresponding to a base motion vector selected from a merge candidate list. Because the distance index expresses the resolution of the motion vector, the motion vector predictor needs to be rounded in the same resolution such that a resolution of a final motion vector matches the resolution of the distance index.

Predictor(Value rounded in information of distance index)+Merge motion vector difference(Distance index*Pre-set resolution)*Direction index The resolution of merge motion vector difference may also be applied to an inter-prediction mode used by a current motion vector. A concept of the motion vector resolution according to the distance index of the merge motion vector difference may be applied to a motion vector predictor of the inter-prediction mode, such as a skip mode, a merge mode, an affine skip mode, an affine merge mode, an interfintra-combination mode, a generalized B mode, a triangle partition mode, an AMVP mode, an adaptive motion vector resolution (AMVR) mode, or an affine AMVP mode, which is usable in a current video codec. Also, the concept of motion vector resolution according to the distance index of the merge motion vector difference may be applied a motion vector difference component (including an Nth residual component, such as a first residual component, a second residual component, or the like) in each inter-prediction mode. Accordingly, various indexes used in each inter-prediction mode may be interpreted and used as the corresponding motion vector resolution.

As another example, because the distance index of the merge motion vector difference may be interpreted as resolution information of the motion vector, the distance index may not be used for two or more inter-prediction modes.

The distance index may be signaled, as expression information of the plurality of motion vector resolutions, after a syntax element pred_mode_flag for indicating an inter-prediction mode or an inter-prediction mode. When decoded in the inter-prediction mode (pred_mode_flag==MODE_INTER), the motion vector resolution according to the distance index may be applied to a motion vector to be decoded in all prediction modes applied thereafter.

The motion vector resolution according to the distance index is a resolution applicable to all prediction modes currently used, and may be immediately applied to the AMVR mode proposed in current WC. In other words, information expressing the motion vector resolution of AMVR may be expressed in the proposed distance index. Accordingly, the distance index of the merge motion vector difference mode may be used without having to separately signal the information for the motion vector resolution in the AMVR mode, and the resolution of the motion vector corresponding to the distance index may be applied to a motion vector difference and motion vector predictor corresponding to a base motion vector.

A plurality of resolutions applied to encoding and decoding of the motion vector may be controlled with the distance index of the merge motion vector difference mode. Here, because information of the plurality of suitable resolutions may vary depending on a characteristic of an image, a resolution list including a plurality of resolutions may be required.

For example, a resolution list in sub-pel units and a resolution list equal to or greater than integer-pel units are required.

Resolution list in sub-pel units: Index 0 (corresponds to a 1/16 pixel unit), index 1 (1/8 pixel unit), index 2 (1/4 pixel unit), index 3 (1/2 pixel unit)

Resolution list in integer pel units: Index 0 (corresponds to 1 pixel unit), index 1 (2 pixel units), index 2 (4 pixel units), index 3 (8 pixel units), index 4 (16 pixel units), and the like.

List information indicating a list used among the resolution lists is identically applied to the video decoding apparatus 1700 and the video encoding apparatus 1900, and may be signaled in a high level (slice header level or picture level). Alternatively, the list information may be signaled in an encoding unit level (level where pred_mode_flag is signaled). Alternatively, the video decoding apparatus 1700 and the video encoding apparatus 1900 may implicitly use one list.

Alternatively, when the list information is signaled in a slice level or a tile level, separate list information may be signaled for each temporal layer or an implicitly pre-determined resolution may be used.

As another example, a motion vector candidate that may be the base motion vector of the merge motion vector difference mode may be determined to be a representative candidate from among sub-block motion vector candidates used in ATMVP or the like. For example, a motion vector of a sub-block corresponding to a center location or a motion vector of a sub-block corresponding to an upper left location of the sub-block motion vector candidates may be determined as the representative candidate.

As another example, a sub-block candidate that may be the base motion vector of the merge motion vector difference mode may be excluded from the motion vector candidates. Accordingly, operation complexity may be reduced.

Hereinafter, whether to use an ATMVP merge candidate when determining a base motion vector in a merge motion vector difference mode will be described.

The base motion vector in the merge motion vector difference mode according to an embodiment is first determined from a merge candidate list used in a merge mode. In the merge motion vector difference mode according to another embodiment, the base motion vector may be selected not only from the merge candidate list, but also from ATMVP candidates. Information indicating whether to predict a motion vector by using the ATMVP candidate in the merge motion vector difference mode may be signaled in a slice level or a higher level (picture, sequence, sequence parameter set (SPS), or picture parameter set (PPS)).

When the ATMVP candidate is also available in the merge motion vector difference mode, all candidates of the merge candidate list and ATMVP candidate list need to be generated. However, when the ATMVP candidate is not available, the video decoding apparatus 1700 does not need to access a memory for ATMVP and does not need to access a memory in a temporal direction to configure the ATMVP candidate list, high efficiency may be achieved in terms of memory access.

A motion vector prediction mode in which the video decoding apparatus 1700 adjusts and uses a relatively inaccurate motion vector to a further fine motion vector without entirely or partially signaling information related to a motion vector will be collectively referred to as a decoder side motion vector derivation technology. A method of combining a merge motion vector difference mode with a bi-directional optical flow (BIO) mode and DMVR mode will be described as a representative decoder side motion vector derivation technology.

Hereinafter, a method of combining the merge motion vector difference mode and a BIO technology will be described.

When the merge motion vector difference mode is applied to bi-prediction, prediction blocks in a bi-direction (L0 direction and L1 direction) are used. Among inter-prediction technologies, there is the BIO technology that generates one prediction block whenever there are prediction blocks in a bi-direction. The BIO technology is a technology of determining an optical motion vector by using a motion vector when reference blocks in a bi-direction are present, and deriving one reference block by applying the optical motion vector for each pixel of the reference blocks in the bi-direction.

In the merge motion vector difference mode, there may be a case where one reference block is generated with the reference blocks in the b-direction and used. Here, the BIO mode may be implicitly applied or not applied while the reference blocks are secured, without separate signaling for determining application of the BIO mode.

However, according to an embodiment, the BIO mode may be used only in a specific case of applying the merge motion vector difference mode.

In the merge motion vector difference mode, various points are searched for based on a motion vector included in a merge candidate list. Here, the search points may be grouped depending on a distance from a center. The groups may be distinguished according to a distance index.

According to an embodiment, the BIO mode may be configured to operate only when the distance index is equal to or less than pre-determined N in the merge motion vector difference mode. The BIO mode is a type of a post-processing mode of a predicted block and encoding efficiency is increased by correcting pixels in fine units. This is because the pixel needs to be further finely corrected when an optical flow of a motion vector is stable, i.e., when the motion vector is not large.

When the video decoding apparatus 1700 according to an embodiment operates in the merge motion vector difference mode, a large distance index means that a reference block is obtained by predicting a motion vector having large motion. Here, even when the BIO mode is applied, it may be difficult to achieve high encoding efficiency. Accordingly, the encoding efficiency may be increased by additionally applying the BIO mode only when the distance index is equal to or less than a specific size.

For example, when the BIO mode is applied only when the distance index is equal to or less than pre-set N, the BIO mode may be applied only at a search point in which the distance index is 0 when N is 0, and the BIO mode may be applied only at a search point in which the distance index is 0 or 1 when N is 1.

The BIO mode is a method of correcting a current pixel considering consistency of motion between reference frames present at different locations temporally. It may be determined whether to apply the BIO mode to motion vectors, based on a motion vector in bi-prediction, which is first provided. This is because, among motion vectors of neighboring blocks, there may be a motion vector expressing accurate motion of an object, but there may sometimes be a motion vector simply determined for encoding efficiency.

Accordingly, when the motion vector in the bi-direction does not follow optical consistency, only complexity is increased and encoding efficiency is not achieved even when separate refinement is applied, and thus the BIO mode may be applied for the optical consistency.

Accordingly, the complexity may be largely decreased while maintaining the encoding efficiency, with following two conditions.

MV_L: Motion information in L direction (For example, MV_0: Motion vector in L0 direction, MV_1: Motion vector in L1 direction)

MV_L.x, MV_L.y: x- and y-coordinates each in L direction (For example, MV_0.x is x-coordinate among motion vectors in L1 direction)

OPT_x, OPT_y: Motion vector generated assuming that there is optical consistency For example, when MV_0.x is −10, an optimal x-coordinate above another reference frame away from a current frame at a same distance is referred to as OPT_x and a sign opposite to a sign of MV_0.x is determined to be 10. When the distance from the current frame is different, scaling may be performed.

$MV\_0.x * MV\_1.x > 0$     Condition 1:

$ABS(OPT\_x - MV\_1.x) > N$(Here, a real number $N$ is a pre-set threshold value)     Condition 2:

The above two conditions may be separately used or simultaneously used. The two conditions may be mixed as follows.

(Distances to both reference frames from a center are assumed to be the same.)

$OPT\_x = -1 * MV\_0.x$ $OPT\_y = -1 * MV\_0.y$ $If((ABS(OPT\_x - MV\_1.x) > N) \&\& (MV0.x * MV\_1.x > 0)) \|$ $(ABS(OPT\_y - MV\_1.y) > N) \&\& (MV\_0.y * MV\_1.y > 0))$ BIO off In other words, the BIO mode may not be applied when a distance between an x-coordinate and an optimal x-coordinate in the motion vector in the L1 direction is greater than N and a sign of the x-coordinate in the motion vector in the L1 direction and a sign of the x-coordinate in the motion vector in the L0 direction are the same. Similarly, the BIO mode may not be applied when a distance between an y-coordinate and an optimal y-coordinate in the motion vector in the L1 direction is greater than N and a sign of the y-coordinate in the motion vector in the L1 direction and a sign of the y-coordinate in the motion vector in the L0 direction are the same.

On the other hand, the BIO mode may be applied when the distance between the x-coordinate and the optimal x-coordinate in the motion vector in the L1 direction is not greater than N, the sign of the x-coordinate in the motion vector in the L1 direction and the sign of the x-coordinate in the motion vector in the L0 direction are not the same, the y-coordinate and the optimal y-coordinate in the motion vector in the L1 direction is not greater than N, or the sign of the y-coordinate in the motion vector in the L1 direction and the sign of the y-coordinate in the motion vector in the L0 direction are not the same.

Hereinafter, a method of combining a merge motion vector difference mode and a decoder side MV derivation (DMVR) method will be described.

A DMVR technology is a method of generating a virtual original block by using two reference blocks and generating a new motion vector by using the virtual original block because the two reference blocks are determined by using a motion vector in a bi-direction. During this process, it is not required to signal additional information because the video decoding apparatus 1700 and the video encoding apparatus 1900 operate in a same manner. Accordingly, a DMVR mode may be implicitly applied or not applied without having to signal separate information for indicating that the DMVR mode is used.

However, the video decoding apparatus 1700 and the video encoding apparatus 1900 according to an embodiment propose a method of applying the DMVR mode in a specific case and when a merge motion vector difference mode is applied.

According to an embodiment, the DMVR mode may be configured to operate only when a distance index is equal to or less than pre-determined N in the merge motion vector difference mode. The DMVR mode is a type of a post-processing mode of a predicted block and encoding efficiency is increased by correcting pixels in fine units. This means that a pixel needs to be further finely corrected when a motion vector is stable, i.e., when motion according to the motion vector is not large.

When the video decoding apparatus 1700 according to an embodiment operates in the merge motion vector difference mode, a large distance index means that a reference block is obtained by predicting a motion vector having large motion. Here, even when the DMVR mode is applied, it may be difficult to achieve high encoding efficiency. Accordingly, the encoding efficiency may be increased by additionally applying the DMVR mode only when the distance index is equal to or less than a specific size.

For example, when the DMVR mode is applied only when the distance index is equal to or less than pre-set N, the DMVR mode may be applied only at a search point in which the distance index is 0 when N is 0, and the DMVR mode may be applied only at a search point in which the distance index is 0 or 1 when N is 1.

The DMVR mode is a method of correcting a current pixel considering similarity of a block between reference frames present at different locations temporally. It may be determined whether to apply the DMVR mode to motion vectors, based on a motion vector in bi-prediction, which is first provided. This is because, among motion vectors of neighboring blocks, there may be a motion vector expressing accurate motion of an object, but there may sometimes be a motion vector simply determined for encoding efficiency.

Accordingly, the DMVR mode may be applied when the motion vector of the bi-direction follows a certain degree of consistency.

Accordingly, the complexity may be largely decreased while maintaining the encoding efficiency, with following two conditions.

MV_L: Motion information in L direction (For example, MV_0: Motion vector in L0 direction, MV_1: Motion vector in L1 direction)

MV_L.x, MV_L.y: x- and y-coordinates each in L direction (For example, MV_0.x is x-coordinate among motion vectors in L1 direction)

OPT_x, OPT_y: Motion vector generated assuming that there is optical consistency For example, when MV_0.x is −10, an optimal x-coordinate above another reference frame away from a current frame at a same distance is referred to as OPT_x and a sign opposite to a sign of MV_0.x is determined to be 10. When the distance from the current frame is different, scaling may be performed.

$$MV\_0.x*MV\_1.x>0 \qquad \text{Condition 1:}$$

$$ABS(OPT\_x-MV\_1.x)>N(\text{Here, a real number } N \text{ is a pre-set threshold value}) \qquad \text{Condition 2:}$$

The above two conditions may be separately used or simultaneously used. The two conditions may be mixed as follows.

(Distances to both reference frames from a center are assumed to be the same.)

$$OPT\_x=-1*MV\_0.x$$

$$OPT\_y=-1*MV\_0.y$$

$$\text{If}((ABS(OPT\_x-MV\_1.x)>N)\&\& \\ (MV0.x*MV\_1.x>0)\|$$

$$(ABS(OPT\_y-MV\_1.y)>N)\&\& \\ (MV\_0.y*MV\_1.y>0))\text{DMVR off}$$

In other words, the DMVR mode may not be applied when a distance between an x-coordinate and an optimal x-coordinate in the motion vector in the L1 direction is greater than N and a sign of the x-coordinate in the motion vector in the L1 direction and a sign of the x-coordinate in the motion vector in the L0 direction are the same. Similarly, the DMVR mode may not be applied when a distance between an y-coordinate and an optimal y-coordinate in the motion vector in the L1 direction is greater than N and a sign of the y-coordinate in the motion vector in the L1 direction and a sign of the y-coordinate in the motion vector in the L0 direction are the same.

On the other hand, the DMVR mode may be applied when the distance between the x-coordinate and the optimal x-coordinate in the motion vector in the L1 direction is not greater than N, the sign of the x-coordinate in the motion vector in the L1 direction and the sign of the x-coordinate in the motion vector in the L0 direction are not the same, the y-coordinate and the optimal y-coordinate in the motion vector in the L1 direction is not greater than N, or the sign of the y-coordinate in the motion vector in the L1 direction and the sign of the y-coordinate in the motion vector in the L0 direction are not the same.

Hereinafter, a method of combining a merge motion vector difference mode with a deblocking filter, according to an embodiment, will be described.

A variable boundary strength (bs) for defining a strength of the deblocking filter to be applied to a boundary between two blocks may be determined based on a motion vector of each block. Hereinafter, how motion vector difference information decoded according to a merge motion vector difference mode is used to determine a filtering strength of a deblocking filter when a motion vector is predicted based on the merge motion vector difference mode will be described.

When the merge motion vector difference mode is not applied to a sub-block, deblocking filtering may be performed on the sub-block like a block encoded in a general skip mode or a general merge mode.

The video decoding apparatus 1700 according to an embodiment may also apply the merge motion vector difference mode to the sub-block. Because each base motion vector (motion vector predictor) is determined in sub-block units, another motion vector may be predicted for each sub-block. Motion vectors of all sub-blocks or some sub-blocks may be corrected by using a distance index and a direction index of the merge motion vector difference mode. A strength of the deblocking filtering may be determined considering the motion vectors of the sub-blocks and the deblocking filtering may be performed on a boundary of the sub-blocks.

A method of the deblocking filtering may be encoded in a same manner as when different coding units have different motion vectors.

Prediction may be performed for each sub-block determined by splitting a coding unit in a pre-determined rule. The pre-determined rule may be a split of a smallest unit determined in a slice level or pre-agreed by an encoder/decoder. The motion vector of each sub-block may be determined according to a determined process. Hereinafter, various embodiments for determining a motion vector of each coding unit by using a sub-block will be described.

i) A size and shape of a sub-block of a block may be identified by signaling a certain bit in a skip mode, a merge mode, a merge motion vector difference mode in the skip mode, or a merge motion vector difference mode in the merge mode. For example, when a bit indicating a split is 0, a corresponding block is not split into sub-blocks. When the bit indicating a split is 1, the corresponding block is split into sub-blocks. When a method of splitting to sub-blocks is a method implicitly agreed by the video encoding apparatus 1900 and the video decoding apparatus 1700, additional information is no longer signaled. As another example, information indicating whether the block is split into the sub-blocks horizontally or vertically may be signaled after the bit indicating a split.

ii) Information about a method of deriving a motion vector of the sub-block when the block is split into the sub-blocks may also be signaled. When the information about the method of deriving the motion vector of the sub-block is 0, a temporal motion vector predictor may be derived and used to determine the motion vector of the sub-block, or when the information about the method is 0, the motion vector of the sub-block may be additionally signaled.

iii) Regarding the signaled information about the motion vector, candidate information indicating one of MVP lists, prediction direction information, a reference picture index, absolute value information of a motion vector difference, and sign information of the motion vector difference may be signaled in a same manner as motion vector information of an AMVP mode of the WC standard. Alternatively, the motion vector of the sub-block may be signaled by using motion information of the merge motion vector difference mode (merge candidate information, and the distance index and direction index of the merge motion vector difference). In addition, motion vector difference information related to a merge motion vector mode of the sub-block may be shared as motion vector difference information of another sub-block. For following consecutive blocks, a distance index, a direction index, or both may be signaled and motion vector difference information overlapping between the sub-blocks may not be transmitted.

Hereinafter, an embodiment of using a merge motion vector difference mode in a deblocking filtering process will be described.

For example, a block decoded in a merge motion vector difference mode in a skip mode and a block decoded in a merge motion vector difference mode in a merge mode may be determined to be separate blocks, and deblocking filtering may be performed on a boundary between the blocks.

As another example, a deblocking filtering method of a block decoded in a general skip mode or a block decoded in a general merge mode may not be performed on the block decoded in the merge motion vector difference mode in the skip mode and the block decoded in the merge motion vector difference mode in the merge mode. A deblocking filtering method applied to a block decoded in an AMVP mode where a residual block is generated may be applied to the block decoded in the merge motion vector difference mode in the skip mode and the block decoded in the merge motion vector difference mode in the merge mode.

As another example, the deblocking filtering method of the block decoded in the general skip mode or the block decoded in the general merge mode may be performed on the block decoded in the merge motion vector difference mode in the skip mode. The deblocking filtering method applied to the block decoded in the AMVP mode accompanied by the residual block may be used for the block decoded in the merge motion vector difference mode in the merge mode.

As another example, when motion vectors between blocks are different in the AMVP mode, strength bs of deblocking filtering may be determined according to a difference between the motion vectors. A motion vector difference between the blocks decoded in the merge motion vector difference mode or a motion vector difference between the block decoded in the merge motion vector difference mode and the block decoded in the AMVP mode may use the distance index or direction index of the merge motion vector difference. A base motion vector, and the distance index and direction index of the merge motion vector difference may be obtained for the block decoded in the merge motion vector difference mode. Accordingly, because base motion vectors of two blocks may be the same, a difference between motion vectors of the two blocks may be determined only with the distance index of the merge motion vector difference. Accordingly, the strength of deblocking filtering may be determined for the boundary between the two blocks by using only the distance index of the merge motion vector difference.

However, when decoding is not performed in the merge motion vector difference mode, merge motion vector difference information corresponding to a current motion vector may be generated and the strength of deblocking filtering may be determined by using a distance index of the generated merge motion vector difference.

Meanwhile, the embodiments of the present disclosure described above may be written as computer-executable programs that may be stored in a medium.

The medium may continuously store the computer-executable programs, or temporarily store the computer-executable programs or instructions for execution or downloading. Also, the medium may be any one of various recording media or storage media in which a single piece or plurality of pieces of hardware are combined, and the medium is not limited to a medium directly connected to a computer system, but may be distributed on a network. Examples of the medium include magnetic media, such as a hard disk, a floppy disk, and a magnetic tape, optical recording media, such as CD-ROM and DVD, magneto-optical media such as a floptical disk, and ROM, RAM, and a flash memory, which are configured to store program instructions. Other examples of the medium include recording media and storage media managed by application stores distributing applications or by websites, servers, and the like supplying or distributing other various types of software.

While one or more embodiments of the present disclosure have been described with reference to the figures, it will be understood by those of ordinary skill in the art that various changes in form and details may be made therein without departing from the spirit and scope as defined by the following claims.

The invention claimed is:

1. A video decoding method comprising:
    obtaining merge difference mode information indicating whether a merge motion vector difference is used to a motion vector of a candidate block determined from a merge candidate list for predicting a motion vector of a current block;
    when the merge motion vector difference is used according to the merge difference mode information, obtaining merge candidate information from a bitstream and determining a base motion vector from the motion vector of the candidate block determined, based on the merge candidate information, among candidate blocks included in the merge candidate list;

determining the motion vector of the current block by using the base motion vector and the merge motion vector difference of the current block, the merge motion vector difference being determined by using a distance index and a direction index of the merge motion vector difference of the current block; and reconstructing the current block by using the motion vector of the current block, wherein a first bin of the distance index of the merge motion vector difference is obtained by performing, on the bitstream, entropy decoding using context information, and wherein remaining bins of the distance index of the merge motion vector difference are obtained by performing, on the bitstream, entropy decoding in a bypass mode.

2. A video decoding apparatus comprising:

an inter-prediction information obtainer configured to obtain merge difference mode information indicating whether a merge motion vector difference is used to a motion vector of a candidate block determined from a merge candidate list for predicting a motion vector of a current block, and when the merge motion vector difference is used according to the merge difference mode information, obtaining merge candidate information from a bitstream;

an inter-prediction performer configured to determine a base motion vector from the motion vector of the candidate block determined, based on the merge candidate information, among candidate blocks included in the merge candidate list, determine the merge motion vector difference of the current block by using a distance index and a direction index of the merge motion vector difference of the current block, and determine the motion vector of the current block by using the base motion vector and the merge motion vector difference; and a reconstructor configured to reconstruct the current block by using the motion vector, wherein a first bin of the distance index of the merge motion vector difference is obtained by performing, on the bitstream, entropy decoding using context information, and wherein remaining bins of the distance index of the merge motion vector difference are obtained by performing, on the bitstream, entropy decoding in a bypass mode.

3. A video encoding method comprising:

generating merge difference mode information indicating whether a merge motion vector difference is used to a motion vector of a candidate block determined from a merge candidate list for predicting a motion vector of a current block;

when the merge motion vector difference is used, generating merge candidate information indicating one base motion vector from the motion vector of the candidate block among candidate blocks included in the merge candidate list; and generating a distance index of the merge motion vector difference corresponding to a difference between the base motion vector and the motion vector of the current block, and a direction index of the merge motion vector difference, wherein entropy encoding using context information is performed on a first bin of the distance index of the merge motion vector difference, and wherein entropy encoding in a bypass mode is performed on remaining bins of the distance index of the merge motion vector difference.

* * * * *